(12) United States Patent
Singh et al.

(10) Patent No.: US 12,033,764 B2
(45) Date of Patent: Jul. 9, 2024

(54) FUEL RACK FOR STORING SPENT NUCLEAR FUEL

(71) Applicant: Holtec International, Camden, NJ (US)

(72) Inventors: Krishna P. Singh, Jupiter, FL (US); Stephen J. Agace, Voorhees, NJ (US)

(73) Assignee: Holtec International

( * ) Notice: Subject to any disclaimer, the term of this patent is extended or adjusted under 35 U.S.C. 154(b) by 729 days.

(21) Appl. No.: 17/083,582

(22) Filed: Oct. 29, 2020

(65) Prior Publication Data

US 2021/0225540 A1 Jul. 22, 2021
US 2022/0246321 A9 Aug. 4, 2022

Related U.S. Application Data

(60) Continuation-in-part of application No. 16/002,325, filed on Jun. 7, 2018, now abandoned, which is a
(Continued)

(51) Int. Cl.
*G21C 19/07* (2006.01)
*G21F 5/012* (2006.01)
(Continued)

(52) U.S. Cl.
CPC ............. *G21C 19/07* (2013.01); *G21F 5/012* (2013.01); *G21F 5/00* (2013.01); *G21F 5/005* (2013.01);
(Continued)

(58) Field of Classification Search
CPC ................. G21C 19/07; G21F 5/012
(Continued)

(56) References Cited

U.S. PATENT DOCUMENTS 1,415,274 A 5/1922 Stowell
1,973,372 A 9/1934 Clapp
(Continued)

FOREIGN PATENT DOCUMENTS

DE 3216855 11/1983
EP 0626699 11/1994
(Continued)

OTHER PUBLICATIONS http://www.easyrenovate.com/why-stagger-end-joints-on-subflooring/, 6 pages, accessed Jul. 4, 2011.
(Continued)

*Primary Examiner* — Jack W Keith
*Assistant Examiner* — Daniel Wasil
(74) *Attorney, Agent, or Firm* — The Belles Group, P.C.

(57) ABSTRACT

A fuel rack comprises a base plate and vertically-extending hexagonal tubes. Each tube defines a cell. A top surface of the base plate forms a floor of each cell. Adjustable height pedestals can be connected to a bottom surface of the base plate. Each pedestal includes a tool engagement portion in a top surface of a peg. Rotation of the peg causes pedestal height adjustment. Each peg is aligned with a hole in a cell floor. A tool can extend through the hole to adjust the height of the pedestal. Vertically elongated spacing rods are positioned in gaps between adjacent hexagonal tubes to maintain the gaps. Each spacing rod is plug welded to a corner edge of three adjacent hexagonal tubes at a juncture via holes located in the corner edges of each of the three adjacent hexagonal tubes.

13 Claims, 42 Drawing Sheets

Related U.S. Application Data division of application No. 14/590,506, filed on Jan. 6, 2015, now Pat. No. 10,026,514, which is a division of application No. 13/418,930, filed on Mar. 13, 2012, now Pat. No. 8,929,504, which is a division of application No. 11/851,352, filed on Sep. 6, 2007, now Pat. No. 8,135,107, application No. 17/083,582 is a continuation-in-part of application No. 15/671,830, filed on Aug. 8, 2017, now abandoned, which is a continuation of application No. 14/072,672, filed on Nov. 5, 2013, now Pat. No. 9,728,284, which is a continuation of application No. 12/260,914, filed on Oct. 29, 2008, now Pat. No. 8,576,976, application No. 17/083,582 is a continuation-in-part of application No. 16/442,892, filed on Jun. 17, 2019, now Pat. No. 10,939,787, which is a continuation of application No. 15/642,826, filed on Jul. 6, 2017, now Pat. No. 10,446,285, which is a continuation of application No. 13/731,803, filed on Dec. 31, 2012, now Pat. No. 9,728,286, which is a continuation of application No. 12/024,071, filed on Jan. 31, 2008, now Pat. No. 8,345,813.

(60) Provisional application No. 61/038,525, filed on Mar. 21, 2008, provisional application No. 60/983,566, filed on Oct. 29, 2007, provisional application No. 60/887,505, filed on Jan. 31, 2007, provisional application No. 60/842,868, filed on Sep. 6, 2006.

(51) Int. Cl.
*G21F 5/00* (2006.01)
*G21F 5/005* (2006.01)
*G21F 5/008* (2006.01)
*G21F 5/10* (2006.01)
*G21F 5/12* (2006.01)

(52) U.S. Cl.
CPC ............... *G21F 5/008* (2013.01); *G21F 5/10* (2013.01); *G21F 5/12* (2013.01)

(58) Field of Classification Search
USPC ........................................................ 376/272
See application file for complete search history.

(56) References Cited

U.S. PATENT DOCUMENTS

| | | |
|---|---|---|
| 2,426,943 A | 9/1947 | Morden |
| 2,671,242 A | 3/1954 | Lewis |
| 2,968,734 A | 1/1961 | Yeomans |
| 3,732,427 A | 5/1973 | Trudeau et al. |
| 3,844,886 A | 10/1974 | Crowther |
| 3,941,654 A | 3/1976 | Tarasuk et al. |
| 3,966,550 A | 6/1976 | Foulds et al. |
| 4,039,842 A | 8/1977 | Mollon |
| 4,044,267 A | 8/1977 | Bevliacqua |
| 4,084,363 A | 4/1978 | Moore |
| 4,096,392 A | 6/1978 | Rubinstein et al. |
| 4,119,859 A | 10/1978 | Karzmr et al. |
| 4,124,445 A | 11/1978 | Mollon |
| 4,143,276 A | 3/1979 | Mollon |
| 4,203,038 A | 5/1980 | Takahashi et al. |
| 4,218,622 A | 8/1980 | McMurtry et al. |
| 4,225,467 A | 9/1980 | McMurtry et al. |
| 4,287,145 A | 9/1981 | McMurtry et al. |
| 4,294,660 A | 10/1981 | Christiansen |
| 4,306,397 A | 12/1981 | Ramseyer |
| 4,326,918 A | 4/1982 | Lapides |
| 4,342,620 A | 8/1982 | Vickrey |
| 4,355,584 A | 10/1982 | White, Jr. |
| 4,356,062 A | 10/1982 | Bosshard |
| 4,366,115 A | 12/1982 | Schlumpf |
| 4,382,060 A | 5/1983 | Holtz et al. |
| 4,391,771 A | 7/1983 | Anthony |
| 4,399,366 A | 8/1983 | Bucholz |
| 4,436,693 A | 3/1984 | Zezza et al. |
| 4,581,201 A | 4/1986 | Haggstrom et al. |
| 4,610,893 A | 9/1986 | Eriksson et al. |
| 4,626,402 A | 12/1986 | Baatz et al. |
| 4,634,875 A | 1/1987 | Kugeler et al. |
| 4,666,659 A | 5/1987 | Lusk et al. |
| 4,704,539 A | 11/1987 | Dequesnes et al. |
| 4,746,487 A | 5/1988 | Wachter |
| 4,788,029 A | 11/1988 | Kerjean |
| 4,800,283 A | 1/1989 | Efferding |
| 4,804,516 A | 2/1989 | Thomazet et al. |
| 4,820,472 A | 4/1989 | Machado et al. |
| 4,914,679 A | 4/1990 | Tomiyama et al. |
| 4,930,650 A | 6/1990 | Wells |
| 4,972,087 A | 11/1990 | Neider et al. |
| 4,988,473 A | 1/1991 | Mueller et al. |
| 4,997,618 A | 3/1991 | Efferding |
| 5,009,837 A | 4/1991 | Nguyen et al. |
| 5,019,327 A | 5/1991 | Fanning et al. |
| 5,032,348 A | 7/1991 | Blum et al. |
| 5,063,299 A | 11/1991 | Efferding |
| 5,180,540 A | 1/1993 | Smentek |
| 5,198,183 A | 3/1993 | Newman |
| 5,232,657 A | 8/1993 | Kovacik et al. |
| 5,245,641 A | 9/1993 | Machado et al. |
| 5,291,532 A | 3/1994 | Townsend et al. |
| 5,361,281 A | 11/1994 | Porowski |
| 5,365,556 A | 11/1994 | Mallie |
| 5,384,813 A | 1/1995 | Loftis et al. |
| 5,416,813 A | 5/1995 | Hiraiwa et al. |
| 5,431,295 A | 7/1995 | Meess |
| 5,438,597 A | 8/1995 | Lehnert et al. |
| 5,479,463 A | 12/1995 | Roberts |
| 5,629,964 A | 5/1997 | Roberts |
| 5,651,038 A | 7/1997 | Chechelnitsky et al. |
| 5,715,289 A | 2/1998 | Kirchner et al. |
| 5,719,910 A | 2/1998 | Robert et al. |
| 5,839,874 A | 11/1998 | Johnston |
| 5,841,825 A | 11/1998 | Roberts |
| 5,885,048 A | 3/1999 | Barth |
| 5,887,042 A | 3/1999 | Akamatsu et al. |
| 5,898,747 A | 4/1999 | Singh |
| 5,914,994 A | 6/1999 | Wasinger et al. |
| 5,965,829 A | 10/1999 | Haynes et al. |
| 6,009,136 A | 12/1999 | Loftis et al. |
| 6,017,181 A | 1/2000 | Johnston |
| 6,042,779 A | 3/2000 | Oschmann et al. |
| 6,064,710 A | 5/2000 | Singh |
| 6,283,028 B1 | 9/2001 | Walczak |
| 6,327,321 B1 | 12/2001 | Holman |
| 6,328,524 B1 | 12/2001 | Johnston |
| 6,442,227 B1 | 8/2002 | Acovino, Jr. et al. |
| 6,625,246 B1 | 9/2003 | Singh et al. |
| 6,639,395 B2 | 10/2003 | Male |
| 6,665,365 B2 | 12/2003 | Dallongeville et al. |
| 6,741,669 B2 | 5/2004 | Lindquist |
| 6,823,034 B1 | 11/2004 | Doman et al. |
| 6,839,395 B2 | 1/2005 | Ohsono et al. |
| 6,878,952 B1 | 4/2005 | Ohsono et al. |
| 6,989,543 B2 | 1/2006 | Orobnik et al. |
| 7,096,600 B2 | 8/2006 | Singh |
| 7,186,993 B2 | 3/2007 | Timpert |
| 7,194,060 B2 | 3/2007 | Ohsono et al. |
| 8,135,107 B2 | 3/2012 | Singh et al. |
| 8,576,976 B2 | 11/2013 | Singh et al. |
| 8,630,384 B2 | 1/2014 | Carver et al. |
| 8,929,504 B2 | 1/2015 | Singh et al. |
| 9,728,286 B2 | 8/2017 | Singh |
| 10,026,514 B2 | 7/2018 | Singh et al. |
| 2002/0021779 A1 | 2/2002 | Murakami et al. |
| 2002/0118786 A1 | 8/2002 | Ohsono et al. |
| 2002/0163989 A1 | 11/2002 | Dallongeville et al. |
| 2003/0002614 A1 | 1/2003 | Matsunaga et al. |
| 2003/0010938 A1 | 1/2003 | Michels et al. |
| 2003/0140471 A1 | 7/2003 | Busnardo et al. |

(56) References Cited

U.S. PATENT DOCUMENTS

| | | |
|---|---|---|
| 2003/0179846 A1 | 9/2003 | Murakami et al. |
| 2004/0062338 A1 | 4/2004 | Ohsono et al. |
| 2004/0140307 A1 | 7/2004 | Canzler et al. |
| 2004/0156466 A1 | 8/2004 | Lindquist |
| 2005/0117687 A1 | 6/2005 | Carver et al. |
| 2005/0117688 A1 | 6/2005 | Ohsono et al. |
| 2005/0135541 A1 | 6/2005 | Ohsono et al. |
| 2005/0157833 A1 | 7/2005 | Ishihara et al. |
| 2005/0188523 A1 | 9/2005 | Busnardo et al. |
| 2005/0224729 A1 | 10/2005 | Tamaki |
| 2005/0286674 A1 | 12/2005 | Fischer et al. |
| 2006/0109945 A1 | 5/2006 | Ohsono et al. |
| 2007/0034541 A1 | 2/2007 | Danko et al. |
| 2007/0133734 A1 | 6/2007 | Fawcett et al. |
| 2007/0153965 A1 | 7/2007 | Choi et al. |
| 2008/0031396 A1 | 2/2008 | Singh et al. |
| 2008/0031397 A1 | 2/2008 | Singh et al. |
| 2008/0049886 A1 | 2/2008 | Lahille et al. |
| 2008/0069291 A1 | 3/2008 | Singh et al. |
| 2009/0172961 A1 | 7/2009 | Lahille |
| 2009/0175404 A1 | 7/2009 | Singh et al. |
| 2009/0185652 A1 | 7/2009 | Tamaki et al. |
| 2010/0183110 A1 | 7/2010 | Chiocca et al. |
| 2011/0033019 A1 | 2/2011 | Rosenbaum et al. |
| 2011/0038449 A1 | 2/2011 | Shin et al. |
| 2011/0122985 A1 | 5/2011 | Tamaki |
| 2012/0286486 A1 | 11/2012 | Varney et al. |
| 2015/0221402 A1* | 8/2015 | Singh ............... G21C 19/07 |
| | | 376/272 |

FOREIGN PATENT DOCUMENTS

| | | |
|---|---|---|
| GB | 1398348 | 6/1975 |
| JP | 01237499 | 9/1989 |
| JP | 0712985 | 1/1995 |
| JP | 07311291 | 11/1995 |
| JP | 2004156930 | 6/2004 |
| WO | WO2008/063708 | 5/2008 |

OTHER PUBLICATIONS

A. Machiels, Qualification of Metamic for Spent-Fuel Storage Application, EPRI Final Report Oct. 2001.

What is Metamic web article, http://www.metamic.com/whatismetamic.htm, copyright 2004, Metamic, LLC.

S.M. Barinov et al., Crack Resistance of Cermets Aluminum Oxide-Chromium, Institute of Metallurgy, Academy of Sciences of the USSR, No. 5 (341), pp. 98-101, May 1991.

Survey of wet and dry spent storage, Printed by IAEA Jul. 1999, Austria.

Kenneally, R. and Kessler, J., Behavior of spent fuel and safety related components in dry cask storage systems, Aug. 2001, pp. 1-8.

* cited by examiner

FUEL RACK FOR STORING SPENT NUCLEAR FUEL

CROSS-REFERENCE TO RELATED PATENT APPLICATIONS

The present application is a continuation-in-part of U.S. patent application Ser. No. 16/002,325, filed Jun. 7, 2018, which is a divisional of U.S. patent application Ser. No. 14/590,506 filed Jan. 6, 2015, now U.S. Pat. No. 10,026,514, which is a divisional of U.S. patent application Ser. No. 13/418,930, filed Mar. 13, 2012, now U.S. Pat. No. 8,929,504, which is a divisional of U.S. patent application Ser. No. 11/851,352, filed Sep. 6, 2007, now U.S. Pat. No. 8,135,107, which claims priority to U.S. Provisional Patent Application Ser. No. 60/842,868, filed Sep. 6, 2006.

The present application is a continuation-in-part of U.S. patent application Ser. No. 15/671,830, filed Aug. 8, 2017, which is a continuation application of U.S. patent application Ser. No. 14/072,672, filed Nov. 5, 2013, now U.S. Pat. No. 9,728,284, which in turn is a continuation application of U.S. patent application Ser. No. 12/260,914, filed Oct. 29, 2008, now U.S. Pat. No. 8,576,976, which in turn claims the benefit of U.S. Provisional Patent Application Ser. No. 60/983,566, filed Oct. 29, 2007 and U.S. Provisional Patent Application Ser. No. 61/038,525, filed Mar. 21, 2008.

The present application is a continuation-in-part of U.S. patent application Ser. No. 16/442,892, filed Jun. 17, 2019, which is a continuation of U.S. patent application Ser. No. 15/642,846 filed Jul. 6, 2017, now U.S. Pat. No. 10,446,285, which is a continuation of U.S. patent application Ser. No. 13/731,803 filed Dec. 31, 2012, now U.S. Pat. No. 9,728,286, which is a continuation of U.S. patent application Ser. No. 12/024,071, filed Jan. 31, 2008, now U.S. Pat. No. 8,345,813, which in turn claims the benefit of U.S. Provisional patent Application Ser. No. 60/887,505, filed Jan. 31, 2007.

The aforementioned priority applications are incorporated herein by reference in their entireties.

BACKGROUND OF THE INVENTION

In the operation of nuclear reactors, hollow zircaloy tubes filled with enriched uranium, known as fuel assemblies, are burned up inside the nuclear reactor core. It is necessary to remove these fuel assemblies from the reactor after their energy has been depleted to a predetermined level. Upon depletion and subsequent removal from the reactor, these spent nuclear fuel ("SNF") rods are still highly radioactive and produce considerable heat, requiring that great care be taken in their subsequent packaging, transporting, and storing. Specifically, the SNF emits extremely dangerous neutrons and gamma photons. It is imperative that these neutrons and gamma photons be contained at all times subsequent to removal from the reactor core.

It is necessary that the neutron and gamma radiation emitted from the spent fuel assemblies be adequately contained at all times upon being removed from the reactor. It is also necessary that the spent fuel assemblies be cooled. Because water is an excellent radiation absorber, spent fuel assemblies are typically submerged under water in a pool promptly after being removed from the reactor. The pool water also serves to cool the spent fuel assemblies by drawing the heat load away from the fuel assemblies. The water may also contain a dissolved neutron shielding substance.

The submerged fuel assemblies are typically supported in the fuel pools in a generally upright orientation in rack structures, commonly referred to as fuel racks. It is well known that neutronic interaction between fuel assemblies increases when the distance between the fuel assemblies is reduced. Thus, in order to avoid criticality (or the danger thereof) that can result from the mutual inter-reaction of adjacent fuel assemblies in the racks, it is necessary that the fuel racks support the fuel assemblies in a spaced manner that allows sufficient neutron absorbing material to exist between adjacent fuel assemblies. The neutron absorbing material can be the pool water, a structure containing a neutron absorbing material, or combinations thereof.

Fuel racks for high density storage of fuel assemblies are commonly of cellular construction with neutron absorbing plate structures (i.e., shields) placed between the cells in the form of solid sheets. The cells are usually long vertical square tubes which are open at the top through which the fuel elements are inserted. The cells are sometimes with double walls that encapsulate the neutron shield sheets to protect the neutron shield from corrosion or other deterioration resulting from contact with water.

Each fuel assembly is placed in a separate cell so that the fuel assemblies are shielded from one another. An example of a typical existing fuel rack is described in U.S. Pat. No. 4,382,060, to Maurice Holtz et al., issued May 3, 1983, the entirety of which is hereby incorporated by reference. The Holtz rack is comprised of structural elements including elements which are hollow and cruciform in section. Each leg of the cruciform structural element includes a neutron shield therein. The free end of the legs of the cruciform structural element converge so as to have an included angle of approximately 90 degrees. The rack is comprised of such cruciform elements as well as cooperating elements which are generally T and L shaped in section.

In certain regions of the world, the fuel assemblies used in the nuclear reactors do not have a rectangular horizontal cross-section. Instead, the fuel assemblies have a horizontal cross-section that is generally hexagonal. In such instances, existing racks having cells with rectangular horizontal cross-sections are less than optimal.

Even after removal from the pool, the fuel assemblies still emit extremely dangerous neutrons (i.e., neutron radiation) and gamma photons (i.e., gamma radiation) and it is thus still imperative that these neutrons and gamma photons be contained at all times during transfer and storage. It also imperative that the residual heat emanating from the fuel assemblies be lead away and escape from the fuel assemblies. Thus, containers used to transfer and/or store fuel assemblies must not only safely enclose and absorb the radioactivity of the fuel assemblies, they must also allow for adequate cooling. In the art, there are two type of container systems used to transport and/or store fuel assemblies, canister-based systems and cask-based systems.

Generally speaking, there are two types of casks used for the transportation and/or storage of SNF, ventilated vertical overpacks ("VVOs") and thermally conductive casks. VVOs typically utilized in conjunction with a sealable canister that is loaded with the fuel assemblies and positioned within a cavity of the VVO. Such canisters, which are often multi-purpose canisters, often contain a fuel basket for receiving the fuel assemblies. An example of a canister and basket assembly designed for use with a VVO is disclosed in U.S. Pat. No. 5,898,747 (Singh), issued Apr. 27, 1999, the entirety of which is hereby incorporated by reference. The second type of casks are thermally conductive casks. In a typical thermally conductive cask, the fuel assemblies are loaded directly into a cavity formed by the cask body. A basket assembly is typically provided within the cavity itself to provide support for the fuel assemblies.

The fuel basket generally acts in conjunction with the cask to support the fuel in a particular pattern, minimize load transfer to the fuel, transfer heat to the cask and control criticality.

In defueling a nuclear reactor, the SNF is removed from the reactor and placed under water, in what is generally known as a spent fuel pool or pond storage. The pool water facilitates cooling of the SNF and provides adequate radiation shielding. The SNF is stored in the pool for a period of time that allows the heat and radiation to decay to a sufficiently low level so that the SNF can be transported with safety. However, because of safety, space, and economic concerns, use of the pool alone is not satisfactory where the SNF needs to be stored for any considerable length of time. Thus, when long-term storage of SNF is required, it is standard practice in the nuclear industry to store the SNF in a dry state subsequent to a brief storage period in the spent fuel pool. Dry storage of SNF typically comprises storing the SNF in a dry inert gas atmosphere encased within a structure that provides adequate radiation shielding.

Systems that are used to store SNF for long periods of time in the dry state typically utilize a hermetically sealable and transportable canister or similar structure that serves as a vessel for the transfer and storage of the SNF. One such canister, known as a multi-purpose canister ("MPC"), is described in U.S. Pat. No. 5,898,747, to Krishna P. Singh, issued Apr. 27, 1999, the entirety of which is hereby incorporated by reference. Typically, the SNF is loaded into an open canister that is submerged under water in a fuel pool. Once loaded with SNF, the canister is removed from the pool, placed in a staging area, dewatered, dried, hermetically sealed and transported to a storage facility. An example of a canister drying method can be found in U.S. Pat. No. 7,096,600, to Krishna P. Singh, issued Aug. 29, 2006, the entirety of which is hereby incorporated by reference. Because a typical canister does not by itself provide the necessary radiation shielding properties, canisters are often positioned within large storage containers known as casks/overpacks during all stages of transportation and/or storage. An example of a canister transfer and storage operation can be found in U.S. Pat. No. 6,625,246, to Krishna P. Singh, issued Sep. 23, 2003, the entirety of which is hereby incorporated by reference.

A dry storage canister ("DSC") provides the confinement boundary for the stored SNF. Thus, the structural and hermetic integrity of the DSC is extremely important. An existing DSC is sold in the United States by Transnuclear, Inc. of Columbia, Maryland under the tradename NUHOMS. The NUHOMS DSC is a single-walled vessel with two top closure lids, including an inner top lid and an outer top lid. The closure lids are welded to a canister body after the SNF has been loaded into it. In the United States, the practice of using two closure lids to create a double confinement barrier only at the field welded closure location is motivated by the fact that field welds are generally less sound than those made in the factory.

However, in other countries, the creation of a double confinement barrier only at the field welded closure does not meet nuclear regulatory mandates. For example, Ukrainian regulatory practice calls for a double confinement boundary all around the SNF. To meet this dual-confinement requirement, the NUHOMS DSC comprises a hermetically-sealed fuel tube in which SNF rods in the form of a fuel bundle (half of a fuel assembly) is placed. These fuel tubes are positioned within the main cavity of the NUHOMS DSC. However, the body of the NUHOMS DSC remains a single-walled cylindrical vessel. The fuel tube concept of the NUHOMS DSC meets the basic Ukrainian regulation that a double confinement boundary exist all around the SNF. However, as will be discussed in greater detail below, it has been discovered that this design suffers from a number of significant drawbacks and engineering design flaws.

To protect the environment from radiation exposure, spent nuclear fuel is both transported and stored in large cylindrical containers called casks. A transfer cask is used to transport spent nuclear fuel between locations while a storage cask is used to store spent nuclear fuel for a determined period of time. Casks are typically designed to shield the environment from the dangerous radiation in two ways. First, shielding of gamma radiation requires large amounts of mass. Gamma rays are best absorbed by materials with a high atomic number and a high density, such as concrete, lead, and steel. The greater the density and thickness of the blocking material, the better the absorption/shielding of the gamma radiation. Second, shielding of neutron radiation requires a large mass of hydrogen-rich material. One such material is water, which can be further combined with boron for a more efficient absorption of neutron radiation.

The transfer cask must perform the vital function of providing adequate radiation shielding for both neutron and gamma radiation emitted by the enclosed spent nuclear fuel. The transfer cask must also be designed to provide adequate heat transfer. Guided by the shielding principles discussed above, transfer casks are made of lead or a gamma absorbing material and contain a neutron absorbing material as well. As stated previously, greater radiation shielding is provided by increased thickness and density of the gamma and neutron absorbing materials. The weight of a fully loaded transfer cask is typically in the range of 100-125 tons.

Similarly, storage casks are designed to be large, heavy structures made of steel, lead, concrete and an environmentally suitable hydrogenous material. However, because storage casks are not handled as much as transfer casks, the primary focus in designing a storage cask is to provide adequate radiation shielding for the long-term storage of spent nuclear fuel. Size and weight are at best secondary considerations. As a result of maximizing the thickness of radiation absorbing materials, the weight and size of storage casks often cause problems associated with lifting and handling. Typically, storage casks weigh approximately 150 tons and have a height greater than 15 ft. A common problem is that storage casks cannot be lifted by nuclear power plant cranes because their weight exceed the rated capacity of the crane.

A common problem arises when the fully loaded transfer cask must be transported to the storage cask for the canister transfer procedure. Generally, the storage cask is located in a truck bay, or other location outside of the staging area. To get to the transfer cask, the storage cask may have to pass through a door of a nuclear plant's truck bay. The doors are typically 17-24 feet tall. The transfer casks are typically about 16 feet and 3 inches tall. The need to move casks into and out of enclosed facilities limits the size and shape of machines that can be used to move the casks. For example, a low ceiling in such a facility makes it impractical to use a boom or overhead crane to lift and transport casks. Similarly, a doorway not much larger than the cask itself limits the extent to which a lifting device can extend beyond the sides, top or bottom of the cask. Thus, a need exists for a low profile transporter that can withstand the weight of the storage cask.

SUMMARY OF THE INVENTION

In one aspect, the invention can be a fuel rack having an array of cells for holding fuel assemblies comprising: a base plate having a top surface; a plurality of tubes, each tube having an inner surface that forms one of the cells; and the tubes connected to the top surface of the base plate in a substantially vertical orientation and in a pattern so that one or more of the cells are formed by outside surfaces of the adjacent tubes.

In another aspect, the invention can be a fuel rack for supporting fuel assemblies comprising: a plurality of hexagonal tubes having an internal cavity; a base plate having a top surface; the hexagonal tubes connected to the top surface of the base plate in a substantially vertical orientation and spaced from one another so that a flux trap space exists between all adjacent hexagonal tubes; and a plurality of spacers positioned in the flux trap spaces for maintaining the existence of the flux trap spaces, the spacers connected to the hexagonal tubes.

In yet another aspect, the invention can be a fuel rack having an array of cells for holding fuel assemblies comprising a plurality of slotted plates that are slidably interlocked with one another to form the array of cells.

In another aspect, the invention can be a fuel basket having a honeycomb-like grid that forms a plurality of substantially vertically oriented elongated cells. Most preferably, the basket assembly comprises one or more flux traps and is positioned within the cavity. The basket assembly can be constructed of a metal matrix composite material. In one embodiment, the basket assembly may utilize variable flux traps to maximize packing density. In such an embodiment, as the periphery of the basket assembly is approached, the width of the flux traps may decrease. In another embodiment, the basket assembly may utilize tubular elements of varying heights in a vertically staggered formation so that no two adjacent cells have interfaces which are vertically aligned.

In a further aspect, the invention can be an apparatus for supporting radioactive fuel assemblies comprising: a grid of cells for housing radioactive fuel assemblies, the grid formed by a plurality of hexagonal tubes having an outer surface and an inner surface that forms one of the cells, the plurality of hexagonal tubes arranged in an adjacent manner and in a pattern so that one or more of the cells is a resultant cell formed by the outside surfaces of surrounding hexagonal tubes.

In a yet further aspect, the invention can be an apparatus for supporting radioactive fuel assemblies comprising: a grid of cells for housing radioactive fuel assemblies, the grid formed by a plurality of tubes having inner surfaces that form the cells, the tubes arranged in an axially aligned and adjacent manner; each of the tubes formed by a plurality of tubular segments stacked in axial alignment, an interface formed between the adjacent tubular segments of each tube; and wherein the lengths of the tubular segments and the pattern in which the tubes are arranged to form the grid is such that none of the interfaces of adjacent tubes are aligned with one another.

In a still further aspect, the invention can be an apparatus for supporting radioactive fuel assemblies comprising: a bottom section comprising a plurality of bottom tubular segments of varying length, the bottom tubular segments arranged in an axially adjacent manner and in a pattern so that no two adjacent bottom tubular segments are the same length, the bottom edges of the bottom tubular segments being aligned; at least one middle section comprising a plurality of middle tubular segments of equal length, the middle section stacked atop the bottom section so that the middle tubular segments are axially aligned with the bottom tubular segments and the bottom edges of the middle tubular segments abut the top edges of the bottom tubular segments; and a top section comprising a plurality of top tubular segments of varying length, the top section stacked atop the middle section so that the top tubular segments are axially aligned with the middle tubular segments, the bottom edges of the top tubular segments abut the top edges of the bottom tubular segments, and the top edges of the top tubular segments are aligned.

In even another aspect, the invention can be a fuel rack having a grid of cells for holding fuel assemblies comprising: a base plate having a top surface; a plurality of hexagonal tubes, each hexagonal tube having inner surfaces that forms one of the cells; and the hexagonal tubes connected to the top surface of the base plate in a substantially vertical orientation and in a pattern so that one or more of the cells are formed by outside surfaces of the adjacent hexagonal tubes.

In yet another aspect, the invention can be a fuel rack having a grid of cells for holding fuel assemblies comprising: a base plate having a top surface; a plurality of tubes, each tube having an inner surface that forms one of the cells; and the tubes connected to the top surface of the base plate in a substantially vertical orientation and in a pattern so that one or more of the cells are formed by outside surfaces of the adjacent tubes.

In still another aspect, the invention can be a fuel rack for supporting fuel assemblies comprising: a plurality of hexagonal tubes having an internal cavity; a base plate having a top surface; the hexagonal tubes connected to the top surface of the base plate in a substantially vertical orientation and spaced from one another so that a flux trap space exists between all adjacent hexagonal tubes; and a plurality of spacers positioned in the flux trap spaces for maintaining the existence of the flux trap spaces, the spacers connected to the hexagonal tubes.

In another aspect, the invention can be a fuel rack for supporting fuel assemblies comprising: a plurality of tubes having an internal cavity; a base plate having a top surface; the tubes connected to the top surface of the base plate in a substantially vertical orientation and spaced from one another so that a flux trap space exists between all adjacent tubes; and a plurality of spacers positioned in the flux trap spaces for maintaining the existence of the flux trap spaces, the spacers connected to the tubes.

In a still further aspect, the invention can be a fuel rack having perimeter cells and non-perimeter cells for supporting fuel assemblies comprising: a base plate having a top surface; a plurality of hexagonal tubes, each hexagonal tube having inner surfaces that form one of the perimeter cells or the non-perimeter cells; and the hexagonal tubes connected to the top surface of the base plate in a substantially vertical orientation and in a pattern so that every third non-perimeter cell is formed by outside surfaces of six surrounding hexagonal tubes.

In yet another aspect, the invention can be a fuel basket for supporting radioactive fuel assemblies comprising: a plurality of tubes having an internal cavity for receiving a radioactive fuel assembly; the tubes arranged in a substantially vertical orientation and spaced from one another so that a flux trap space exists between all adjacent tubes, the tubes forming a storage grid having a central axis and a perimeter; a plurality of spacers positioned in the flux trap spaces for maintaining the existence of the flux trap spaces;

and wherein the width of the flux trap space between adjacent tubes decreases with distance from the central axis of the storage grid.

In an even further aspect, the invention can be a fuel rack for supporting spent nuclear fuel assemblies comprising: a base plate having a top surface; a fuel rack body extending upward from the base plate and comprising a plurality of cells, each of the cells having an open top end and being configured to receive a spent nuclear fuel assembly, and wherein for each of the cells, a portion of an upper surface of the base plate forms a floor of the cell; a plurality of adjustable height pedestals connected to a bottom surface of the base plate, each of the adjustable height pedestals comprising: a block having a hole defined by a threaded inner surface, the block fixedly coupled to the base plate; a peg having a threaded outer surface, the threaded outer surface of the peg threadily engaged to the threaded inner surface of the block; an engagement element in a top surface of the peg; and wherein upon a tool engaging the engagement element and rotating the peg, the extent the peg protrudes from a bottom surface of the block is adjusted; and wherein for each of the adjustable height pedestals, the adjustable height pedestal is coupled to the base plate so that the engagement element is aligned with and is accessible via a hole in the floor of one of the cells.

In one aspect, the invention can be a canister for storing and/or transporting spent nuclear fuel rods comprising: a first shell forming a cavity for receiving spent nuclear fuel rods; a first plate connected to the first shell so as to form a floor of the cavity; a first lid enclosing the cavity; the first shell, the first plate and the first lid forming a first hermetic containment boundary about the cavity; a basket for supporting a plurality of spent nuclear fuel rods positioned within the cavity; a second shell surrounding the first shell so that an inner surface of the second shell is in substantially continuous surface contact with an outer surface of the first shell; a second plate connected to the second shell; a second lid; and the second shell, the second plate and the second lid forming a second hermetic containment boundary that surrounds the first radiation containment boundary.

In another aspect, the invention can be a canister apparatus for storing and/or transporting spent nuclear fuel rods comprising: a first pressure vessel comprising a first shell forming a first cavity for receiving spent nuclear fuel rods, a first plate connected to the first shell so as to enclose a first end of the first cavity, and a first lid connected to the first shell so as to enclose a second end of the first cavity; a second pressure vessel comprising a second shell forming a second cavity, a second plate connected to the second shell so as to enclose a first end of the second cavity, and a second lid connected to the second shell so as to enclose a second end of the second cavity; and the first pressure vessel located within the second cavity so that an inner surface of the second shell is in substantially continuous surface contact with an outer surface of the first shell.

In yet another aspect, the invention can be a canister apparatus for storing and/or transporting spent nuclear fuel rods comprising: a first metal pressure vessel having an outer surface and forming a cavity for receiving spent nuclear fuel rods; a second metal pressure vessel having an inner surface; and the first pressure vessel located within the second pressure vessel so that a substantial entirety of the outer surface of the first metal pressure vessel is in substantially continuous surface contact with the inner surface of the second metal pressure vessel.

In still another aspect, the invention can be a canister apparatus for storing and/or transporting spent nuclear fuel rods comprising: a first structural assembly forming a cavity for receiving spent nuclear fuel rods, the first structural assembly forming a first gas-tight containment boundary surrounding the cavity; a second structural assembly surrounding the first structural assembly, the second structural assembly forming a second gas-tight containment boundary surrounding the cavity; and wherein the first structural assembly and second structural assembly are in substantially continuous surface contact with one another.

In yet another aspect, the invention can be a basket apparatus for supporting a plurality of spent nuclear fuel rods within a containment structure comprising: a plurality of disk-like grates, each disk-like grate having a plurality of cells formed by a gridwork of beams; and means for supporting the disk-like grates in a spaced arrangement with respect to one another and so that the cells of the disk-like grates are aligned.

In a further aspect, the invention can be a basket apparatus for supporting a plurality of spent nuclear fuel rods within a containment structure comprising: a disk-like grate having a ring-like structure encompassing a gridwork of beams; the gridwork of beams comprising a first series of parallel beams, a second series of parallel beams and a third series of parallel beams; and wherein the first, second and third series of parallel beams are arranged in the ring-like structures so as to intersect and form a plurality of cells.

In another aspect, the invention can be a basket apparatus for supporting a plurality of spent nuclear fuel rods within a containment structure comprising: a disk-like grate having a ring-like structure encompassing a gridwork of beams; and the gridwork of beams forming a first set of cells having a first shape and a second set of cells having a second shape.

In one aspect, the invention can be an apparatus for translating a nuclear waste storage cask comprising: a body for supporting a cask; and at least two rollers adapted to move between a retracted position and an extended position, wherein when the rollers are in the retracted position, the rollers do not contact a ground surface.

In another aspect the invention can be an apparatus for translating a cask comprising: a body comprising a top surface, an open top end and a cavity for receiving a cask, at least one support member for supporting a cask close to a ground surface; and rollers for translating the apparatus.

In a yet further aspect the invention can be A system for translating spent nuclear fuel comprising: an apparatus for supporting and translating a cask comprising: a body having an open top end and a cavity for receiving a cask; and at least two rollers adapted to move between a retracted position and an extended position; a cask positioned in the cavity, wherein the cask is supported close to a ground surface.

In another aspect the invention can be a method of supporting and translating a storage cask comprising the steps of: (a) providing an apparatus comprising: a body for supporting a cask; and at least two rollers adapted to move between a retracted position and an extended position. (b) placing a cask onto the body of the apparatus; (c) loading spent nuclear fuel into the cask; (c) moving the rollers of the apparatus into the extended position; and (d) translating the apparatus.

In yet another aspect, the invention can be a system for translating high level radioactive waste across a ground surface, the system comprising: a cask loaded with high level radioactive waste; an apparatus comprising: a body having a cavity having an open top end; and a plurality of rollers coupled to the body to be adjustable between: (1) an extended position in which the plurality of rollers contact the ground surface and support the body above the ground surface; and (2) a retracted position in which the plurality of rollers do not contact the ground surface and the body contacts the ground surface; and the cask positioned in the cavity, the cask supported above the ground surface by the apparatus when the plurality of rollers are in the extended position.

In still another embodiment, the invention can be a system for translating high level radioactive waste across a ground surface, the system comprising: a cask loaded with high level radioactive waste; an apparatus comprising: a body having a cavity having an open top end; a plurality of rollers coupled to the body; and at least one contact member coupled to the body and extending into the cavity; a lower portion of the cask positioned in the cavity so that the cask rests atop the at least one contact member and is above the ground surface, an upper portion of the cask protruding from the open top end of the cavity.

In a further embodiment, the invention can be a system for translating high level radioactive waste across a ground surface, the system comprising: a cask loaded with high level radioactive waste; an apparatus comprising: a body having a cavity having an open top end; and a plurality of rollers coupled to the body; the cask supported by the apparatus above the ground surface so that a lower portion of the cask is positioned within the cavity and an upper portion of the cask protrudes from the open top end of the cavity

BRIEF DESCRIPTION OF THE DRAWINGS

The present invention will become more fully understood from the detailed description and the accompanying drawings, wherein like elements are labeled similarly and in which:

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a whole figure number (e.g. FIG. 1) shall be construed to be a reference to all subpart figures in the group (e.g. FIGS. 1A, 1B, etc.) unless otherwise indicated.

DETAILED DESCRIPTION OF THE DRAWINGS

Figure 1:
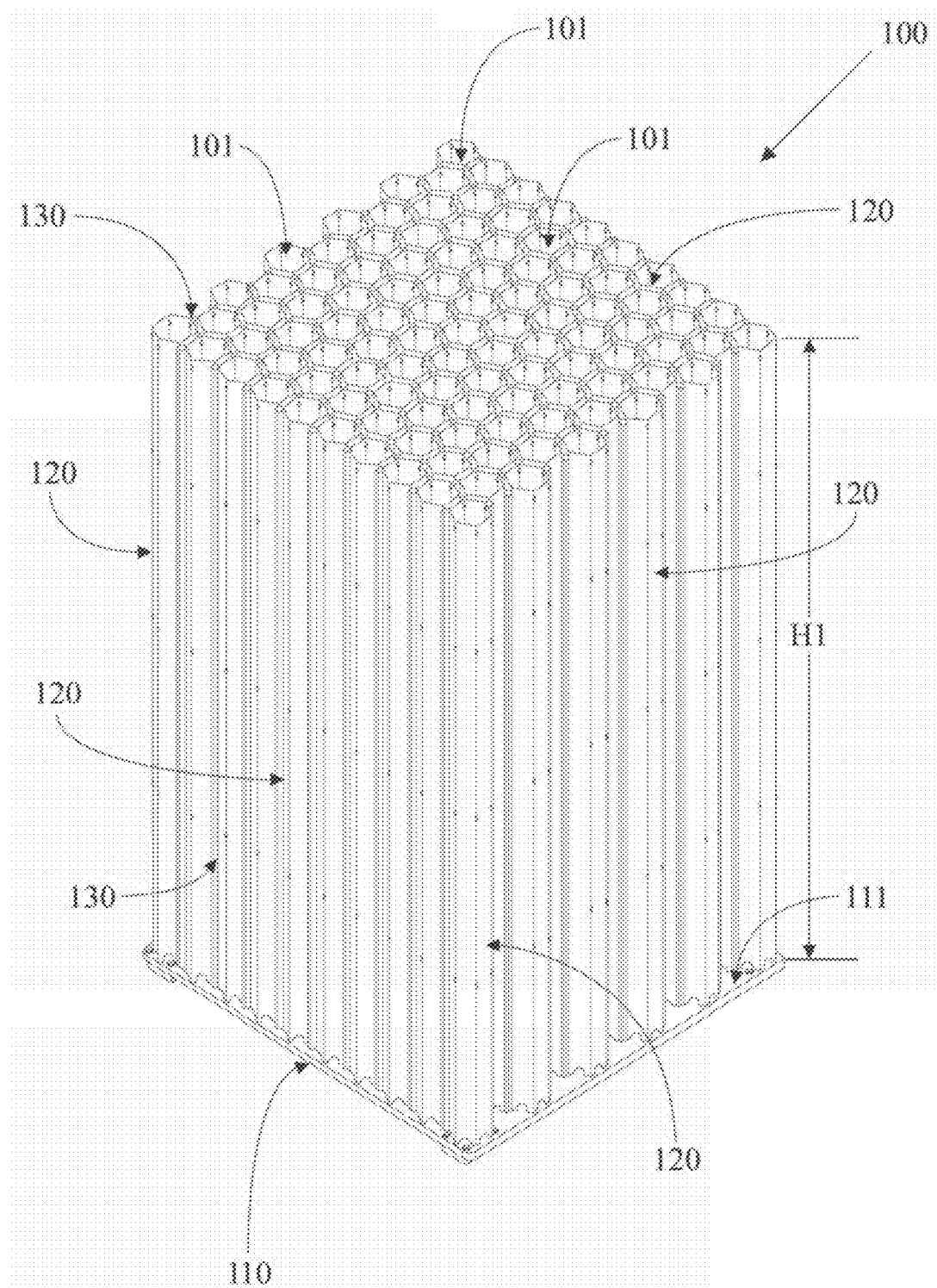
FIG. 1 is a top perspective view of a fuel rack according to one embodiment of the invention.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Multiple inventive concepts are described herein and are distinguished from one another using headers in the description that follows. Specifically, FIGS. 1-24 are relevant to a first inventive concept, FIGS. 25-33 are relevant to a second inventive concept, and FIGS. 34-42 are relevant to a third inventive concept. The first through third inventive concepts should be considered in isolation from one another. It is possible that there may be conflicting language or terms used in the description of the first through third inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-25, a first inventive concept will be described.

I. Flux Trap Fuel Rack Embodiment

Referring to FIG. 1, a perspective view of a fuel rack 100 according to one embodiment of the present invention is disclosed. The fuel rack 100 is a cellular, upright, prismatic module. The illustrated embodiment of the fuel rack 100 is specifically designed to accommodate hexagonal fuel assemblies, such as VVER 1000 fuel assemblies. To this extent, each cell 101 of the fuel rack 100 is also generally hexagonal in shape (i.e., have a hexagonal horizontal cross-section) so as to geometrically accommodate a single hexagonal fuel assembly. However, it is to be understood that the concepts of the present invention can be modified to accommodate any shaped fuel assembly, including rectangular, octagonal, round, etc.

In describing the fuel rack 100 and its component parts below, relative terms such as top, bottom, above, below, horizontal, vertical upper and lower will be used in relation to the fuel rack 100 being in the illustrated substantially vertical orientation of FIG. 1. Additionally, in order to avoid clutter in the drawings, only a few of each component are numbered with the understanding that the reader will be able to identify duplicate elements.

Figure 2:
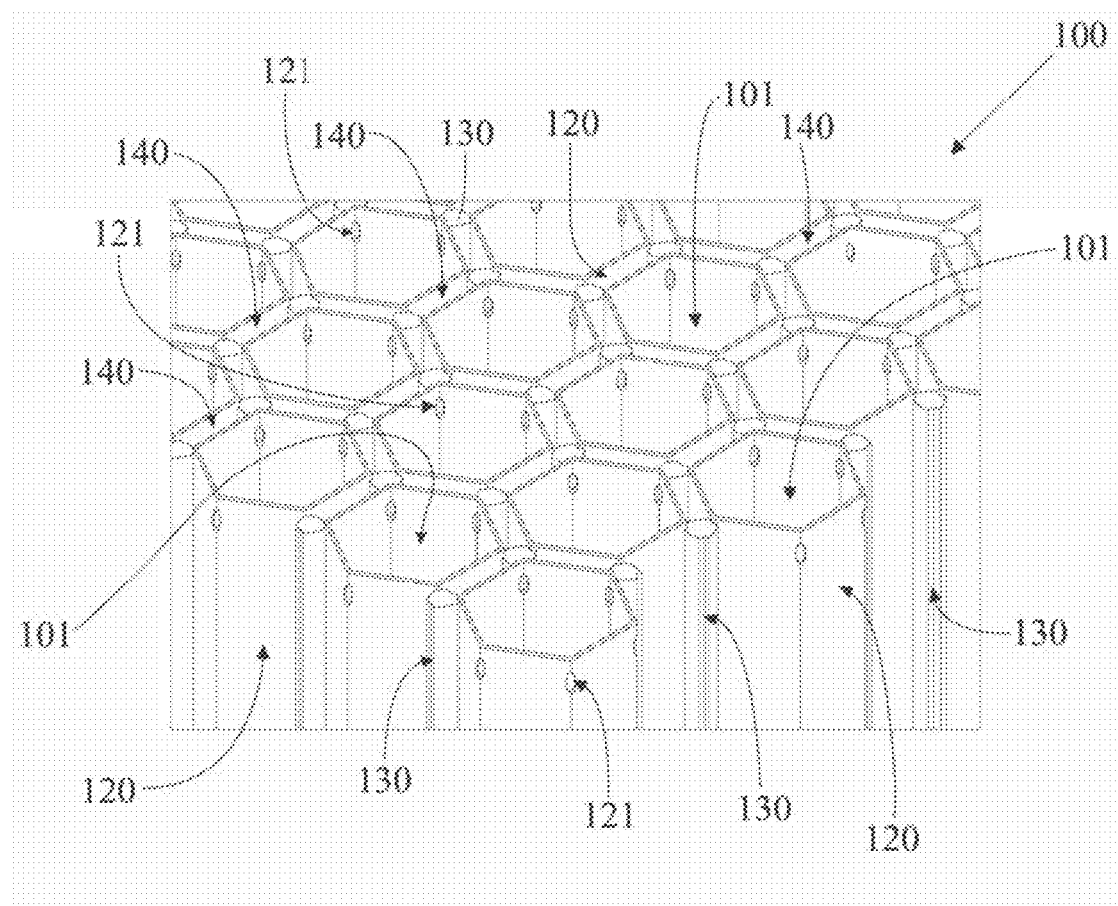
FIG. 2 is a close up view of a top portion of the fuel rack of FIG. 1.

The fuel rack 100 generally comprises a base plate 110, a plurality of hexagonal tubes 120, and a plurality of spacing rods 130 (best visible in FIG. 2). The hexagonal tubes 120 are connected to the top surface 111 of the base plate 110 in a substantially vertical orientation. In this embodiment, the axis of each hexagonal tube 120 is not only substantially vertical but also substantially perpendicular to the top surface 111 of the base plate 110. The connection between the hexagonal tubes 120 and the base plate 110 is achieved by welding the bottom edge of the hexagonal tubes 120 to the top surface of the base plate 110. Of course, other connection techniques can be utilized with minor modification, including mechanical connections such as bolting, clamping, threading, etc.

The top ends of the hexagonal tubes 120 remain open so that a fuel assembly can be slid into the internal cavity 101 (also referred to as a cell) formed by the inner surfaces of the hexagonal tubes 120. Each hexagonal tube 120 can be a single-part tube that extends the entire desired height $H_1$ or can be constructed of multiple partial height tubes that together add up to the desired height $H_1$. It is preferred that the height $H_1$ be sufficient so that the entire height of the fuel assembly is within the hexagonal tube 120

The hexagonal tubes 120 are connected to the rectangular base plate 110 in an adjacent and spaced pattern to form a honeycomb-like grid of the cells 101. The cells 101 are substantially vertical elongated cavities for receiving the radioactive fuel assemblies via their open top ends. While a generally rectangular gridwork of cells 101 is illustrated, the fuel rack 100 can be designed to take on any desired shape. The geometric arrangement of the hexagonal tubes 120 will be discussed in greater detail below with respect to FIGS. 2-3.

The hexagonal tubes 120 preferably constructed of a metal-matrix composite material, and more preferably a discontinuously reinforced aluminum/boron carbide metal matrix composite material, and most preferably a boron impregnated aluminum. One such suitable material is sold under the tradename Metamic™. The hexagonal tubes 120 perform the dual function of reactivity control as well as structural support. The base plate 110 is preferably constructed of a metal that is metallurgically compatible with the material of which the hexagonal tubes 120 are constructed for welding.

Figure 3:
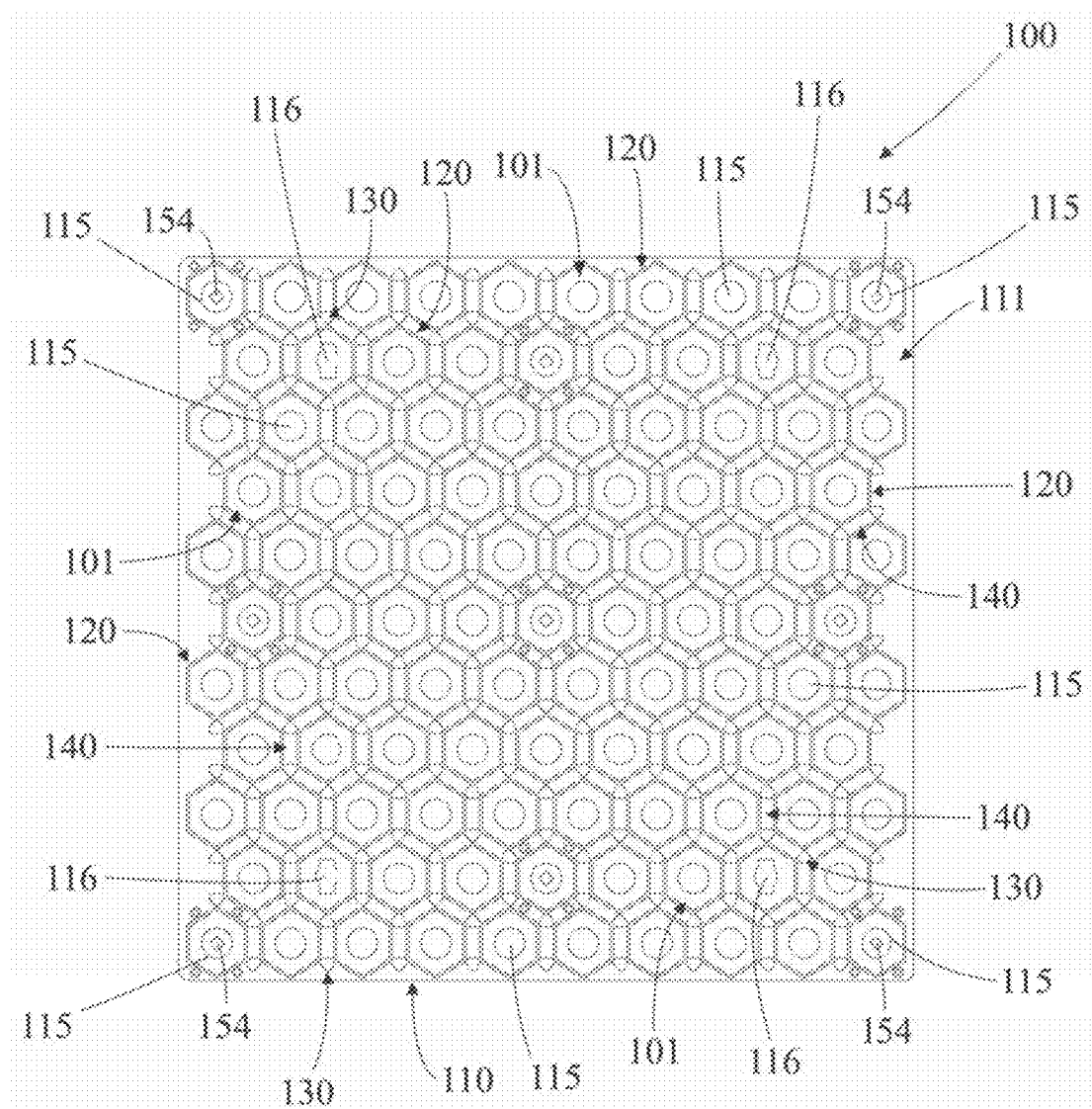
FIG. 3 is a top view of the fuel rack of FIG. 1.

Referring now to FIGS. 2-3 concurrently, each hexagonal tube 120 is arranged so as to be spaced from all adjacent hexagonal tubes 120 so that a gap 140 exists between each hexagonal tube 120 and its immediately adjacent hexagonal tubes 120. The gap 140 acts a neutron flux trap that decreases and/or eliminates the danger of criticality. The flux trap space 140 can be designed to be any desired width and the exact width will depend on the radiation levels of the fuel assemblies to be stored, the material of construction of the tubes 120, and properties of the pool water in which the fuel rack 100 will be submerged. In one embodiment, the flux trap spaces 140 will have a width between 30 and 50 millimeters and more preferably between 25 to 35 millimeters and most preferably about 38 millimeters.

Spacers, which are in the form of spacing rods 130 in the illustrated embodiment, are inserted into the flux trap spaces 140 so as to maintain the existence of the flux trap spaces 140 at the desired width and to provide added structural stability. While the spacers are illustrated as elongated rods 130 that extend the entire height $H_1$ of the hexagonal tubes 120, the spacers are not so limited and can take on a wide variety of shapes and sizes. For example, the spacers could be merely blocks or pins if desired in some embodiments.

A spacing rod 130 is positioned at the juncture between the edges of three adjacent hexagonal tubes 120. Thus, each spacing rod 130 (with the exception of those spacing rods 130 along the perimeter) contacts three hexagonal tubes 120. For added integrity and ease of construction, the spacing rods 130 have three axial grooves along their length that act as nesting volumes for receiving the edge of the hexagonal tubes 120. In the illustrated embodiment, the spacing rods 130 have a horizontal cross-section that is generally in the shape of a truncated triangle, wherein a nesting groove is formed into each truncated apex. Of course, the spacing rods 130 can take on other shapes with or without the grooves.

The spacing rods 130 are preferably made of aluminum or a metal matrix material, such as boron impregnated aluminum. The spacing rods 130 are plug welded to the hexagonal tubes 120 in which they are in contact with via elongated holes 121 located at the edges/corners or the hexagonal tubes 120. The shape, location and number of plug weld holes 120 will vary depending on design considerations and is in no way limiting of the present invention. The plug holes 121 are uniformly on each corner the hexagonal tubes 120 to facilitate uniform manufacture but this is not necessary. The plug holes 121 can be formed by punching, cutting, or during a molding process.

Figure 4:
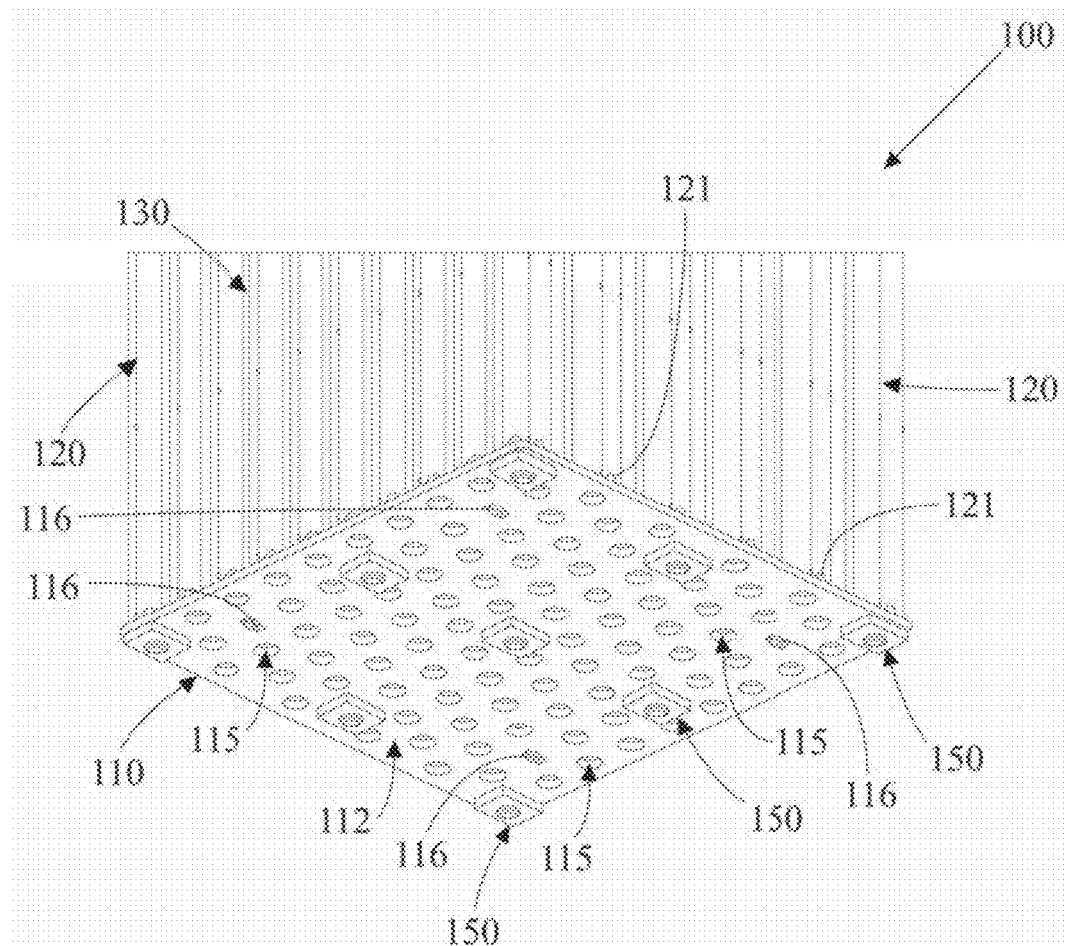
FIG. 4 is a bottom perspective view of the fuel rack of FIG. 1.

Referring now to FIGS. 3-4 concurrently, the base plate 110 also comprises a plurality of flow holes 115 extending through the base plate 110 from its bottom surface 112 to its top surface 111. Similarly, the base plate 110 also comprises four oblong holes 116 (second row in from the corners) for lifting and installing the fuel rack 100 within the fuel pool. A special lifting beam with four long reach rods is used to interact with the oblong holes 116 to grapple the fuel rack 100 and place it in the pool.

The flow holes 115 (and oblong holes 116) create passageways from below the base plate 100 into the cells 101 formed by the hexagonal tubes 120. Preferably, a single flow hole 115 is provided for each cell 101. The flow holes 115 are provided as inlets to facilitate natural thermosiphon flow of pool water through the cells 101 when fuel assemblies having a heat load are positioned therein. More specifically, when heated fuel assemblies are positioned in the cells 101 in a submerged environment, the water within the cells 101 surrounding the fuel assemblies becomes heated, thereby rising due to increased buoyancy. As this heated water rises and exist the cells 101 via their open top ends, cool water is drawn into the bottom of the cells 101 via the flow holes 115. This heat induced water flow along the fuel assemblies then continues naturally.

Figure 5:
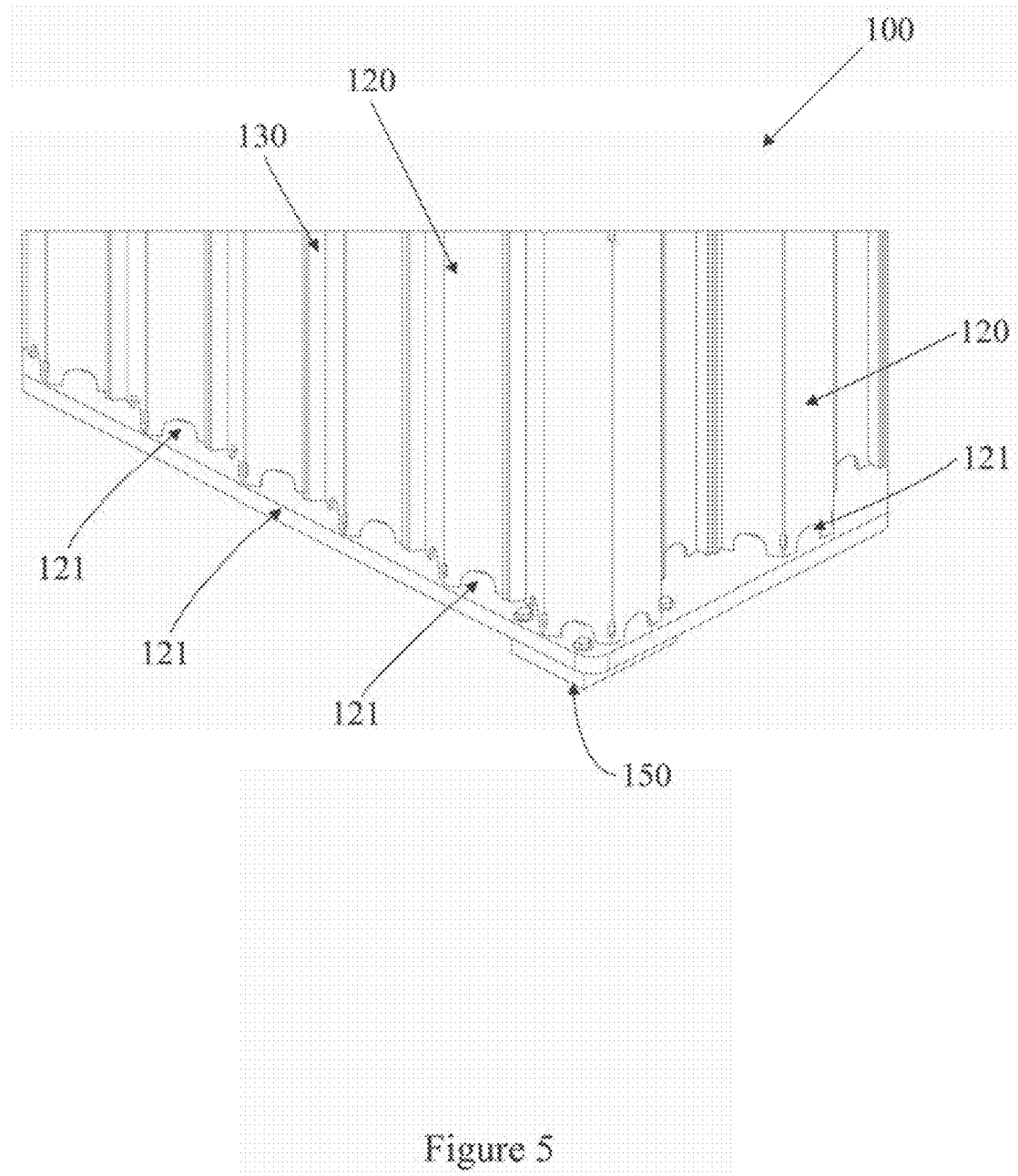
FIG. 5 is a close-up view of a bottom corner of the fuel rack of FIG. 1.

As can best be seen in FIG. 5, a plurality of auxiliary cutouts/holes 121 are provided in the hexagonal tubes 120 at or near their bottom edge. The auxiliary holes 121 act as additional inlet openings for incoming pool water to facilitate the thermosiphon flow during the cooling process. Moreover, as will be described below, the flow holes 115 of certain cells 101 are blocked by the attachment of adjustable height pedestals 150. The auxiliary holes 121 of the hexagonal tubes 120 that form these cells 101 are thus the sole source of incoming cool water for fuel assemblies stored therein. While an auxiliary hole 121 is provide din each face of each and every hexagonal tube 120 in the fuel rack 100, it is to be understood that this may not be necessary in all instances.

As a side note, the flow holes 115 (and holes 116) perform an additional function of providing an access-way into to the cells 101 for a "goose-neck welder" for welding the hexagonal tubes 120 to the top surface of the base plate 110.

Referring back to FIGS. 3-4, the base plate 110 also comprises a plurality of adjustable height pedestals 150 connected to the bottom surface 112 of the base plate 110. The adjustable height pedestals 150 ensure that a space exists between the floor of the fuel pool and the bottom surface 112 of the base plate 110, thereby creating an inlet plenum for water to flow through the flow holes 115.

The adjustable height pedestals 150 are spaced to provide uniform support of the base plate 110 and thus the fuel rack 100. Each pedestal 150 is individually adjustable to level and support the rack on a non-uniform spent fuel pool floor. The pedestals 150 are bolted to the base plate 110. Of course, if desired, the pedestals 150 can be attached top the base plate 110 by other means, including welding or threading. In the event of welded pedestal 15, an explosion-bonded stainless-Aluminum plate may be used to make the transition. For a welded pedestal, the bolts and bolt holes are eliminated.

Figure 6A:
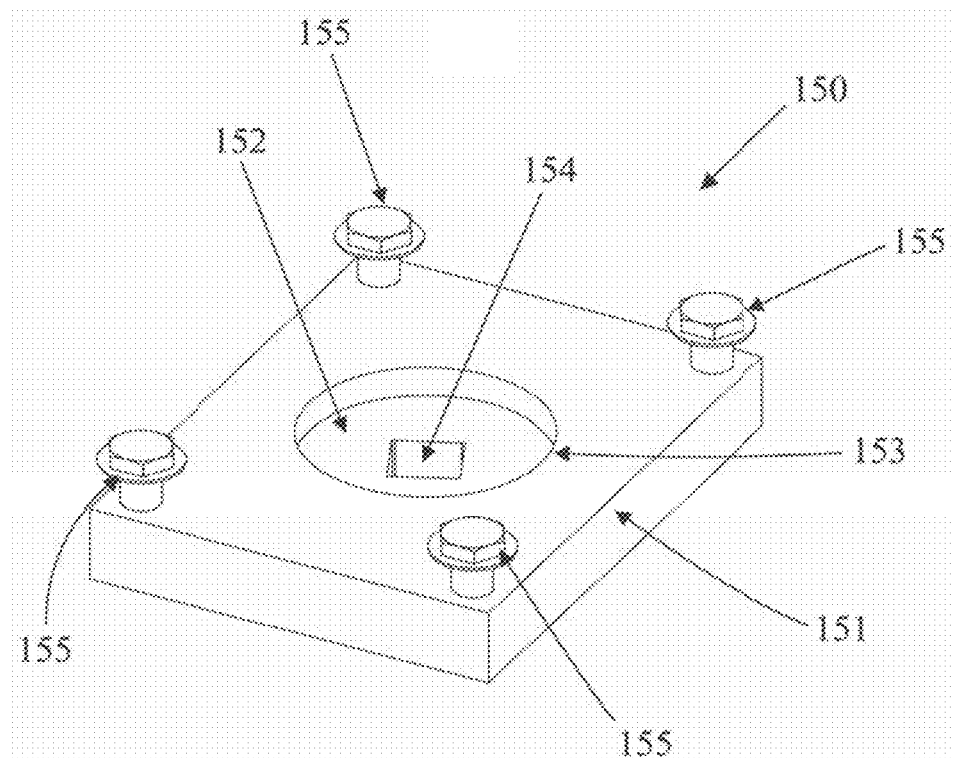
FIG. 6A is a top perspective view of an adjustable height pedestal removed from the fuel rack of FIG. 1.
Figure 6B:
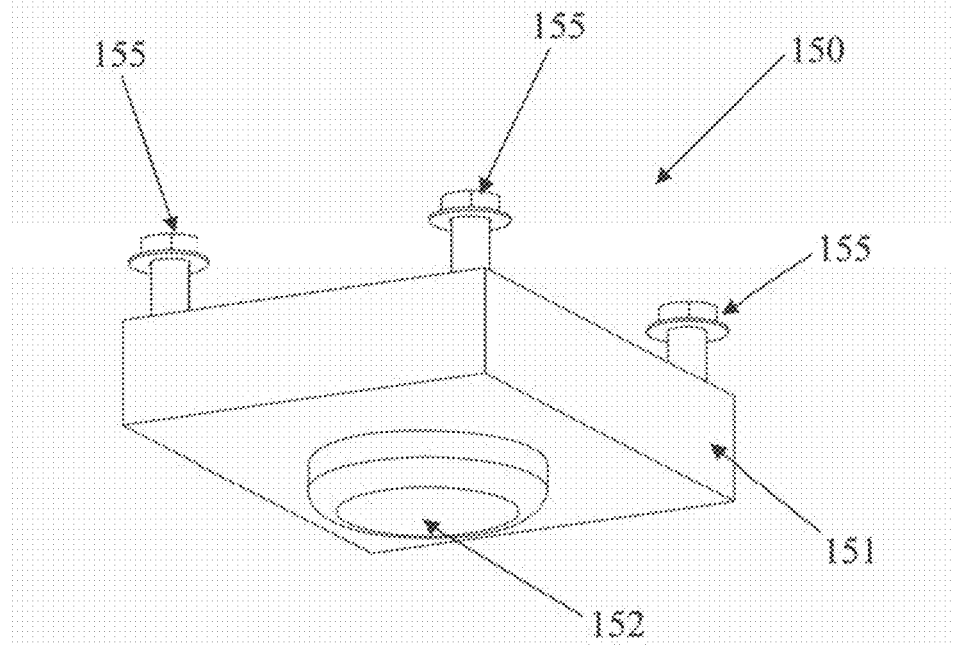
FIG. 6B is a bottom perspective view of the adjustable height pedestal of FIG. 6A.

Referring now to FIGS. 6A-6B, the construction details of the adjustable height pedestals 150 will be described. Each of the adjustable height pedestals 150 comprises a block 151 and a cylindrical peg 152 that acts as the foot. The block 152 is connected to the base plate 110 via bolts 155.

The block 151 comprises a central hole 153 which has a threaded inner surface (not visible). Similarly, the outer surface of a portion of the peg 151 is also threaded with corresponding threads. The peg 152 is inserted into the hole 153 and threadably engaged therein to the block 151.

The peg 152 also comprises a rectangular depression 154 in its top surface for receiving a tool for turning the peg 152.

Of course, the depression can be any shape that will facilitate rotational engagement with a tool. Moreover, other means for engaging and turning the peg 152 can be sued including a tab, a screw head, a bolt head, etc.

Because of the threaded connection between the peg 152 and the block 151, turning the peg 152 via the depression 154 results in increasing or decreasing the height the peg 152 protrudes from the bottom surface of the block 151. Adjustment of the peg 152 is facilitated by a long-handled tool that is inserted into the cell 101. The depression 154 of the peg 152 is accessible through the flow hole 115 in that cell 101 (see FIG. 3).

The bottom portion of the peg 152 has a rounded edge to prevent catching and tearing of the liner in a seismic-induced slide of the fuel rack 100. A break in the liner means problems for the site because of leakage. If desired, the bottom surface of the peg 152 can be formed or covered with a low friction sliding material.

II. Non-Flux Trap Fuel Rack Embodiment Incorporating Resultant Cells

Referring now to FIGS. 7-10 concurrently, a second embodiment of a fuel rack 200 is illustrated. Similar to the rack above, the fuel rack 200 is a cellular, upright, prismatic module. The illustrated embodiment of the fuel rack 200 is specifically designed to accommodate hexagonal fuel assemblies, such as VVER 1000 fuel assemblies. Each cell 201 of the fuel rack 200 is also generally hexagonal in shape (i.e., have a hexagonal horizontal cross-section) so as to geometrically accommodate a single hexagonal fuel assembly. However, it is to be understood that the concepts of the present invention can be modified to accommodate any shaped fuel assembly, including rectangular, octagonal, round, etc.

Figure 7:
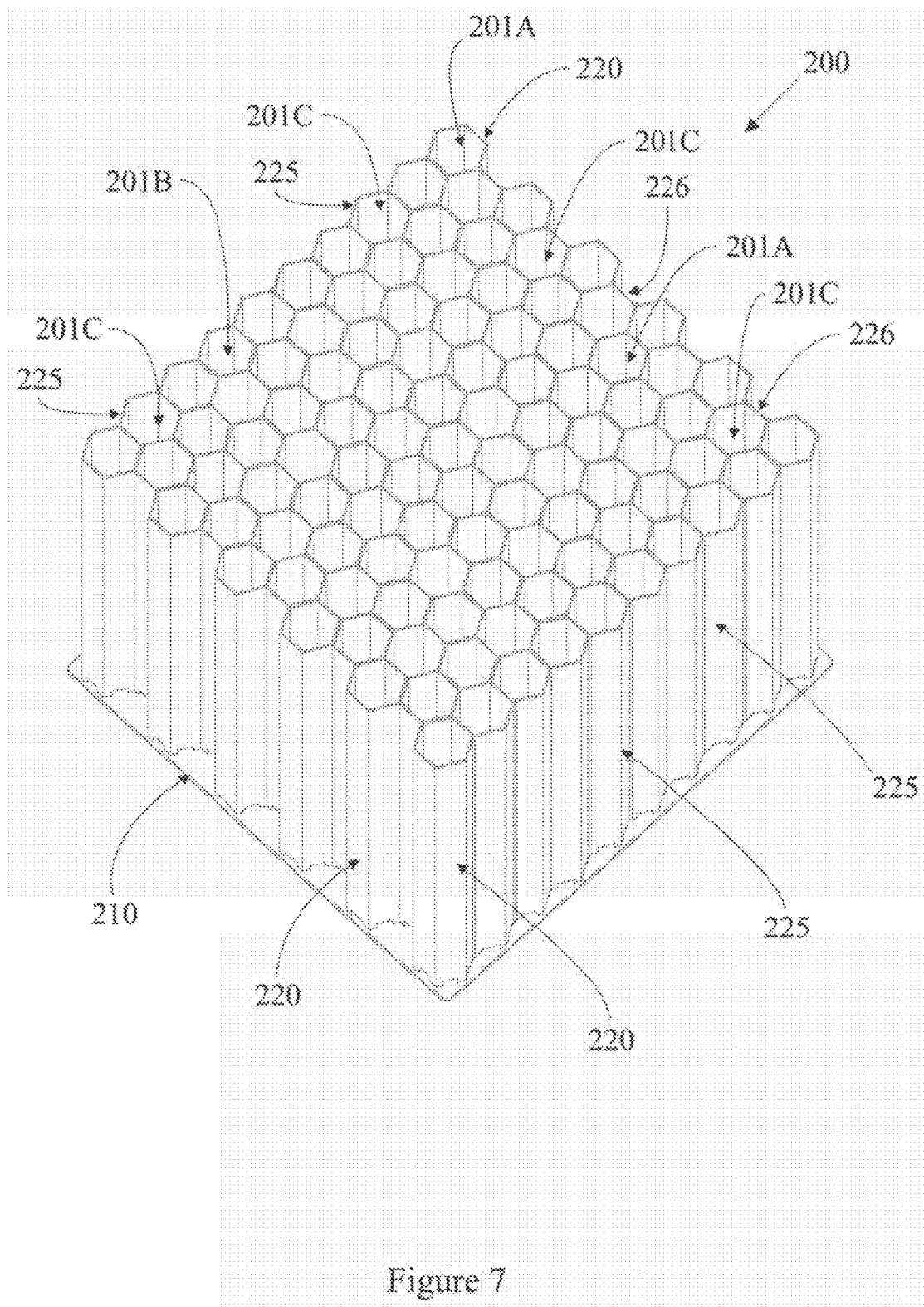
FIG. 7 is a top perspective view of a fuel rack according to a second embodiment of the invention that includes flux traps.
Figure 8:
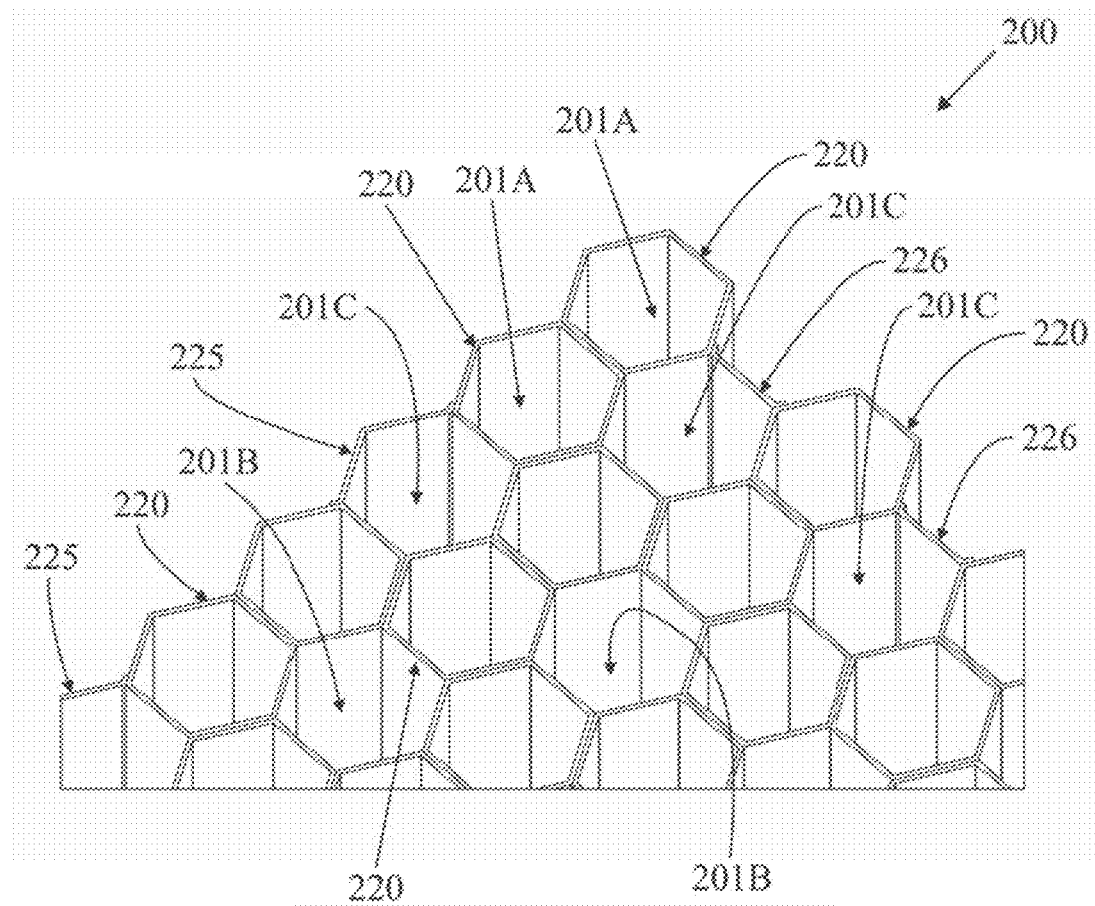
FIG. 8 is a close up view of a top portion of the fuel rack of FIG. 7.

In describing the fuel rack 200 and its component parts below, relative terms such as top, bottom, above, below, horizontal, vertical upper and lower will be used in relation to the fuel rack 200 being in the illustrated substantially vertical orientation of FIG. 7. Additionally, in order to avoid clutter in the drawings, only a few of each component are numbered with the understanding that the reader will be able to identify duplicate elements.

The driving factor that leads to the structural differences between fuel rack 100 (discussed above) and the fuel rack 200 is that the fuel rack 200 is designed to be used with fuel assemblies that do not require the presence of a neutron flux trap between adjacent cells 201. Thus, the inclusion of neutron flux traps in fuel racks when not needed is undesirable because valuable pool floor area is unnecessarily wasted. Of course, both fuel rack types 100, 200 may be stored side by side in the same pool.

Because many of the structural and functional features of the fuel rack 200 are identical to the fuel rack 100, only those aspect of the fuel rack 200 that are different will be discussed below with the understanding that the other concepts discussed above with respect to fuel rack 100 are applicable.

The fuel rack 200 comprises a plurality of hexagonal tubes 220. The hexagonal tubes 220 are connected to the top surface 211 of the base plate 210 in a substantially vertical orientation. In this embodiment, the axis of each hexagonal tube 220 is not only substantially vertical but also substantially perpendicular to the top surface 211 of the base plate 210. The connection between the hexagonal tubes 220 and the base plate 210 is achieved by welding the bottom edge of the hexagonal tubes 220 to the top surface of the base plate 110. Of course, other connection techniques can be utilized with minor modification, including mechanical connections such as bolting, clamping, threading, etc.

The top ends of the hexagonal tubes 220 remain open so that a fuel assembly can be slid into the internal cavity 201A (also referred to as a cell) formed by the inner surfaces each hexagonal tube 220. The hexagonal tubes 220 are connected atop the rectangular base plate 110 in a special geometric arrangement so that certain non-perimeter cells 201D are formed by the outside surfaces of the surrounding hexagonal tubes 220. Additionally, certain perimeter cells 201B-C are formed by the outside surfaces of the surrounding hexagonal tubes 220 and an added plate, which depending on the location is either a two-panel plate 225 or a single panel plate 226.

In other words, the cells 201B-201D are not the internal cavities of any tubular structures but are resultant cavities formed by either (1) the outer surfaces of the surrounding hexagonal tubes 220; or (2) the outer surfaces of the surrounding hexagonal tubes 220 and an additional plate structure 225, 226. As used herein, all three cell types 201B-201D will be referred to as "resultant cells" or "developed cells."

Despite their different methods of formation, all of the cells 201A-201D have a horizontal cross-section that is generally hexagonal. Of course, the result cell concept can be applied to a host of other geometries if desired. The special geometric arrangement of the hexagonal tubes 220 and an additional plate structure 225-226 atop the base plate 210 will now be discussed.

Figure 9:
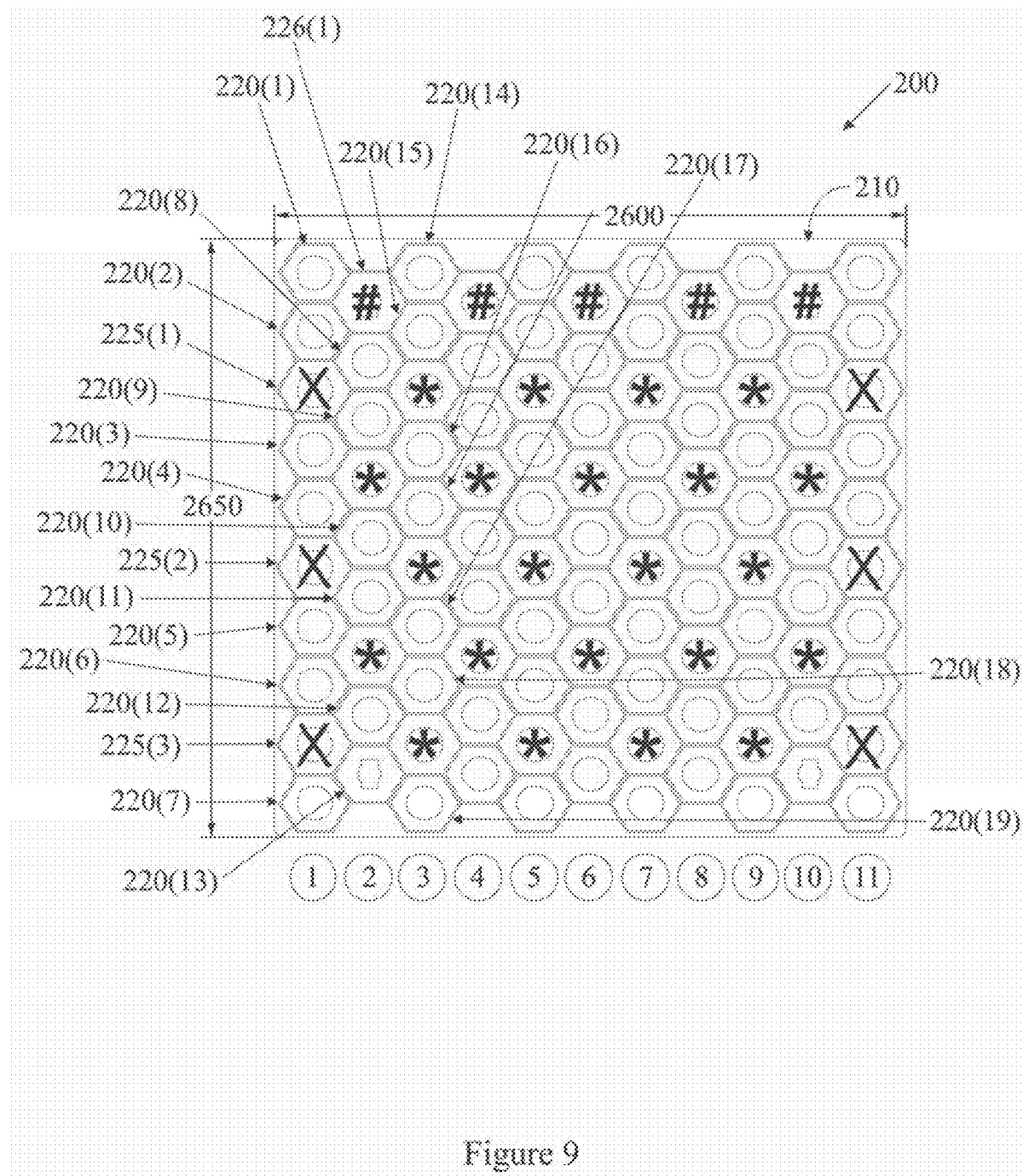
FIG. 9 is a top view of the fuel rack of FIG. 7.

As can best be seen in FIG. 9, the hexagonal tubes 220 are geometrically arranged atop the base plate 210 in rows 1-11 (indicated numerically in a circle). Of course, any number of rows or columns may be created for the fuel rack 200. The details of the formation of three different kinds of resultant cells will be described in reference to rows 1 through 3 with the understanding that the certain patterns repeat and thus the entire fuel rack 200 can be constructed.

A. Formation of Perimeter Resultant Cells X

The formation of perimeter resultant cells formed by the combination of outside surfaces of the hexagonal tubes and a two-panel plate structure (referred to above as type 201C cells) will now be described. For ease of reference and to avoid clutter, all perimeter resultant cells formed by the combination of outside surfaces of the hexagonal tubes and a two-panel plate structure are marked with an X.

In row 1, the hexagonal tubes 220(1), 220(2) are arranged atop the base plate 210 in the top left corner in an adjacent and abutting manner so that the opposing outside surfaces of the hexagonal tubes 220(1), 220(2) are in surface contact. The internal cavities of the hexagonal tubes 220(1), 220(2) act as the first two cells 201A (not marked). To reduce further clutter, all cells 201A that are formed by the inner surfaces of a single hexagonal tube 220 are left blank in FIG. 9.

A second pair hexagonal tubes 220(3), 220(4) are arranged atop the base plate 210 within row 1 and spaced from the first pair of hexagonal tubes 220(1), 220(2). Similar to the first pair of hexagonal tubes 220(1), 220(2), the second pair of hexagonal tubes 220(3), 220(4) are in arranged in an adjacent and abutting manner so that the opposing outside surfaces of the hexagonal tubes 220(3), 220(4) are in surface contact. While the second pair of hexagonal tubes 220(3), 220(4) are aligned with the first pair of hexagonal tubes 220(1), 220(2) in row 1, they are also spaced so as to leave room for a first perimeter resultant cell X.

A two-panel plate structure 225(1) is connected to the left sides of the hexagonal tubes 220(3), 220(4) to enclose the open lateral side of the perimeter resultant cell X. Specifically, the two panel plate structure 225(1) is connected to the hexagonal tube 220(2) and the hexagonal tube 220(3) by welding or another technique. The perimeter resultant cell X is completed by the outside surfaces of the hexagonal tubes 220(8), 220(9) located in row 2. Thus, a complete hexagonal resulting cell X is formed by the cooperation of the outside surfaces of the hexagonal tubes 220(2), 220(3), 220(8), 220(9) and the plate structure 225(1). The resultant cell X has a horizontal cross-sectional shape that corresponds to the shape of all other cells in the fuel rack 200.

B. Formation of Resultant Perimeter Cells #

The formation of perimeter resultant cells formed by the combination of outside surfaces of the hexagonal tubes and a single-panel plate structure (referred to above as type 201B cells) will now be described. For ease of reference and to avoid clutter, all perimeter resultant cells formed by the combination of outside surfaces of the hexagonal tubes and a single-panel plate structure are marked with an #.

Turning now to row 2, the pair of hexagonal tubes 220(8), 220(9) are arranged atop the base plate 210 in an adjacent and abutting manner with each other and the hexagonal tubes 220(2), 220(3) from row 1. When so arranged, the opposing outside surfaces of the hexagonal tubes 220(8), 220(9) are in surface contact with one another. The opposing outside surfaces of the hexagonal tubes 220(8), 220(2) are also in surface contact with one another. And, the opposing outside surfaces of the hexagonal tubes 220(9), 220(3) are in surface contact with one another.

The hexagonal tubes 220(14), 220(15) are arranged in row 3 atop the base plate 210 in an adjacent and abutting manner with each other and so that the outside surface of the hexagonal tube 220(15) is in surface contact with the outside surface of the hexagonal tube 220(8) from row 2. A single-panel plate structure 226(1) is connected to the hexagonal tubes 220(1), 220(14) to enclose the open lateral side of the perimeter resultant cell #. Specifically, the single-panel plate structure 226(1) is connected to the hexagonal tube 220(1) and the hexagonal tube 220(14) by welding or another technique. Thus, a complete hexagonal resulting cell # is formed by the cooperation of the outside surfaces of the hexagonal tubes 220(1), 220(2), 220(8), 220(14), 220(15) and the single-panel plate structure 226(1). The resultant cell # has a horizontal cross-sectional shape that corresponds to the shape of all other cells in the fuel rack 200.

C. Formation of Resultant Perimeter Cells *

The formation of non-perimeter resultant cells formed completely by the cooperation of outside surfaces of the surrounding hexagonal tubes (referred to above as type 201D cells) will now be described. For ease of reference and to avoid clutter, all non-perimeter resultant cells formed by the cooperation of the outside surfaces of the hexagonal tubes are marked with an *.

In order to avoid redundancy, the arrangement and interaction of the hexagonal tubes atop the base plate will be omitted with the understanding that the discussion above is applicable. In row 2, a complete hexagonal resulting cell * is formed by the cooperation of the outside surfaces of the hexagonal tubes 220(3), 220(4), 220(9), 220(10), 220(16), 220(17). The resultant cell * has a horizontal cross-sectional shape that corresponds to the shape of all other cells in the fuel rack 200.

Turning back to the general manufacture and formation of the fuel rack 200, all connections between the hexagonal tubes 220 and the base plate 210 are accomplished as described above with respect to the fuel rack 100. Additionally, connections between adjacent the hexagonal tubes 220 can be accomplished via the plug holes described above.

Furthermore, in order to ensure that the resultant cells 201B-D are properly sized, the fuel rack may be formed in the following manner.

First, an array of hexagonal tubes 220 are arranged in the desired geometric configuration so that all six outside surfaces of all non-perimeter hexagonal tubes 220 are in contact with the outside surface of the adjacent hexagonal tubes 220. In other words, at this stage, the fuel rack 200 only comprises cells of the type 201A that formed by the internal cavities of the hexagonal tubes 220 themselves. However, due to pre-planning, the location of those spots which are to be resultant cells 201B-D are noted. The array of hexagonal tubes 220 are positioned atop the base plate 210 and the necessary welding is performed. However, any hexagonal tubes 220 that are located in the spots where a resultant cell is desired are not welded to either the base plate 210 or to the adjacent hexagonal tubes 220. These hexagonal tubes 220 are then slidably removed from the array, thereby leaving the resultant cell 201B-D. As necessary, the single-panel plates 226 and the two-panel plates 225 are then connected to enclose the perimeter resultant cells 220B-C.

Furthermore, if desired, neutron absorbing panels can be added to the array as necessary. The fuel rack 200 does not contain any flux traps.

III. Slotted-Plate Fuel Rack Embodiment

Figure 10:
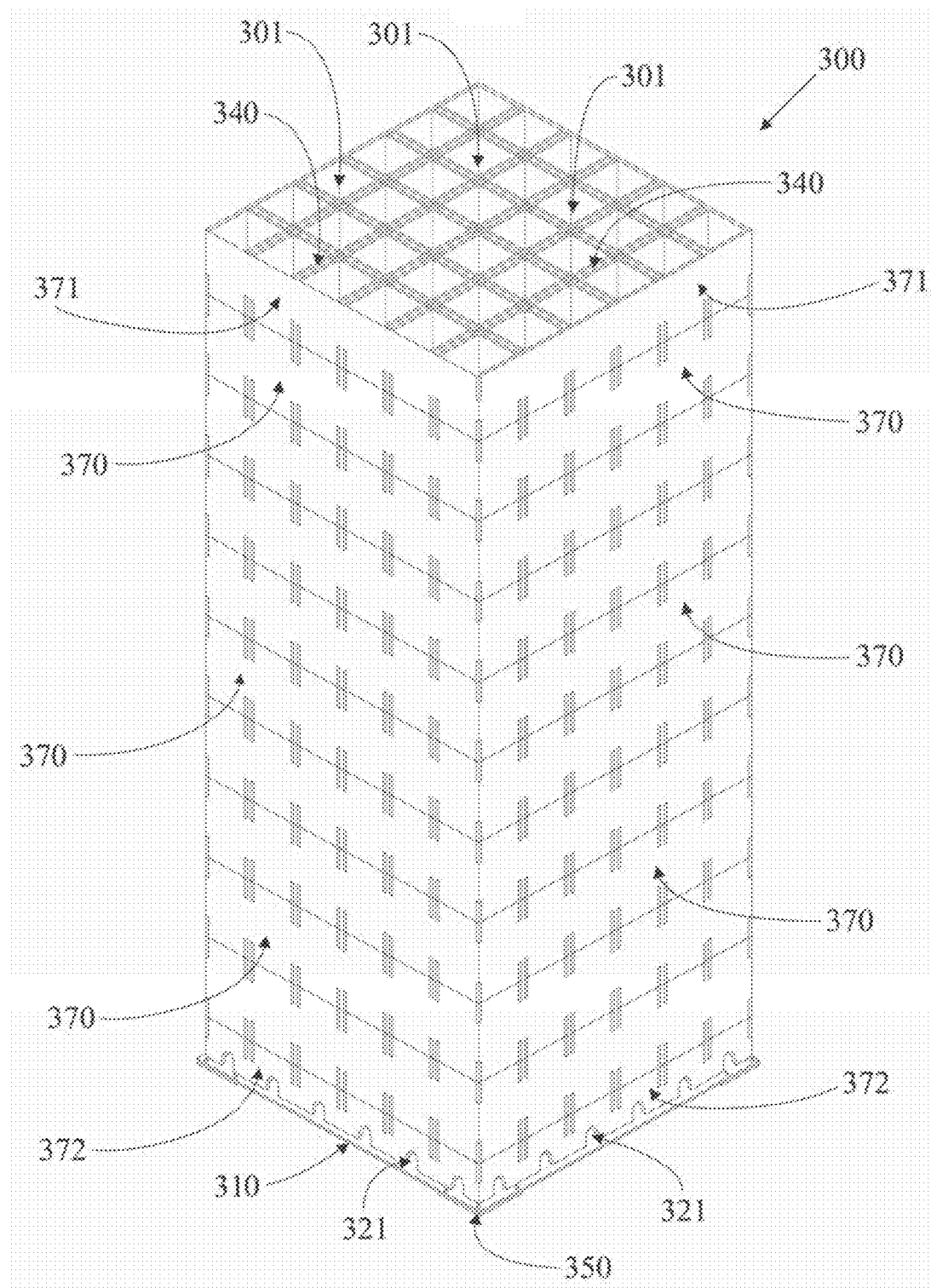
FIG. 10 is a top perspective view of a fuel rack according to one embodiment of the invention that is constructed of a slotted plates.

Referring now to FIG. 10, a fuel rack 300 that is formed from a plurality of slotted-plates arranged in a self-interlocking arrangement is illustrated. The fuel rack 300 is designed so as to have flux traps 340 and rectangular cells 301. However, it is to be understood that the slotted-plate concept described below can be utilized to form non-flux trap fuel racks and can be utilized to create fuel racks having any shaped cells, including without limitation the fuel racks discussed above.

In describing the fuel rack 300 and its component parts below, relative terms such as top, bottom, above, below, horizontal, vertical upper and lower will be used in relation to the fuel rack 300 being in the illustrated substantially vertical orientation of FIG. 10. Additionally, in order to avoid clutter in the drawings, only a few of each component are numbered with the understanding that the reader will be able to identify duplicate elements.

Because many of the structural and functional features of the fuel rack 300 are identical to the fuel racks 100, 200 above, only those aspect of the fuel rack 300 that are different will be discussed below with the understanding that the other concepts and structures discussed above with respect to the fuel racks 100, 200 are applicable.

The fuel rack 300 generally comprises an array of cells 301 that are formed by a gridwork of slotted plates 370-372 that are slidably assembled in an interlocking rectilinear arrangement. The gridwork of slotted plates 370-372 are positioned atop and connected to a base plate 310. The entire fuel rack body is formed out of three types of slotted plates, a middle plate 370, a top plate 371 and a bottom plate 372. The bottom plate comprises the auxiliary holes 321 as discussed above for facilitating thermosiphon flow into the cells 301.

Figure 11A:
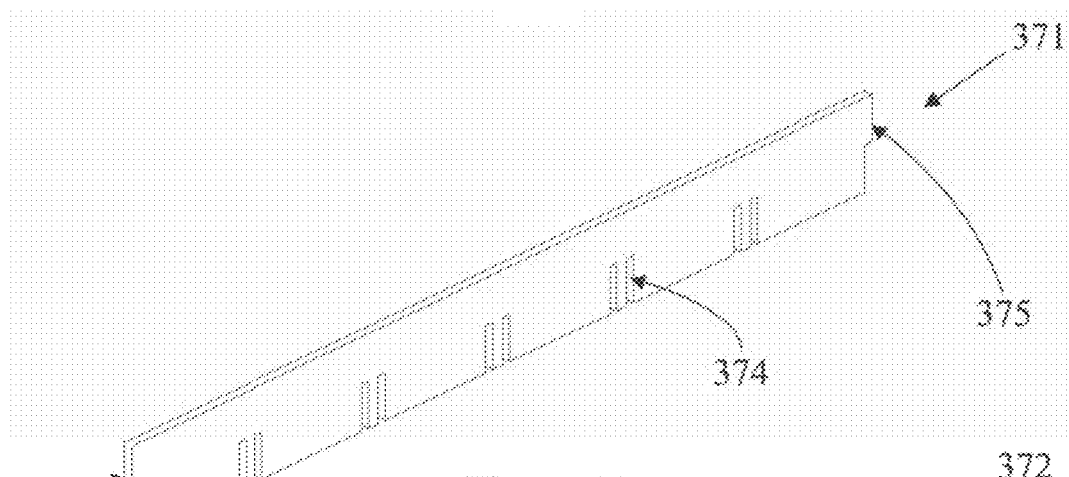
FIG. 11A is a perspective view of first slotted plate used in the construction of the fuel rack of FIG. 10.
Figure 11B:
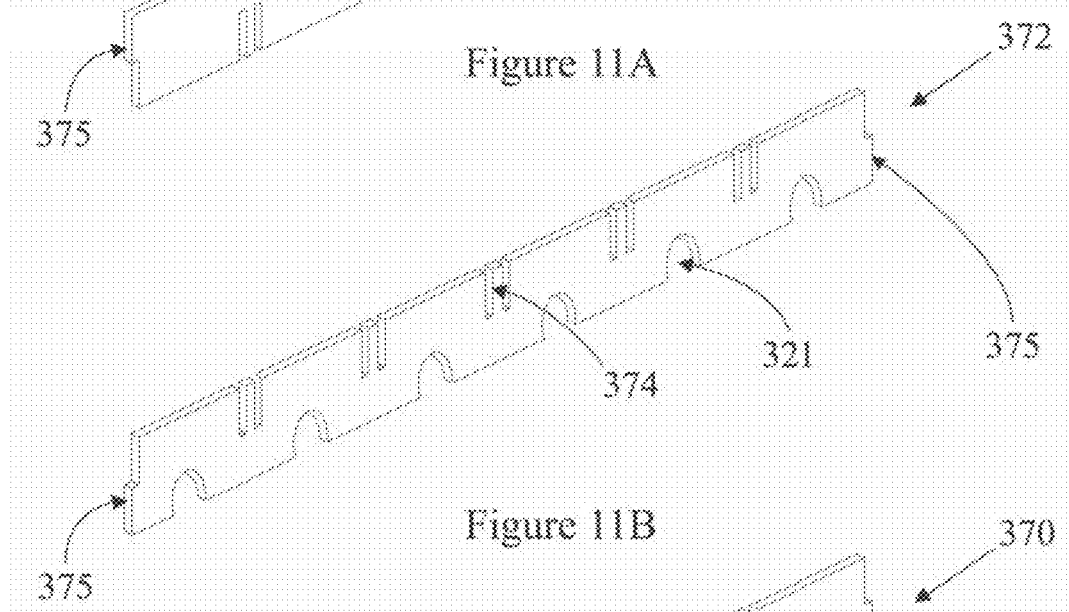
FIG. 11B is a perspective view of a second slotted plate used in the construction of the fuel rack of FIG. 10.
Figure 11C:
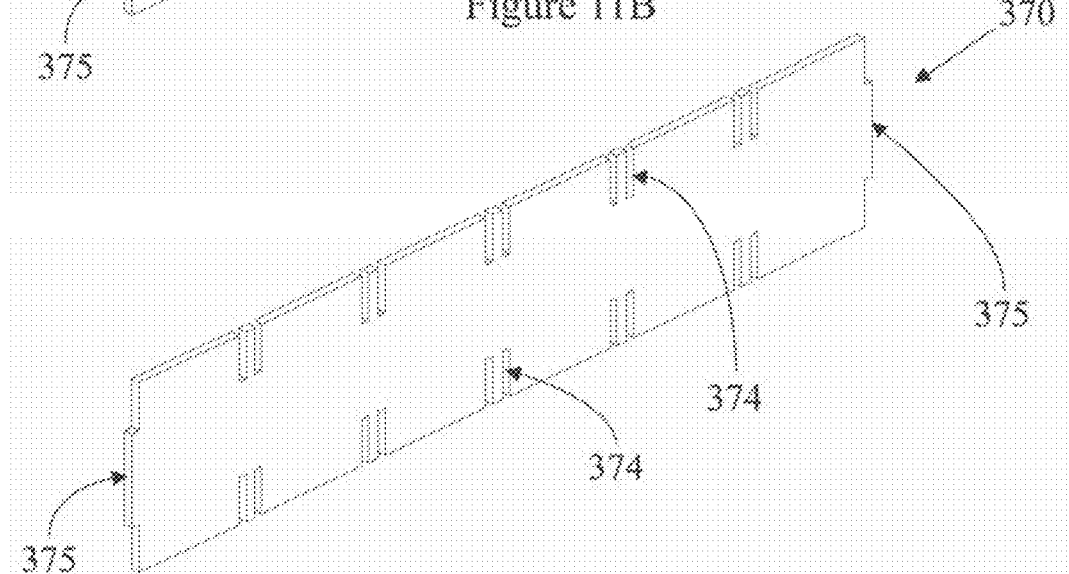
FIG. 11C is a perspective view of a third slotted plate used in the construction of the fuel rack of FIG. 10.

Referring now to FIGS. 11A-11C, one of the middle plates 370, top plates 371 and bottom plates 372 are illustrated individually. As can be seen, the bottom plate 372 is merely a top half of the middle plate 370 with the auxiliary holes 321 cutout at its bottom edge. Similarly, the top plate 371 is merely a bottom half of the middle plate 370. The bottom and top plates 372, 371 are only used at the bottom and top of the fuel rack body to cap the middle body segments 380 (FIG. 12) formed from the middle plates 370 so that the fuel rack body has a level top and bottom edge.

Each of the plates 370-372 comprise a plurality of slots 374 and end tabs 375 strategically arranged to facilitate sliding assembly to create the fuel rack body. The slots 374 are provided in both the top and bottom edges of the plates 370-372. The slots 374 on the top edge of each plate 370-372 are aligned with the slots 374 on the bottom edge of that same plate 370-372. The slots 374 extend through the plates 370-372 for one-fourth of the height of the plates 370-372. The end tabs 375 extend from lateral edges of the plates 370-372 and are preferably about one-half of the height of the plates 370-372. The end tabs 375 slidably mate with the indentations 376 in the lateral edges of adjacent plates 370-372 that naturally result from the existence of the tabs 375.

The plates 370-372 are preferably constructed of a metal-matrix composite material, and more preferably a discontinuously reinforced aluminum/boron carbide metal matrix composite material, and most preferably a boron impregnated aluminum. One such suitable material is sold under the tradename Metamic™.

Figure 12:
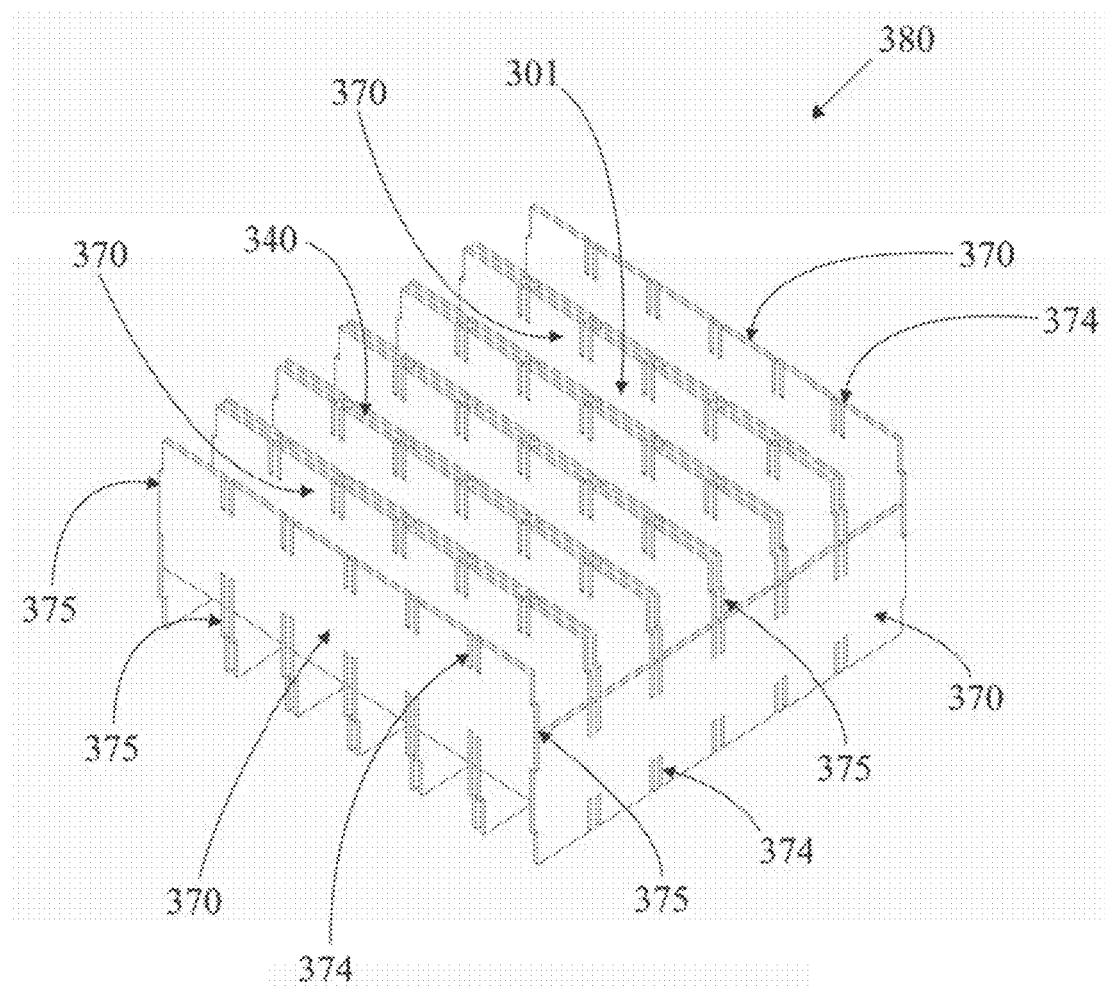
FIG. 12 is a perspective view of a vertical section of slotted plates of the fuel rack of FIG. 10.

Referring now to FIG. 12, a single middle segment 380 of the basket is illustrated. Each middle segment 380 of the fuel rack 300 comprises a gridwork of middle plates 370 arranged in a rectilinear configuration so as to form a vertical portion of the cells 301 and the flux traps 340. In creating a middle segment 380, a first middle plates 370 is arranged vertically. A second middle plate 370 is then arranged above and at a generally 90 degree angle to the first middle plate 370 so that its corresponding slots 374 are aligned. The second middle plate 370 is then lowered onto the first middle plate 370, thereby causing the slots 374 to interlock as illustrated. This is repeated with all middle plates 370 until the desired rectilinear configuration is created, thereby creating the segment 380.

In creating the fuel rack body, the slots 374 and end tabs 375 of the segments 380 interlock the adjacent segments 380 together so as to prohibit relative horizontal and rotational movement between the segments 380. The segments 380 intersect and interlock with one another to form a stacked assembly that is the fuel rack body. The fuel rack 300 preferably comprises at least four of the segments 380, and more preferably at least ten segments 380. All of the segments 380 have substantially the same height and configuration.

Therefore, the entire fuel rack 300 is formed of slotted plates 370-372 having what is essentially a single configuration which is the middle plate 370, with the exception that the top and bottom plates 371, 372 have to be formed by cutting the middle plate 370 and adding the cutouts 321.

Furthermore, as a result of the interlocking nature of the slotted plates 370-372, spacers are not needed to maintain the flux traps 340. Thus, in some embodiments, the fuel rack 300 will be free of spacers in the flux traps 340.

IV. Non-Flux Trap Fuel Basket Embodiment

Figure 13:
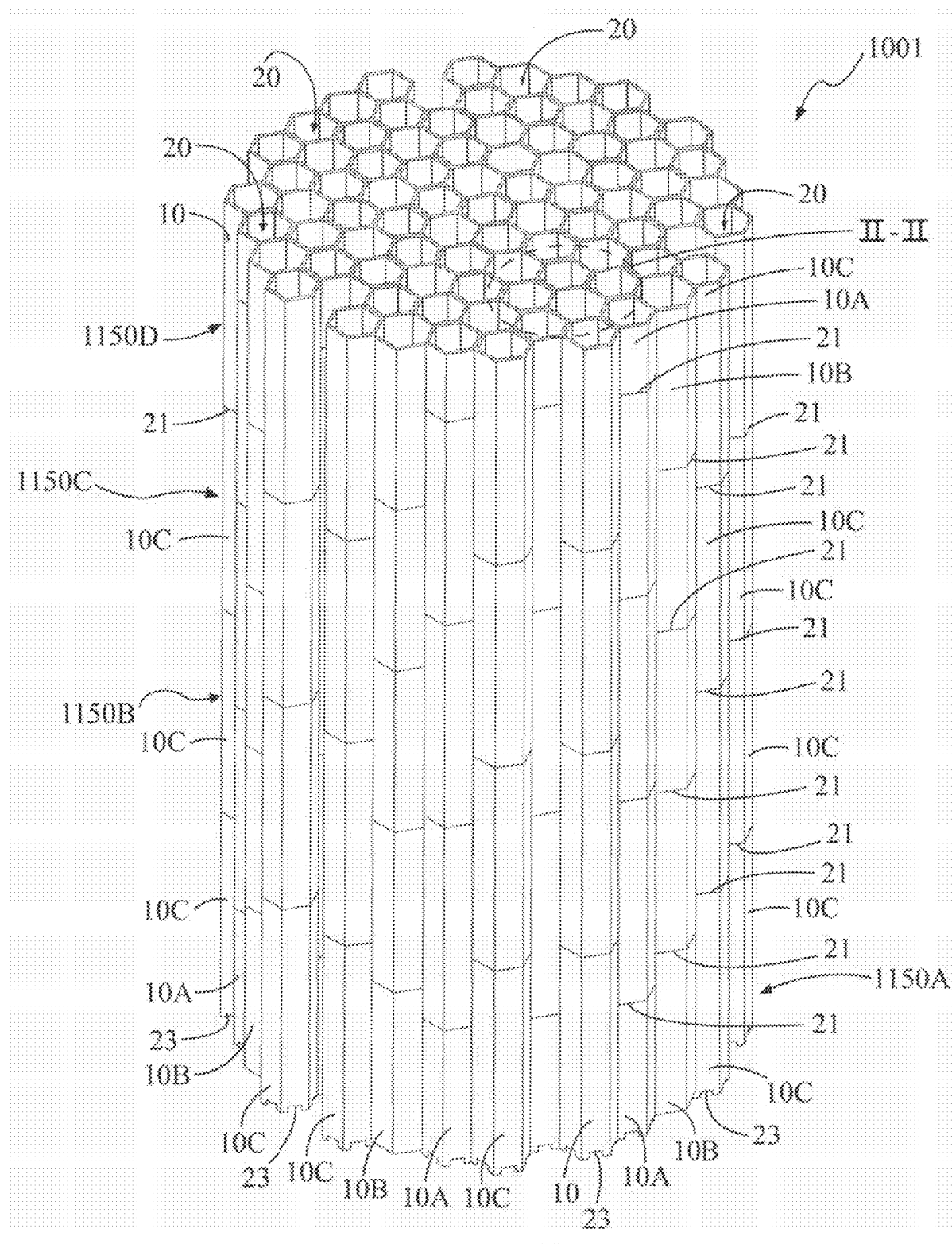
FIG. 13 is a top perspective view of a storage grid portion of a fuel basket according to an embodiment of the present invention.
Figure 14:
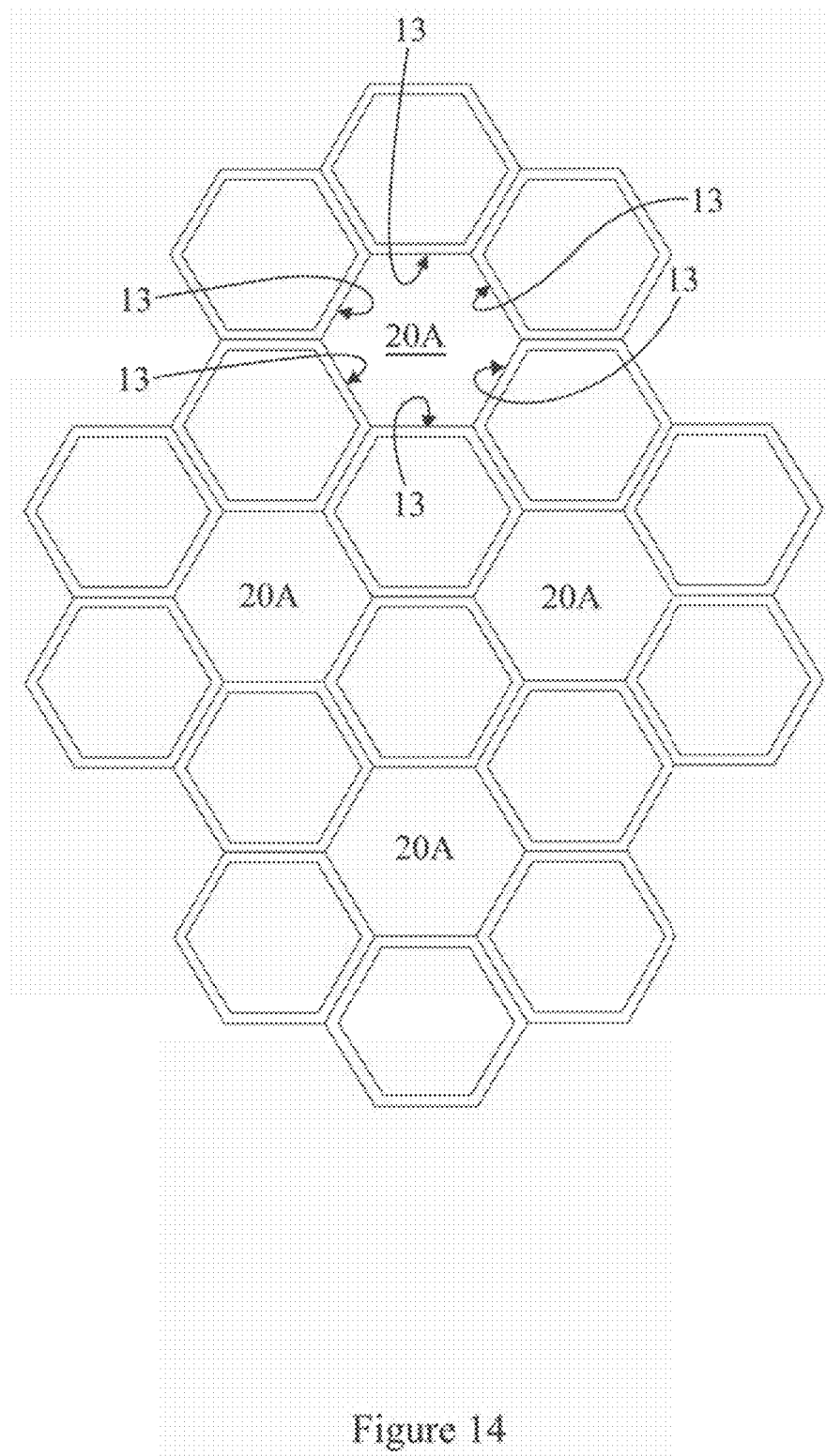
FIG. 14 is a top view of the area II-II of FIG. 13 illustrating a resultant cell according to one embodiment of the present invention.
Figure 15:
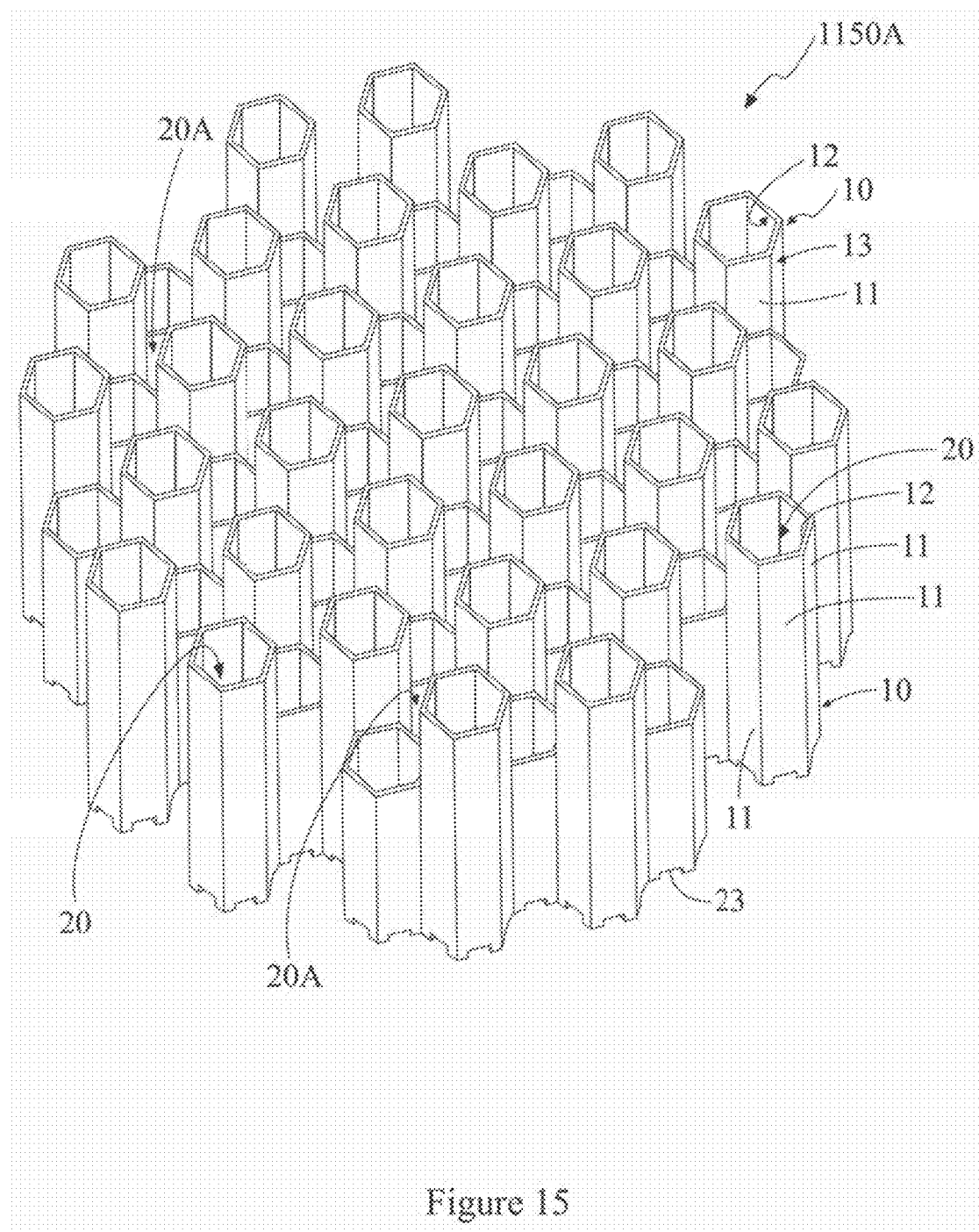
FIG. 15 is a perspective view of the bottom vertical segments of the storage tubes of the fuel basket of FIG. 13 arranged in the desired pattern so that interfaces between segments of adjacent storage tubes are not vertically aligned.
Figure 16:
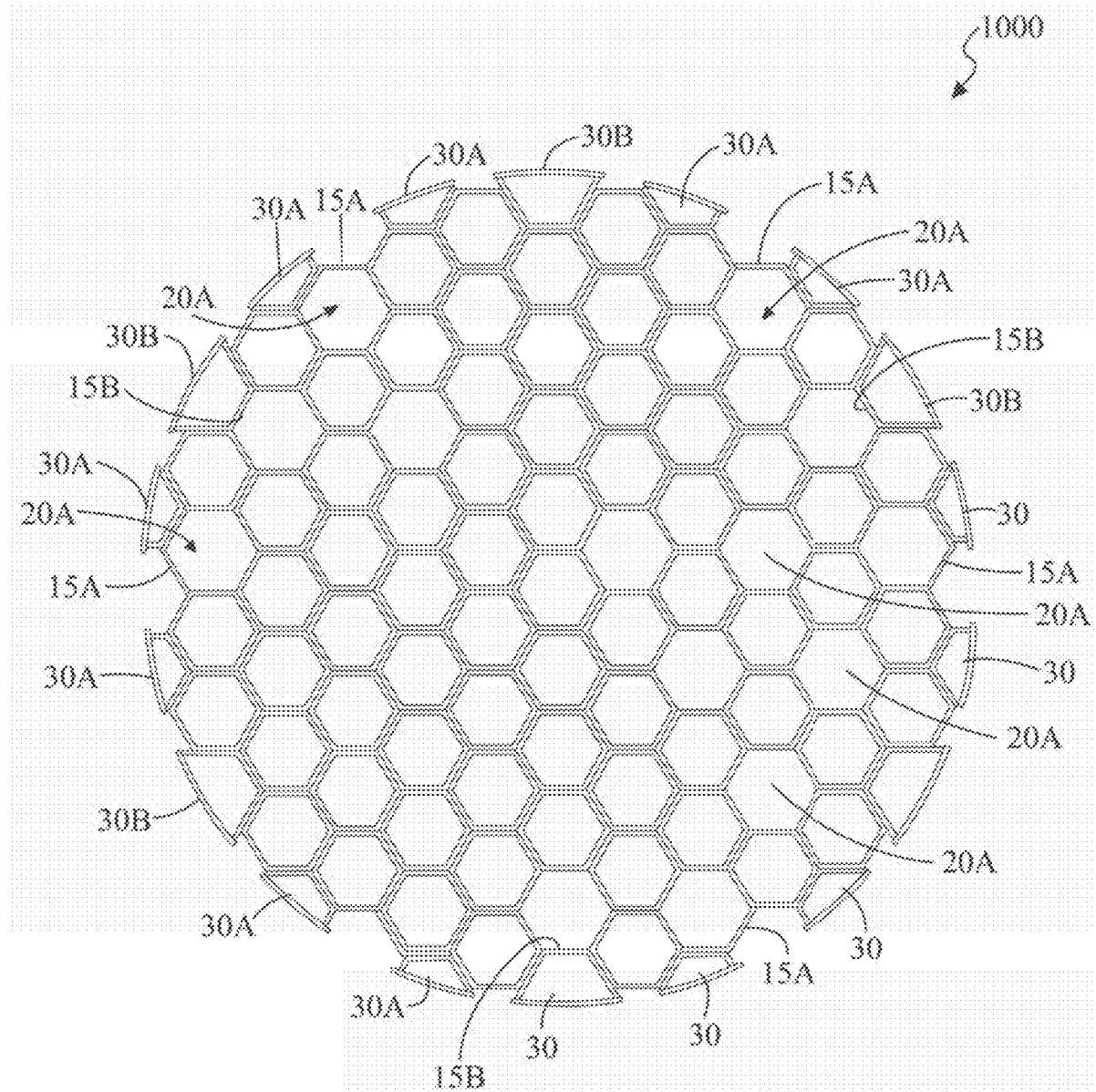
FIG. 16 is a top view of a fuel basket according to one embodiment of the present invention, comprising the storage grid portion of FIG. 13 and perimeter support tubes.
Figure 17:
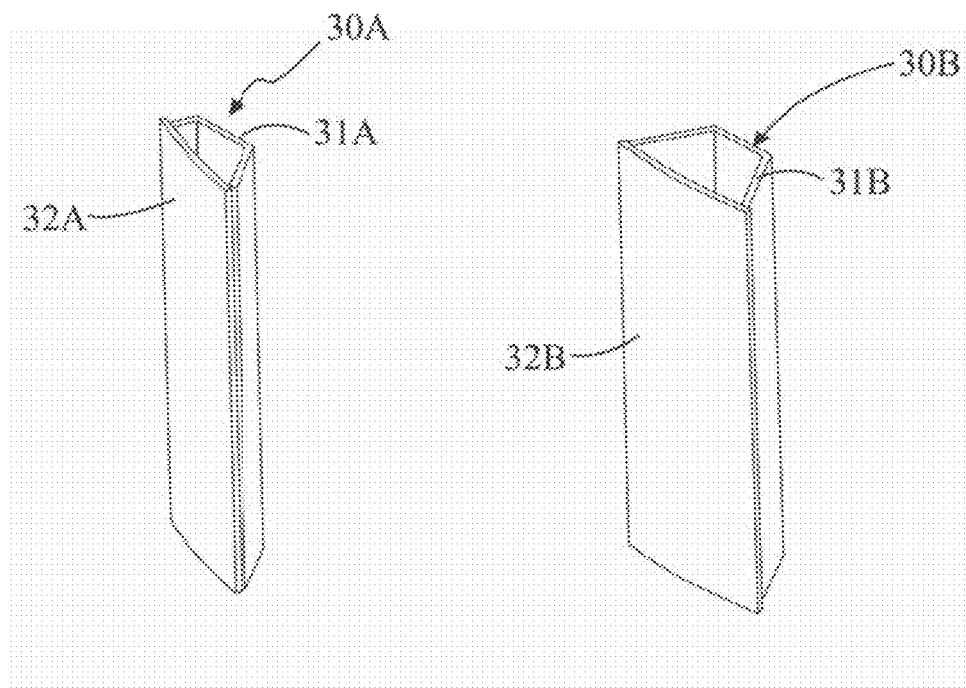
FIG. 17 is a perspective view of the supports tubes according to one embodiment of the present invention.

Referring to FIGS. 13-17, a fuel basket 1000 according an embodiment of the present invention is illustrated. The complete and assembled fuel basket 1000 is shown in FIGS. 15 and 17. While the fuel basket 1000 (and its components) are described throughout this specification in conjunction with storing and/or transporting spent nuclear fuel assemblies having a hexagonally shaped horizontal cross-sectional profile, the invention is in no way limited by the type of high level radioactive waste it is use din conjunction with. The fuel basket assembly 1000 (and its components) can be used to transport and/or store any shape of fuel assemblies.

Referring now to FIG. 13, a perspective view of the storage grid portion 1001 of the fuel basket 1000 is illustrated. The storage grid 1001 is a cellular structure comprising a plurality of tubes 10 forming cells 20 for receiving and holding fuel assemblies. The tubes 10 form a honeycomb-like grid of cells 20 arranged in a polar configuration. For ease of representation (and in order to void clutter), only a few of the tubes 10 and the cells 20 are numerically identified in FIG. 13.

The tubes 10 have a horizontal cross-sectional profile that is hexagonal in shape. The invention is not so limited however, and the tubes 10 will have a horizontal cross-sectional profile that corresponds with the shape of the fuel assembly to be stored within the cavities 20. For example, other polygonal-shaped SNF assemblies may be stored in the fuel basket 1000, in which case the tubes 10 will be of the appropriate horizontal cross-sectional shape. The cells 20 are substantially vertically oriented elongate spaces/cavities having a generally hexagonal horizontal cross-sectional configuration. The horizontal cross-sectional profile of the cells 20 is also not limited to hexagonal, and could be any shape including other polygons. Each cell 20 is designed to accommodate a single fuel assembly. The storage grid 1001 (and thus the cells 20) has a height that is equal to or slightly greater than the height of the fuel assembly for which the basket 1000 is designed to accommodate. The fuel basket 1000 preferably comprises 85 cells 20 and has a weight of approximately 4800 lbs.

Each storage tube 10 comprises five plates 11 having an inner surface 12 and an outer surface 13. The tubes 10 could have less or more plates 11 depending upon the desired horizontal cross-sectional profile. The inner surface 12 of the tubes 10 form the cells 20. Preferably, the tubes 10 are bundled together in an axially adjacent arrangement to form a honeycomb storage grid of cells 20. The tubes 10 are formed by staking tubular segments 10A-10C so as to create cells 20 having a height equal to, or greater than the height of the fuel assembly to be stored therein. An interface/junction 21 is formed between the contacting edges of the tubular segment 10A-10C in each vertical stack that forms the tube 10. For ease of representation (and in order to void clutter), only a few of the contact interfaces are numerically identified in FIG. 13. As will be discussed in further detail below, the tubular segments 10A-10C are of varying height so that the interfaces 21 of adjacent tubes 10/cells 20 are not aligned. By ensuring that the interfaces 21 are not aligned for adjacent tubes 10/cells 20, the structural integrity of the fuel basket 1000 is enhanced.

Preferably, the tubes 10 (and tubular segments 10A-10C) are made by extruding or forming plate stock followed by welding each of the plates 11 at their lateral edges. The tubes 10 are made of a material containing a neutron absorber isotope embedded in the microstructure, such as elemental boron or boron carbide. Metamic, produced by Metamic, LLC, made of an aluminum alloy matrix with embedded boron carbide is an example of an acceptable material. In some embodiments, however, the fuel basket 1000 and its components can be constructed of alternate materials, such as steel or borated stainless steel.

A plurality of cutouts 23 are provided in the plates 11 at the bottom of the tubes 10. For ease of representation (and in order to void clutter), only a few of the cut-outs 23 are numerically identified in FIG. 13. The cutouts 23 form passageways through the plates 11 so that all of the cells 20 are in spatial communication. As a result, the cutouts 23 at or near the bottom of the storage grid 1001 act as a bottom plenum that helps circulate fluids (air or water) within the fuel basket 1000 (and the cells 20) to effectuate convective cooling of the stored fuel assemblies during storage and/or transportation. This natural circulation of air or water can be further facilitated by leaving one or more of the cells 20 along the periphery of the basket 100 empty so that they can act as downcomers (the support tubes 30A, 30B can also act as downcomers if the cutouts are added). The cutouts 23 are rectangular in shape in the illustrated embodiment but can take on a wide variety of shapes.

Referring to FIGS. 13 and 15 concurrently, the storage grid 1001 is formed by a plurality of sections 150A-D of the tubular segments 10A-10C that are arranged in a stacked assembly. The sections 150A-D and the tubular segments 10A-C are joined with one another to form the stacked assembly that is the storage grid 1001. Each section 150A-D of the storage grid 1001 is a vertical portion of the storage grid 1001 that itself comprises the honeycomb-like grid of tubular segments 10A-C arranged in the polar configuration. The tubular segments 10A-C are of three different heights, each different height delineated by the letter A-C. A single bottom section 150A of the storage grid 1001 is illustrated in FIG. 15, the bottom section 150A having tubular segments 10A-C arranged in a polar configuration. The bottom edges of the tubular segments 10A-C are aligned at the same elevation. The two middle sections 150B-C comprise tubular members 10C, all having the same height. The top section 150D comprises tubular members 10A-C arranged so that the top surfaces of the tubular members 10A-C are aligned at the same elevation.

The tubular segments 10A have a height that is preferably equal to one foot. The tubular segments 10B have a height that is preferably equal to two feet. The tubular segments 10C have a height that is preferably equal to three feet. The invention is not so limited however, and the tubular segments 10A-C may be of any height so long as the cells formed are at least equal to the height of the fuel assembly. In order to ensure that the interfaces 21 of adjacent tubes 10 are not aligned, it is preferable that no adjacent tubular members 10A-C of the bottom section 150A be of the same height. Thus, when assembling the bottom section 150A, the one foot tubular segment 10A is surrounded by alternating tubular members 10B and 10C.

Referring now to FIGS. 14 and 16, the fuel basket 1000 further comprises a plurality of resultant cells 20A that are formed by the outer surface 13 of the walls 11 of six of the tubular members 10. A single resultant cell 20A is illustrated in FIG. 14. Where six tubular members are joined in a polar configuration, a resultant cell 20A having a hexagonal horizontal cross-sectional profile is formed therebetween. This arrangement allows for less plates 11 (i.e., tubes 10) to be used to create the same number of cells 20, thereby creating a lighter fuel basket 1000. In the illustrated embodiment there are a total of twenty-nine resultant cells 20A. The invention is not so limited however, and the number of resultant cells may vary. The resultant cells 20A have about a ½ inch larger opening and thus can accommodate fuel assemblies that are damaged or dimensionally-deviant. Additionally, the resultant cells 20A allow for the fuel basket 1000 to be fabricated using fillet welds because the resultant cells provide easier access to the tubes 10.

As best seen in FIG. 16, some resultant cells 20A that are located along the periphery of the fuel basket 1000 require the use of a closure plate 15A-B to complete the cell. The closure plates 15A-B are par-hexagonal plates. The fuel basket assembly 1000 comprises two types of closure plates 15A-B depending on the configuration of the resultant cell 20A. Some resultant cells 20A require only a single panel to enclose the cell 20A, while other resultant cells require two panels to enclose the resultant cell 20A. Where two panels are required, a closure plate 15A is formed by bending a plate into two panels of equal length and attaching the lateral edges of the closure plate 15A to the lateral edges of the tubes 10 that are forming the applicable resultant cell 20A.

The basket assembly 1000 further comprises basket support tubes 30A, B placed adjacent the storage grid 1001 along its periphery. The basket support tubes 30A,B are used to provide conformal contact with the container/vessel in which the basket assembly 100 is to be used. The basket support tubes 30A, B comprise a par-hexagonal plate 31A, B connected to the concave side of a curved plate 32A, B. The curved plates 32A, 32B form a substantially circular outer perimeter for the fuel basket 1000. Because the basket support tubes 30A,B are not located at every position on the periphery of the storage grid, the substantially circular outer perimeter is circumferentially segmented.

For resultant cells 20A that require only a single panel to form a six-walled cell (i.e., one side is open), the par-hexagonal plate 31B of the support tubes 30B can also function as a closure plate. The basket support tubes 30A can be used where there is no resultant cell 20A, or where the resultant cell 20A is enclosed by the closure plate 15A.

Referring now to FIG. 17, the basket support tubes 30A, B are shown removed from the fuel basket assembly 1000. The basket support tubes 30A,B are provided so that the basket assembly is centered within the container (which can be a canister or a cask) in which it is to be used.

Figure 18:
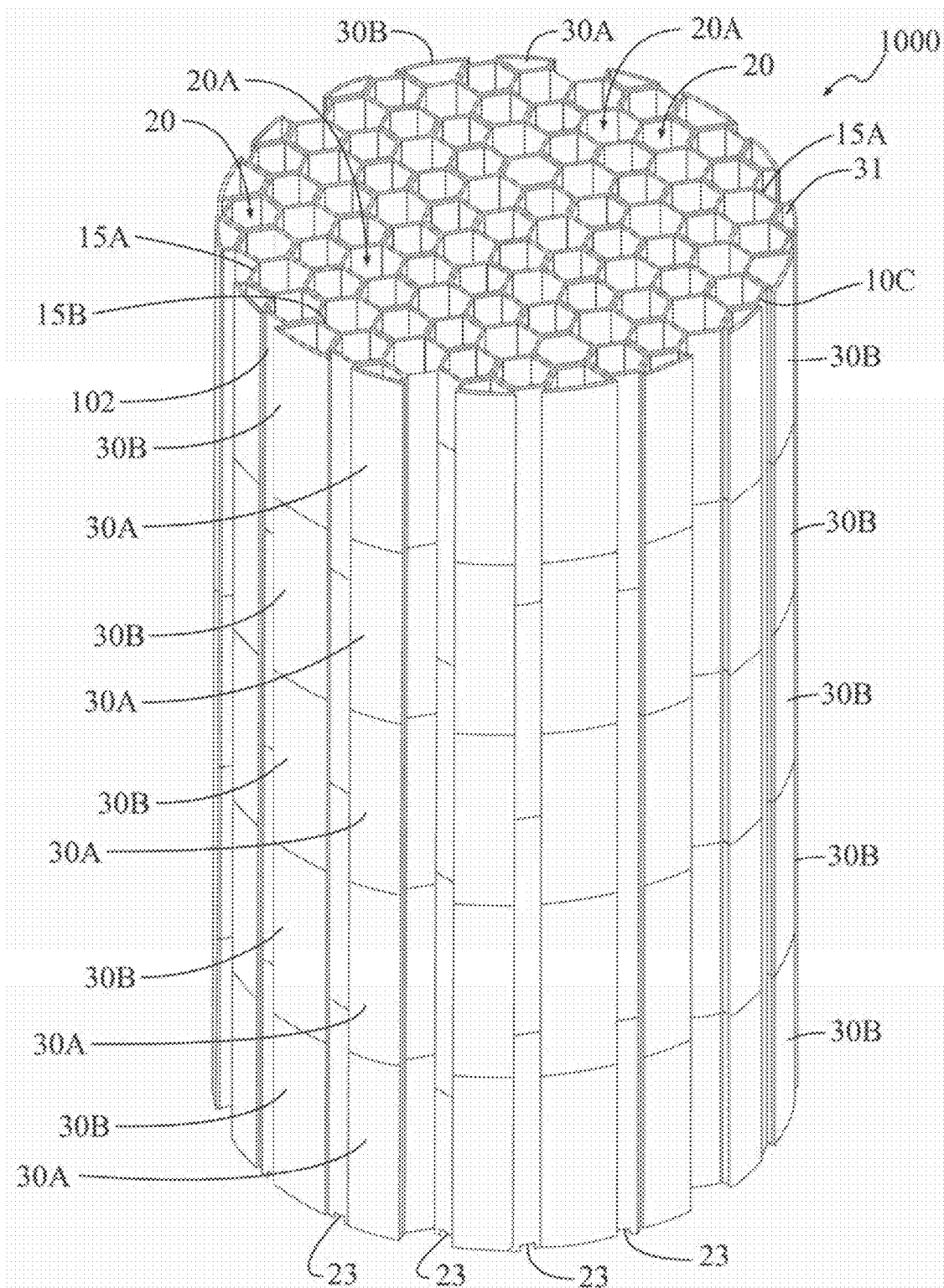
FIG. 18 is a perspective view of the fuel basket of FIG. 16.

Referring now to FIG. 18, the basket assembly 100 with the basket supports 30A, B attached is illustrated. The basket supports 30A, B provide for a circular outer perimeter of the fuel basket 1000. The gaps 31 in the basket supports 30A,B do not have fuel assemblies stored therein, thus they may improve the cooling of the fuel assemblies stored in the cells 20.

V. Flux Trap Fuel Basket Embodiment

Figure 19:
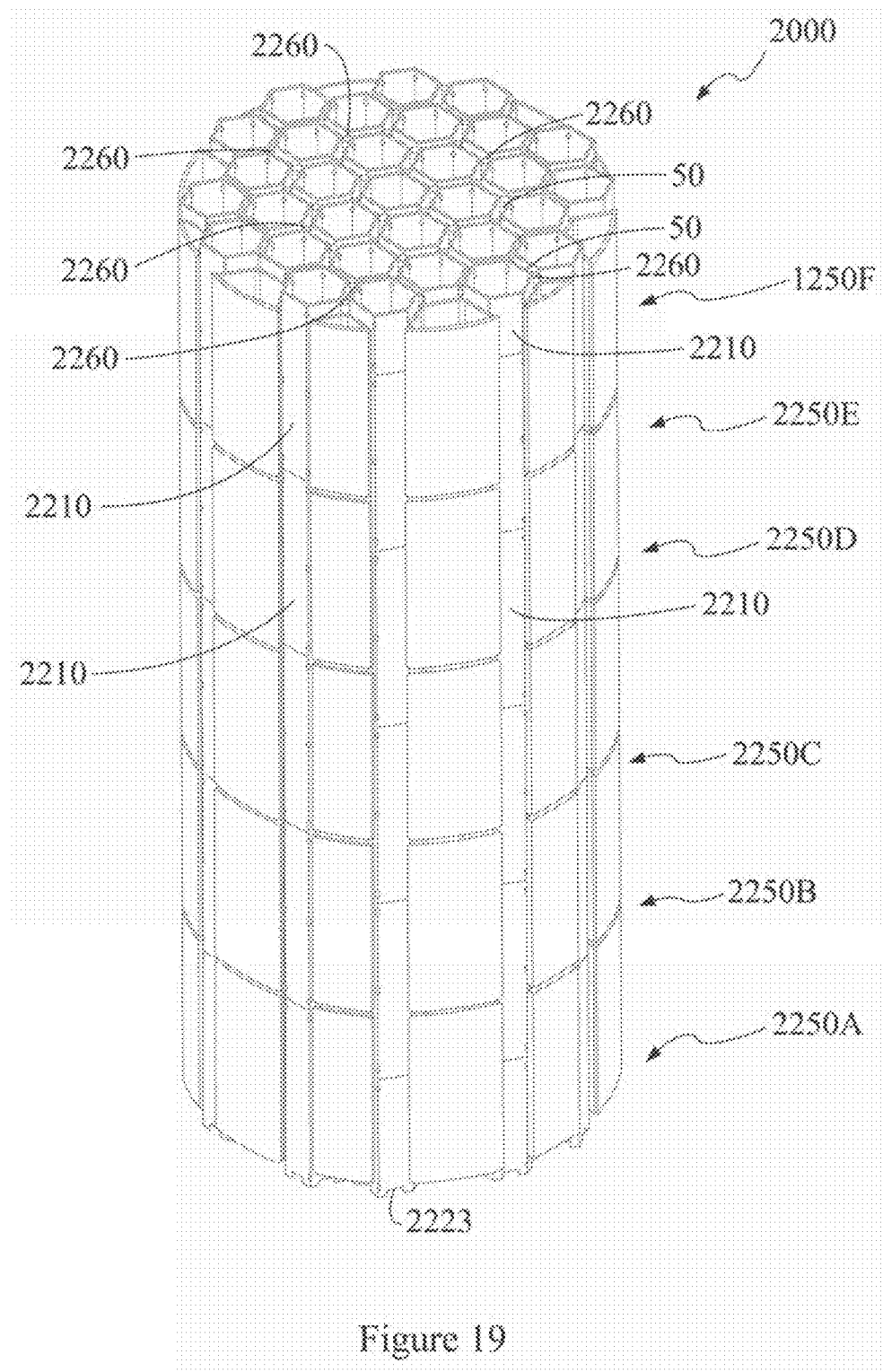
FIG. 19 is a perspective view of a fuel basket assembly according to a second embodiment of the present invention.

Referring now to FIG. 19, a fuel basket 2000 according to another embodiment of the present invention is illustrated. The design aspects of the fuel assembly 2000 are substantially similar to those discussed above with respect to the fuel basket 1000. To avoid redundancy, only those design aspects of the fuel basket 2000 that substantially differ from the fuel basket 1000 will be discussed.

The basket assembly 2000 comprises a plurality of flux trap spaces 50 that regulate the production of neutron radiation and prevent reactivity in a flooded condition. The flux traps 50 are small spaces that extend the height of the basket 2000. The flux traps 50 are formed between two of the tubular members 210 that are close to one another and substantially parallel. As will be discussed below, the flux traps 50 are designed to be of variable width to maximize the number of fuel assemblies that can be stored in the fuel basket 2000 while maintaining a reactivity equal to or less than 0.95. The flux traps 50 are formed between the outer surface of the storage tubes 2210. The tubes 2210 have a plurality of spacers 60 that maintain the spacing between tubular members 10 that forms the flux trap 50.

Figure 20:
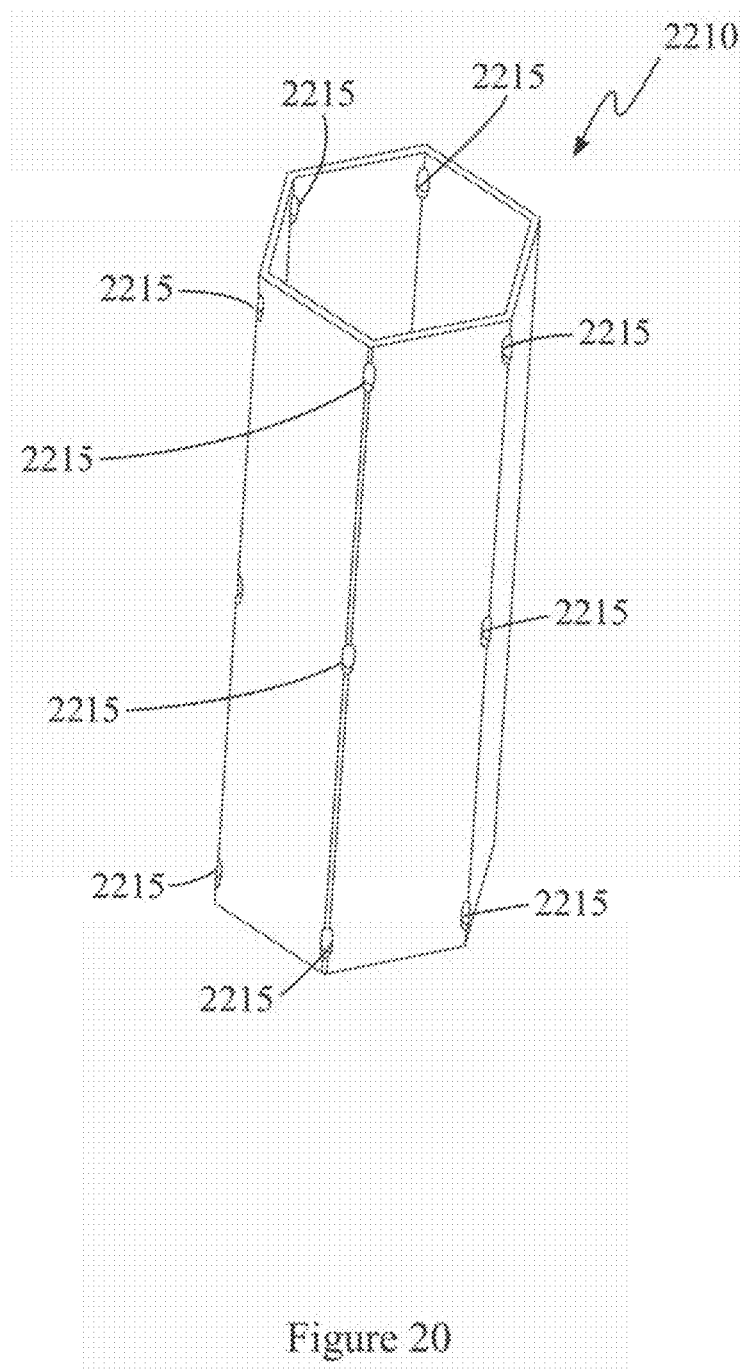
FIG. 20 is a perspective view of a storage tube of the fuel basket of FIG. 19.

Referring now to FIG. 20, a single storage tube 2210 is shown removed from the fuel basket 2000 so that it's design aspects can be more clearly visible. The storage tube 2210 has a hexagonal horizontal cross-sectional profile but can be any configuration. Preferably, the cross-sectional profile will be determined by the type of fuel assembly to be loaded and stored in the fuel basket assembly 2000. The tube 2210 comprises a plurality of notches 2215. The notches 2215 provide spaces through which the spacer 2260 (shown in FIG. 24) can be attached. Preferably, the spacers 60 are initially tack welded to the tubes 2210 so that the fuel basket 2000 can be assembled. After the fuel basket 2000 is assembled it is placed on its side and the spacers 2260 that are on the bottom (closer to the ground surface on which the basket assembly 2000 is resting) are plug welded to the storage tubes 2210. This allows for gravity to aid in the welding procedure. The fuel basket 2000 is rotated so that the next set of spacers 2260 is now closer to the ground surface for welding to the tubes 2210. The rotating and welding procedure is repeated for all of the spacers 2260 and tubes 2210.

Figure 21:
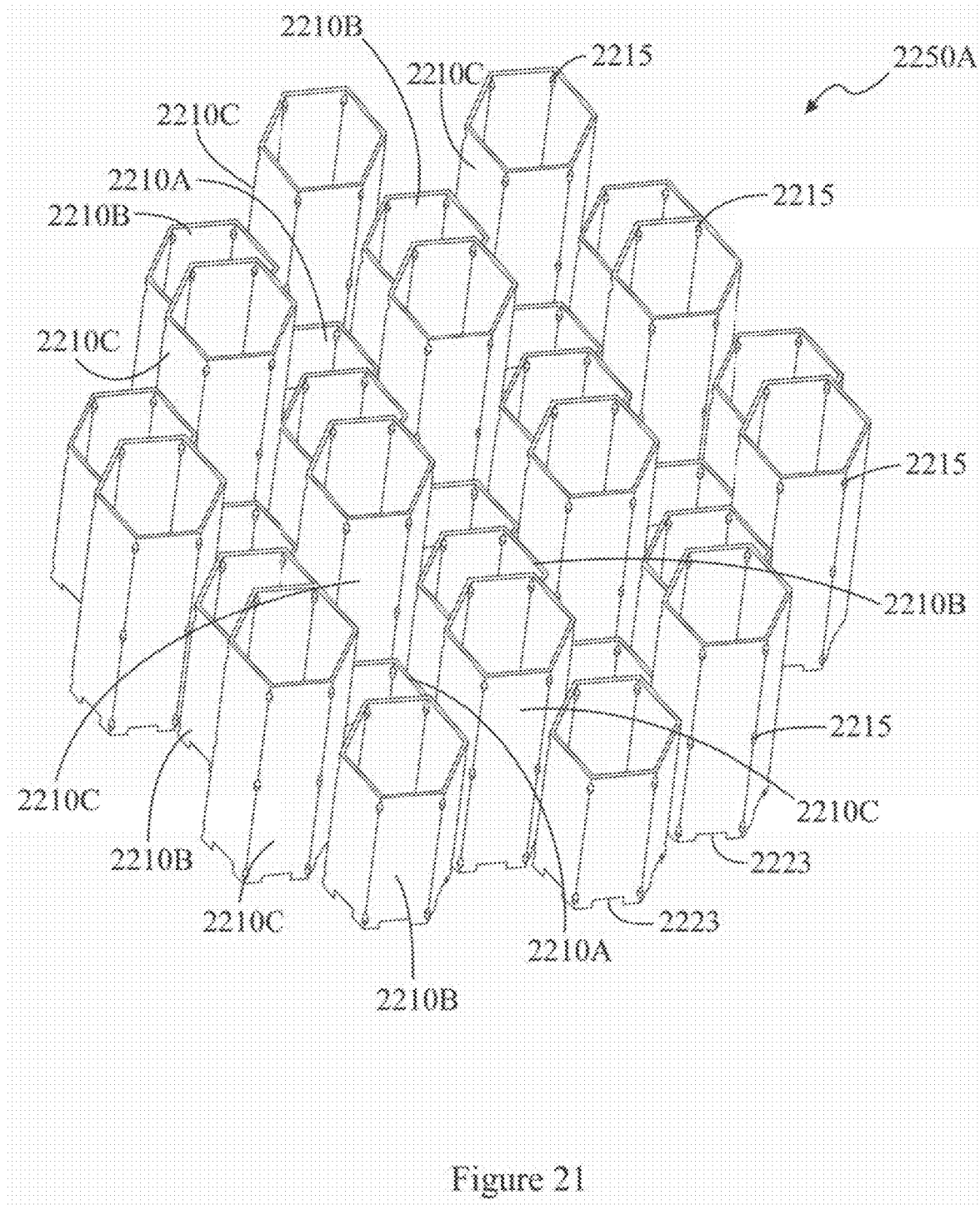
FIG. 21 is a perspective view of the bottom vertical segment of the storage grid portion of the fuel basket of FIG. 19.
Figure 22:
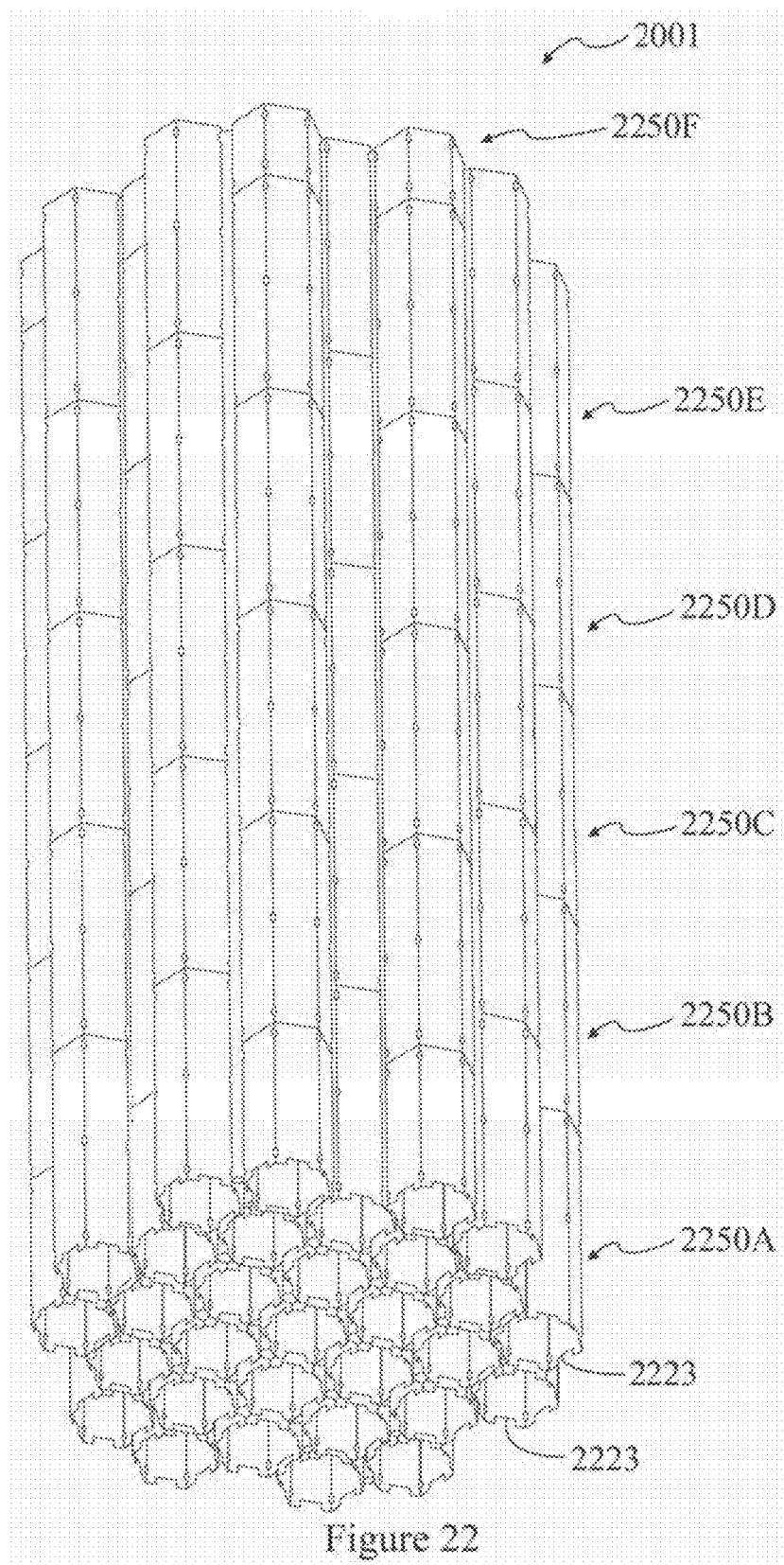
FIG. 22 is a bottom perspective view of the storage grid portion of the fuel basket of FIG. 19.

Referring to FIGS. 21 and 22 concurrently, the fuel basket 2000 is formed by a plurality of sections 2250A-F of the tubular segments 2210A-C that are arranged in a stacked assembly. The sections 2250A-F and the tubular segments 2210A-C are joined with one another to form the stacked assembly that is the fuel basket 2000. Each section 2250A-F of the fuel basket 2000 comprises a honeycomb-like grid of tubular segments 2210A-C arranged in the polar configuration. The tubular members 2210A-C of the basket assembly 2000 are of three varying heights, each height delineated by the letter A-C. A single bottom section 2250A of the basket 2000 is illustrated in FIG. 21, the bottom section 2250A has tubular segments 2210A-C arranged in a polar configuration. The middle sections 2250B-E comprise tubular segments 2210C, all having the same height. The top section 2250F comprises tubular segments 210A arranged so that the top surfaces of the tubular segments 2210A-C are aligned at the same elevation.

The storage tubes 2210A have a height that is preferably equal to one foot. The tubular segments 2210B have a height that is preferably equal to two feet. The tubular segments 2210C have a height that is preferably equal to three feet. The invention is not so limited however, and the tubular segments 2210A-C may be of any height so long as the cells formed are at least equal to the height of the fuel assembly. In order that the interfaces 2221 are not aligned, it is preferable that no adjacent tubular segments 2210A-C of the bottom section 2250A be of the same height. Thus, when assembling the bottom section 2250A, the one foot tubular segments 2210A are surrounded by alternating tubular segments 2210B and 2210C. The bottom edges of the tubular segments 2210A-C of the bottom section 2250A are aligned.

Figure 23:
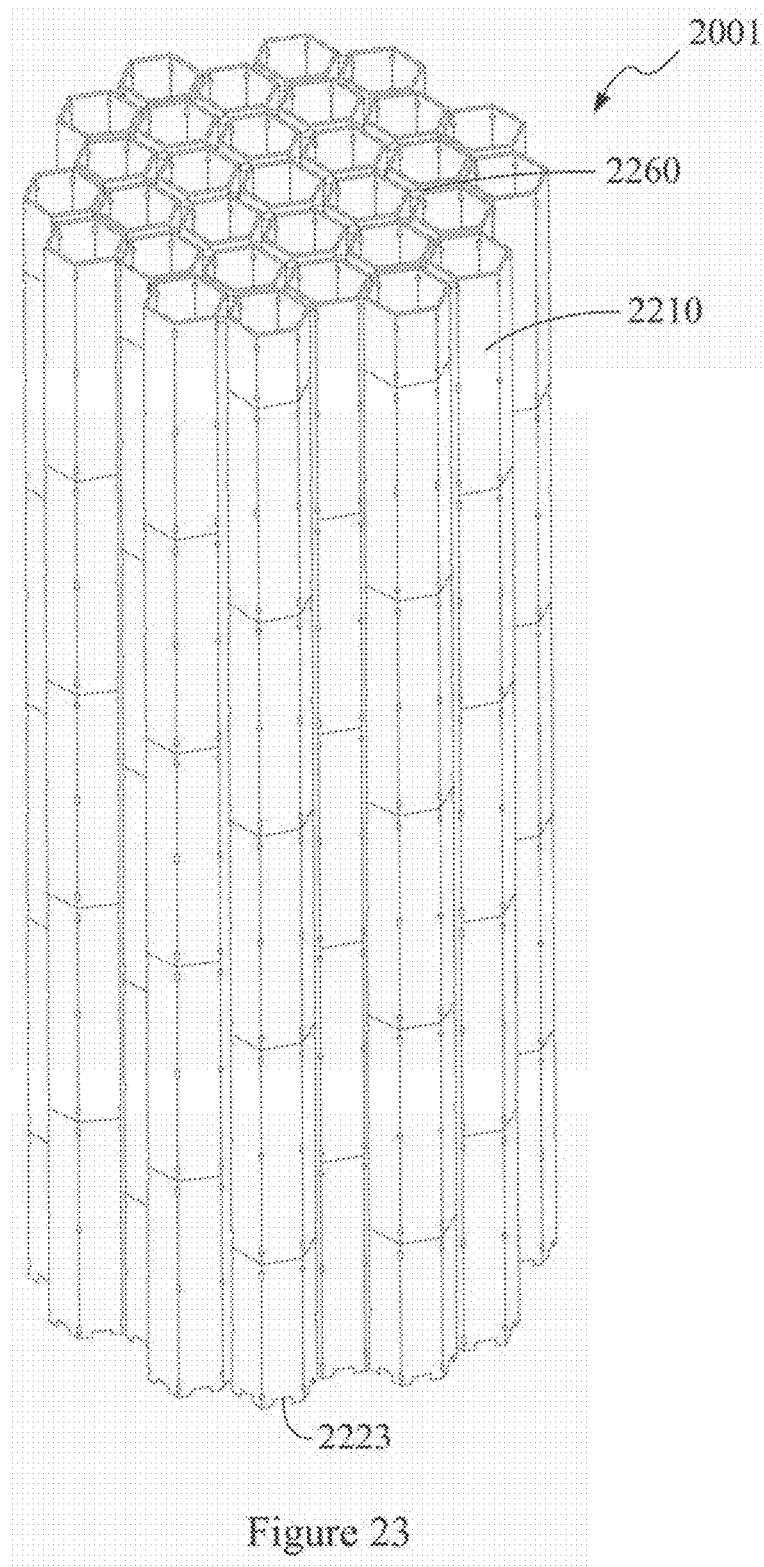
FIG. 23 is a top perspective view of the storage grid portion of the fuel basket of FIG. 19.
Figure 24:
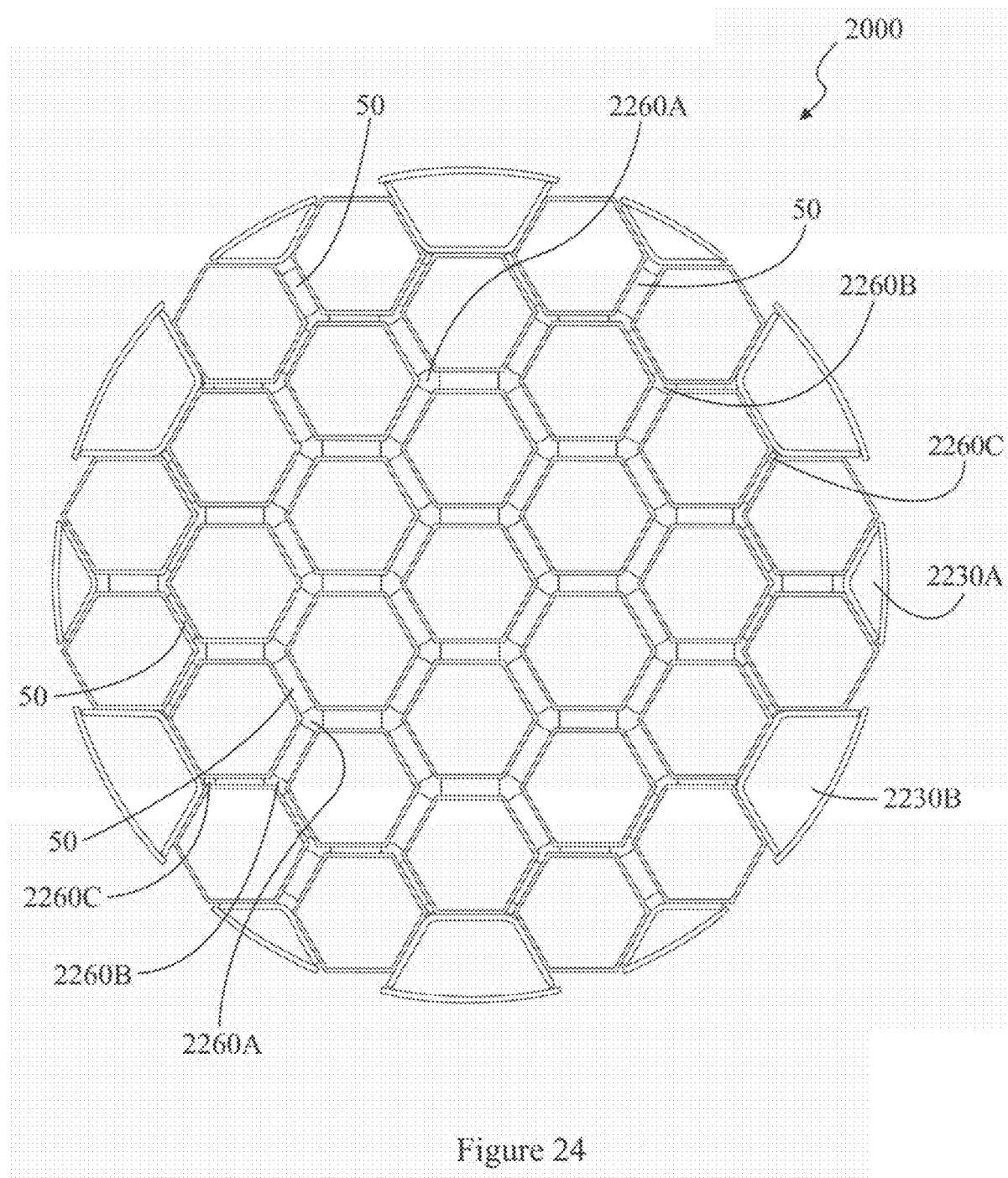
FIG. 24 is a top view of the fuel basket of FIG. 19.

Referring now to FIG. 23, a top perspective view of the fuel basket assembly 2000 is illustrated. The basket assembly 2000 comprises three types of spacers 2260A-C that form flux traps 50 between the tubes 2210. The first type of spacer 2260A is a unilateral triangle that maintains the largest gap between the tubes 2210 located near the central axis of the basket 2000. In other words, the spacer 2260A is used with the tubes 2210 that are closest to the center of the basket 2000 because the neutrons emitted by the fuel assemblies in the center of the basket 2000 cannot easily escape to the perimeter of the basket assembly 2000. Thus, for maintaining a reactivity of less than 0.95, a larger flux trap 50 is required. A second shape of spacer 2260B is used between the storage tubes 2210 that are nearer the outer perimeter of the fuel basket 2000. A rectangular spacer 2260C is used for the storage tubes 2210 that are nearest to the outer perimeter formed by basket supports 2230A,B.

The fuel baskets 1000, 2000 of the present invention are not limited to use with any particular type of surrounding vessels. For example, in one embodiment, the basket assemblies 1000, 2000 can be incorporated into a hermetically sealable multi-purpose canister for use in conjunction with VVO style containment systems. In such an embodiment, the basket assemblies 1000, 2000 will be provided in a cavity formed by a cylindrical metal shell. The metal shell will encircle the basket assembly 1000, 2000 and a metal base plate may be welded to the bottom of the metal shell. A metal closure plate can be fitted on top of the cylinder formed by the metal shell, thereby forming a canister. Thermally conductive casks can also be used to house the fuel baskets 1000, 2000 directly.

II. Inventive Concept 2

With reference to FIGS. 25-33, a second inventive concept will be described.

Figure 25:
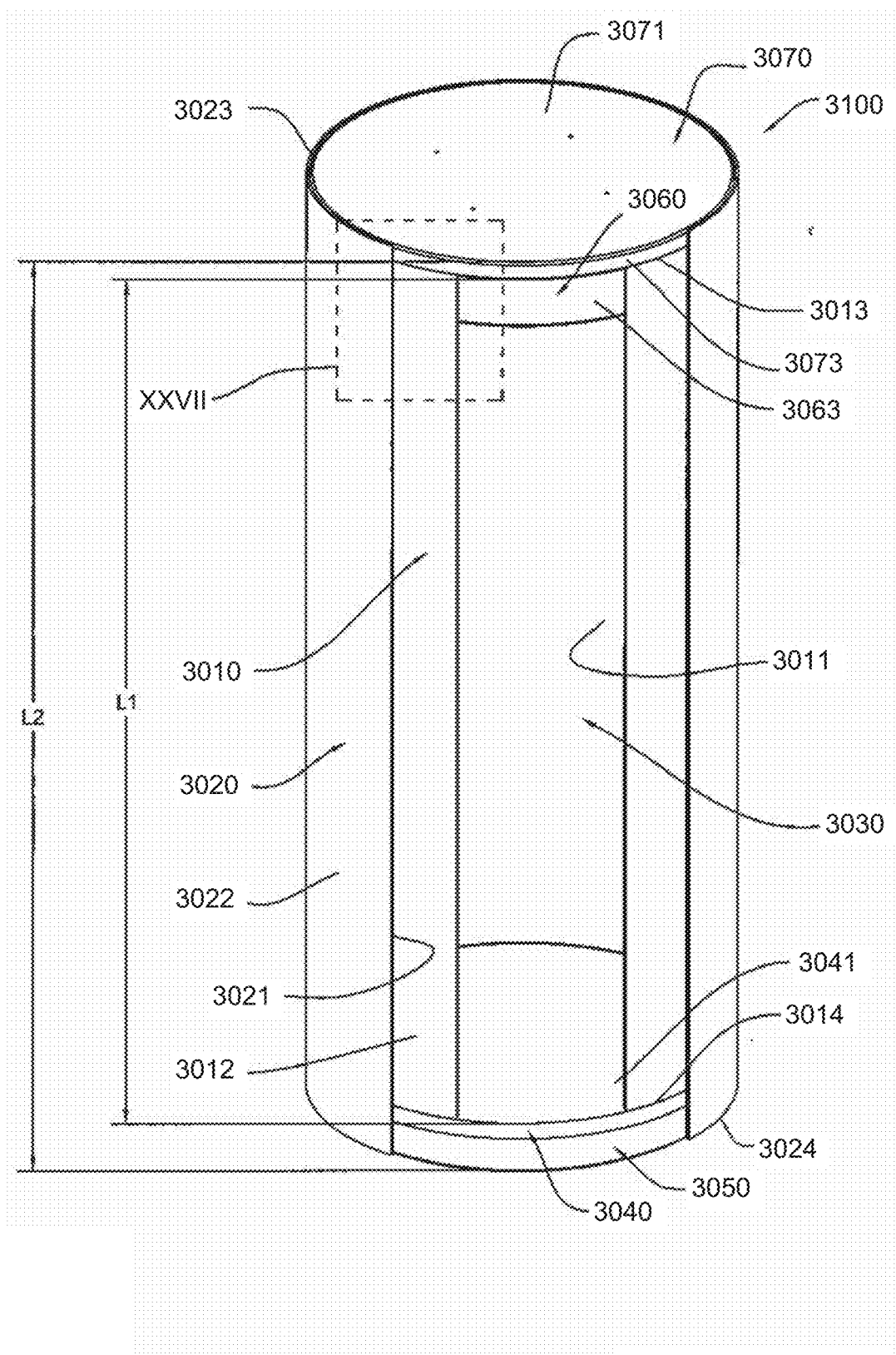
FIG. 25 is a top perspective view of a dual-walled DSC according to one embodiment of the present invention having a section cut-away.

Referring to FIG. 25, a dual-walled DSC 3100 according to one embodiment of the present invention is disclosed. The dual-walled DSC 3100 and its components are illustrated and described as an MPC style structure. However, it is to be understood that the concepts and ideas disclosed herein can be applied to other areas of high level radioactive waste storage, transportation and support. Moreover, while the dual-walled DSC 3100 is described as being used in combination with a specially designed fuel basket 3090 (which in of itself constitutes an invention), the dual-walled DSC 3100 can be used with any style of fuel basket, such as the one described in U.S. Pat. No. 5,898,747, to Krishna P. Singh, issued Apr. 27, 1999. In fact, in some instances it may be possible to use the dual-walled DSC 3100 without a fuel basket, depending on the intended function. Furthermore, the dual-walled DSC 3100 can be used to store and/or transport any type of high level radioactive waste and is not limited to SNF.

As will become apparent from the structural description below, the dual-walled DSC 3100 contains two independent containment boundaries about the storage cavity 3030 that operate to contain both fluidic (gas and liquid) and particulate radiological matter within the cavity 3030. As a result, if one containment boundary were to fail, the other containment boundary will remain intact. While theoretically the same, the containment boundaries formed by the dual-walled DSC 3100 about the cavity 3030 can be literalized in many ways, including without limitation a gas-tight containment boundary, a pressure vessel, a hermetic containment boundary, a radiological containment boundary, and a containment boundary for fluidic and particulate matter. These terms are used synonymously throughout this application. In one instance, these terms generally refer to a type of boundary that surrounds a space and prohibits all fluidic and particulate matter from escaping from and/or entering into the space when subjected to the required operating conditions, such as pressures, temperatures, etc.

Finally, while the dual-walled DSC 3100 is illustrated and described in a vertical orientation, it is to be understood that the dual-walled DSC 3100 can be used to store and/or transport its load in any desired orientation, including at an angle or horizontally. Thus, use of all relative terms through this specification, including without limitation "top," "bottom," "inner" and "outer," are used for convenience only and are not intended to be limiting of the invention in such a manner.

The dual-walled DSC 3100 dispenses with the single-walled body concept of the prior art DSCs. More specifically, the dual walled DSC 3100 comprises a first shell that acts as an inner shell 3010 and a second shell that acts as an outer shell 3020. The inner and outer shells 3010, 3020 are preferably cylindrical tubes and are constructed of a metal. Of course, other shapes can be used if desired. The inner shell 3010 is a tubular hollow shell that comprises an inner surface 3011, an outer surface 3012, a top edge 3013 and a bottom edge 3014. The inner surface 3011 of the inner shell 3010 forms a cavity/space 3030 for receiving and storing SNF. The cavity 3030 is a cylindrical cavity formed about a central axis.

The outer shell 3020 is also a tubular hollow shell that comprises an inner surface 3021, an outer surface 3022, a top edge 3023 and a bottom edge 3024. The outer shell 3020 circumferentially surrounds the inner shell 3010. The inner shell 3010 and the outer shell 3020 are constructed so that the inner surface 3021 of the outer shell 3020 is in substantially continuous surface contact with the outer surface 3012 of the inner shell 3010. In other words, the interface between the inner shell 3010 and the outer shell 3020 is substantially free of gaps/voids and are in conformal contact. This can be achieved through an explosive joining, a cladding process, a roller bonding process and/or a mechanical compression process that bonds the inner shell 3010 to the outer shell 3020. The continuous surface contact at the interface between the inner shell 3010 and the outer shell 3020 reduces the resistance to the transmission of heat through the inner and outer shells 3010, 3020 to a negligible value. Thus, heat emanating from the SNF loaded within the cavity 3030 can efficiently and effectively be conducted outward through the shells 3010, 3020 where it is removed from the outer surface 3022 of the outer shell via convection.

The inner and outer shells 3010, 3020 are preferably both made of a metal. As used herein, the term metal refers to both pure metals and metal alloys. Suitable metals include without limitation austenitic stainless steel and other alloys including Hastelloy™ and Inconel™. Of course, other materials can be utilized. The thickness of each of the inner and outer shells 3010, 3020 is preferably in the range of 5 mm to 25 mm. The outer diameter of the outer shell 3020 is preferably in the range of 1700 mm to 2000 mm. The inner diameter of the inner shell 3010 is preferably in the range of 1700 mm to 1900 mm. The invention, however, is not limited to any specific size and/or thickness of the shells 3010, 3020.

In some embodiments, it may be further preferable that the inner shell 3010 be constructed of a metal that has a coefficient of thermal expansion that is equal to or greater than the coefficient of thermal expansion of the metal of which the outer shell 20 is constructed. Thus, when the SNF that is stored in the cavity 3030 emits heat, the outer shell 3020 will not expand away from the inner shell 3010. This ensures that the continuous surface contact between the outer surface 3012 of the inner shell 3010 and the outer surface 3021 of the outer shell 3020 will be maintained and gaps will not form under heat loading conditions.

The dual-walled DSC 3100 further comprises a first lid that acts as an inner top lid 3060 for the inner shell 3010 and a second lid that acts as an outer top lid 3070 for the outer shell 3020. The inner and outer top lids 3060, 3070 are plate-like structures that are preferably constructed of the same materials discussed above with respect to the shells 3010, 3020. Preferably the thickness of the inner top lid 3060 is in the range of 100 mm to 300 mm. The thickness of the outer top lid is preferably in the range of 50 mm to 150 mm. The invention is not, however, limited to any specific dimensions, which will be dictated on a case-by-case basis and the radioactive levels of the SNF to be stored in the cavity 3030.

Figure 26:
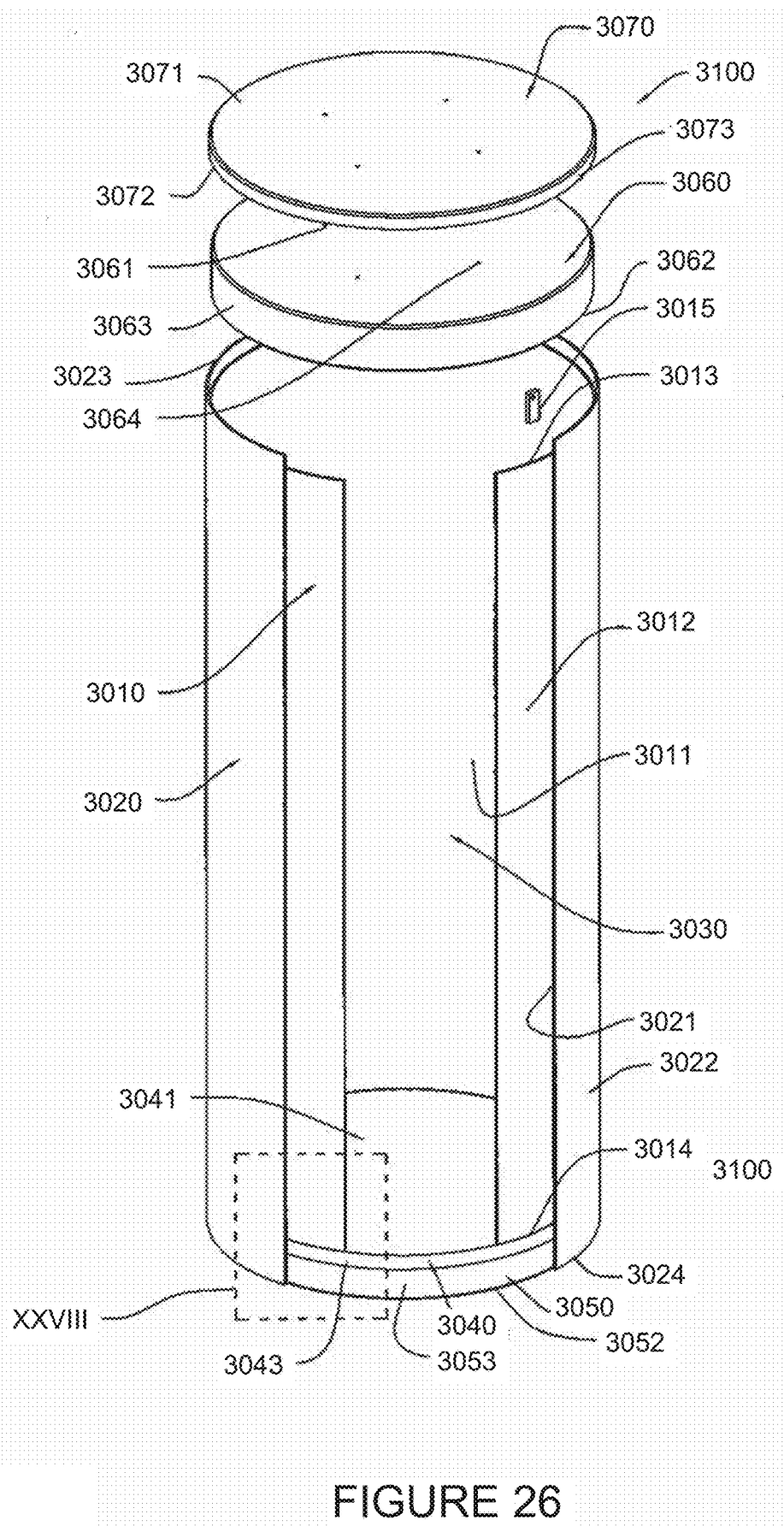
FIG. 26 is an exploded view of the dual-walled DSC of FIG. 1 showing the inner and outer top lids removed from the inner and outer shells.

Referring now to FIG. 26, the inner top lid 3060 comprises a top surface 3061, a bottom surface 3062 and an outer lateral surface/edge 3063. The outer top lid 3070 comprises a top surface 3071, a bottom surface 3072 and an outer lateral surface/edge 3073. When fully assembled, the outer lid 3070 is positioned atop the inner lid 3060 so that the bottom surface 3072 of the outer lid 3070 is in substantially continuous surface contact with the top surface 3061 of the inner lid 3060.

During an SNF underwater loading procedure, the inner and outer lids 3060, 3070 are removed. Once the cavity 3030 is loaded with the SNF, the inner top lid 3060 is positioned so as to enclose the top end of the cavity 3030 and rests atop the brackets 3015. Once the inner top lid 3060 is in place and seal welded to the inner shell 3010, the cavity 3030 is evacuated/dried via the appropriate method and backfilled with nitrogen, helium or another inert gas. The drying and backfilling process of the cavity 3030 is achieved via the holes 3064 of the inner lid 3060 that form passageways into the cavity 3030. Once the drying and backfilling is complete, the holes 3061 are filled with a metal or other wise plugged so as to hermetically seal the cavity 3030.

Figure 27:
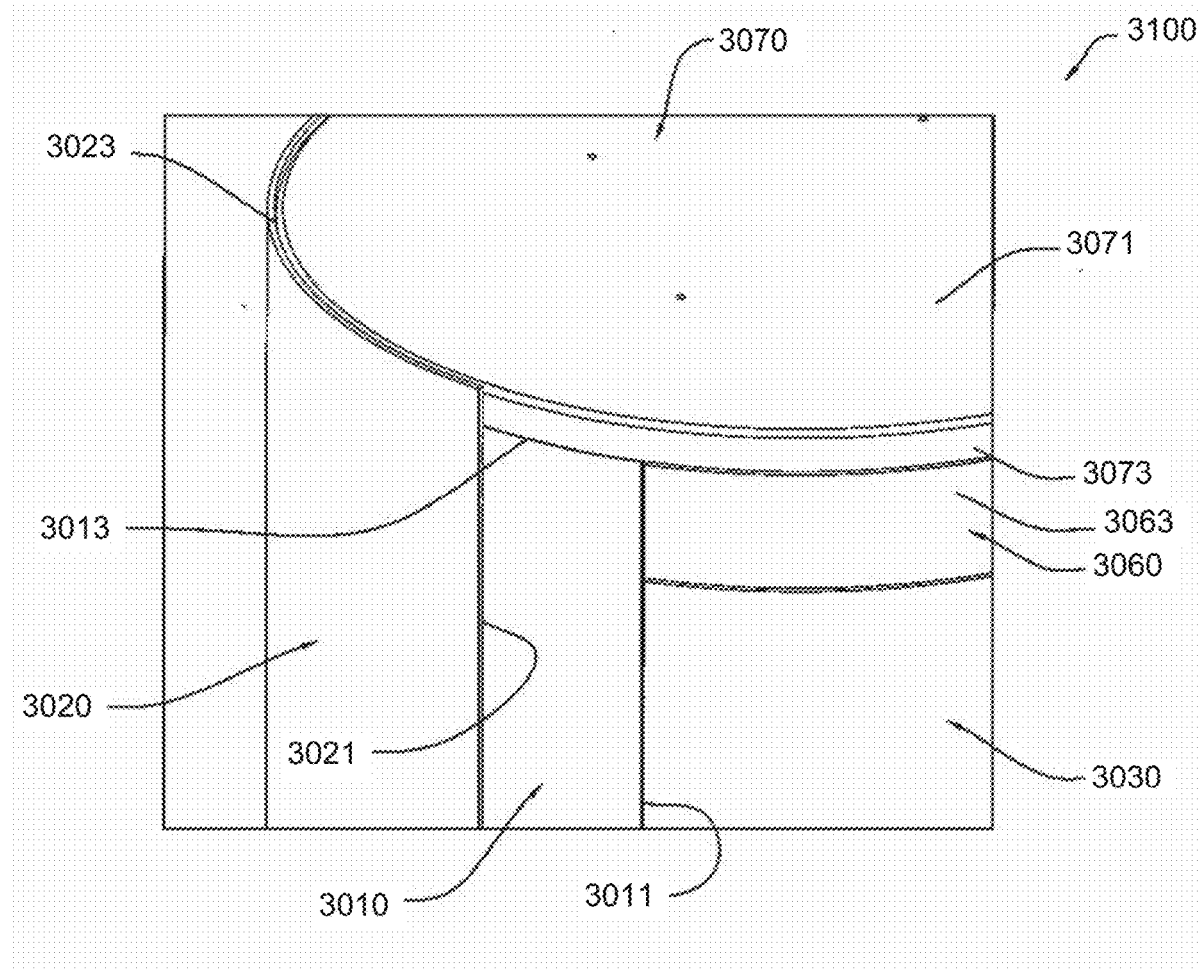
FIG. 27 is a close-up view of the area XXVII of FIG. 25

Referring now to FIGS. 25 and 27 concurrently, the outer shell 3020 has an axial length L2 that is greater than the axial length L1 of the inner shell 3010. As such, the top edge 3013 of the inner shell 3010 extends beyond the top edge 3023 of the outer shell 3020. Similarly, the bottom edge 3024 of the outer shell 3020 extends beyond the bottom edge 3013 of the inner shell 3010.

The offset between the top edges 3013, 3023 of the shells 3010, 3020 allows the top edge 3013 of the inner shell 3010 to act as a ledge for receiving and supporting the outer top lid 3070. When the inner lid 3060 is in place, the inner surface 3011 of the inner shell 3010 extends over the outer lateral edges 3063. When the outer lid 3070 is then positioned atop the inner lid 3060, the inner surface 3021 of the outer shell 3020 extends over the outer lateral edge 3073 of the outer top lid 3070. The top edge 3023 of the outer shell 3020 is substantially flush with the top surface 3071 of the outer top lid 3070. The inner and outer top lids 3060, 3070 are welded to the inner and outer shells 3010, 3020 respectively after the fuel is loaded into the cavity 3030. Conventional edge groove welds can be used. However, it is preferred that all connections between the components of the dual-walled DSC 3100 be through-thickness weld.

The dual-walled DSC 3100 further comprises a first plate that acts as an inner base plate 3040 and a second plate that acts as an outer base plate 3050. The inner and outer base plates 3040, 3050 are rigid plate-like structures having circular horizontal cross-sections. The invention is not so limited, however, and the shape and size of the base plates 3040, 3050 is dependent upon the shape of the inner and outer shells 3010, 3020. The inner base plate 3040 comprises a top surface 3041, a bottom surface 3042 and an outer lateral surface/edge 3043. Similarly, the outer base plate 3050 comprises a top surface 3051, a bottom surface 3052 and an outer lateral surface/edge 3053.

The top surface 3041 of the inner base plate 3040 forms the floor of the cavity 3030. The inner base plate 3040 rests atop the outer base plate 3050. Similar to the other corresponding components of the dual-walled DSC 3100, the bottom surface 3042 of the inner base plate 3040 is in substantially continuous surface contact with the top surface 3051 of the outer base plate 3050. As a result, the interface between the inner base plate 3040 and the outer base plate 3050 is free of gaseous gaps/voids for thermal conduction optimization. An explosive joining, a cladding process, a roller bonding process and/or a mechanical compression process can be used to effectuate the contact between the base plates 3040, 3050. Preferably, the thickness of the inner base plate 3040 is in the range of 50 mm to 150 mm. The thickness of the outer base plate 3050 is preferably in the range of 100 mm to 200 mm. Preferably, the length from the top surface of the outer top lid 3070 to the bottom surface of the outer base plate 3050 is in the range of 4000 mm to 5000 mm, but the invention is in no way limited to any specific dimensions.

The outer base plate 3050 may be equipped on its bottom surface with a grapple ring (not shown) for handling purposes. The thickness of the grapple ring is preferably between 50 mm and 150 mm. The outer diameter of the grapple ring is preferably between 350 mm and 450 mm.

Figure 28:
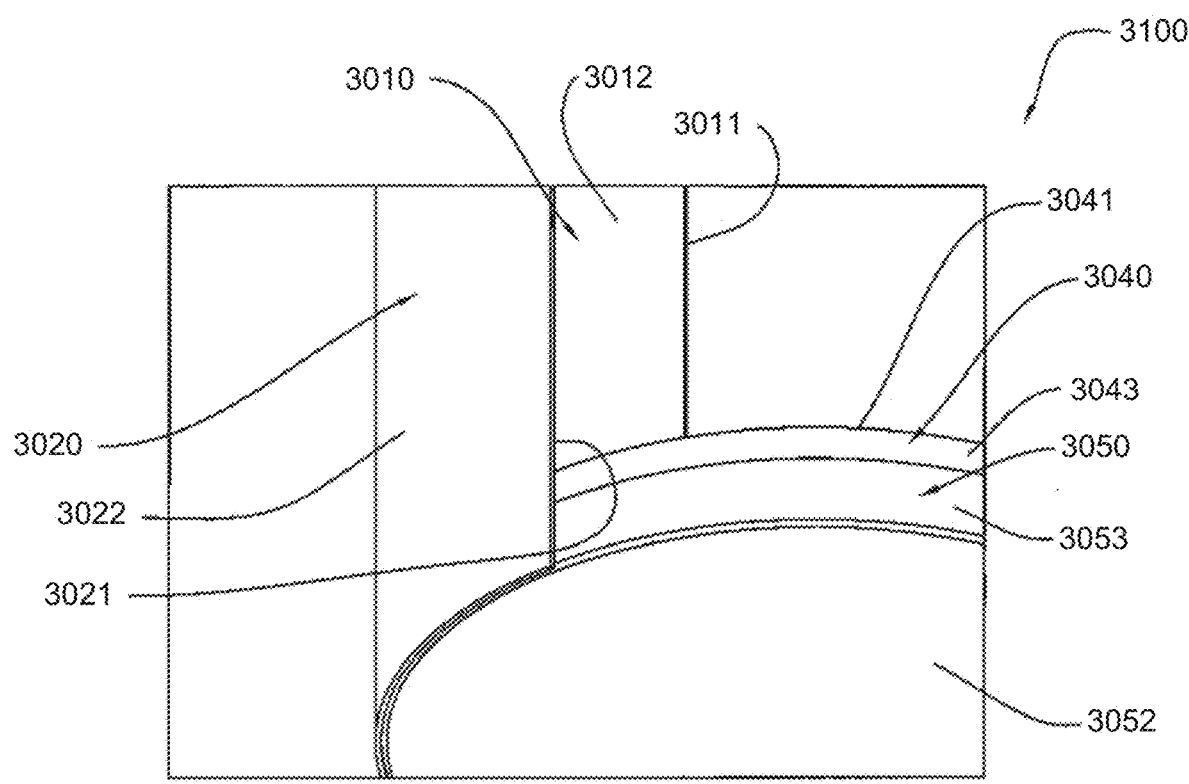
FIG. 28 is a close-up view of the area XXVIII of FIG. 26.

Referring now to FIGS. 26 and 28 concurrently, the inner shell 3010 rests atop the inner base plate 3040 in a substantially upright orientation. The bottom edge 3014 of the inner shell 3010 is connected to the top surface 3041 of the inner base plate 3040 by a through-thickness single groove (V or J shape) weld. The outer surface 3012 of the inner shell 3010 is substantially flush with the outer lateral edge 3043 of the inner base plate 3040. The outer shell 3020, which circumferentially surrounds the inner shell 3010, extends over the outer lateral edges 3043, 3053 of the inner and outer base plates 3040, 3050 so that the bottom edge 3024 of the outer shell 3020 is substantially flush with the bottom surface 3052 of the outer base plate 3050. The inner surface 3021 of the outer shell 3020 is also connected to the outer base plate 3050 using a through-thickness edge weld. In an alternative embodiment, the bottom edge 3024 of the outer shell 3020 could rest atop the top surface 3051 of the outer base plate 3050 (rather than extending over the outer later edge of the base plate 3050). In that embodiment, the bottom edge 3024 of the outer shell 3020 could be welded to the top surface 3051 of the outer base plate 3050.

When all of the seal welds discussed above are completed, the combination of the inner shell 3010, the inner base plate 3040 and the inner top lid 3060 forms a first hermetically sealed structure surrounding the cavity 3030, thereby creating a first pressure vessel. Similarly, the combination of the outer shell 3020, the outer base plate 3050 and the outer top lid 3070 form a second sealed structure about the first hermetically sealed structure, thereby creating a second pressure vessel about the first pressure vessel and the cavity 3030. Theoretically, the first pressure vessel is located within the internal cavity of the second pressure vessel. Each pressure vessel is engineered to autonomously meet the stress limits of the ASME Code with significant margins.

Unlike the prior art DSC, all of the SNF stored in the cavity 3030 of the dual-walled DSC 3100 share a common confinement space. The common confinement space (i.e., cavity 3030) is protected by two independent gas-tight pressure retention boundaries. Each of these boundaries can withstand both sub-atmospheric supra-atmospheric pressures as needed, even when subjected to the thermal load given off by the SNF within the cavity 3030.

Figure 29:
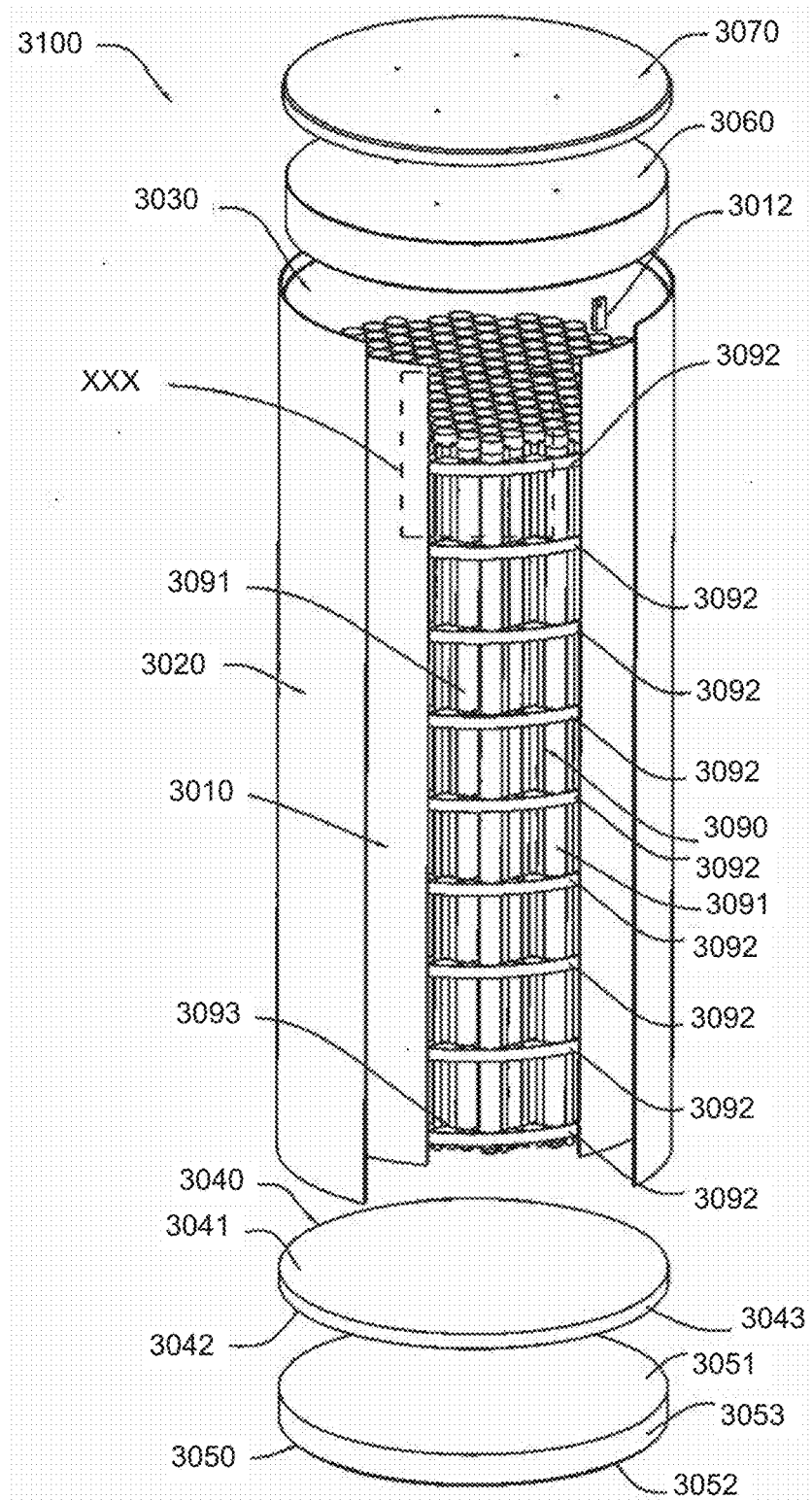
FIG. 29 is a perspective view of the dual-walled DSC of FIG. 25 having a section cut-away and having a fuel basket according to one embodiment of the present invention positioned within the storage cavity.

Referring now to FIG. 29, the dual-walled DSC 3100 is illustrated having a fuel basket 3090 positioned within the cavity 3030 in a free-standing orientation. The fuel basket 3090 serves to hold and support a plurality of SNF rods (which are located within fuel tubes 3091) in the desired arrangement and maintains the desired separate locality. The fuel basket 3090 comprises a plurality of disk-like grates 3092 arranged in a stacked and spaced orientation. The separation between the disk-like grates 3092 is accomplished via a plurality of vertically oriented tie-rods that pass through the cells of the disk-like grates 3092. Once the tie rods are in place, one of the disk-like grates 3092 is slid into position. Tubular sleeves that can not pass through the cells are then placed over the tie-rods and above the disk-like grates 3092 in place. The next disk-like grates 3092 is then slid down the tie rods. However, because the tubular sleeves can not pass through the disk-like grates 3092, the two disk-like grates 3092 are maintained in the spaced relation.

The grates 3092 are disc-like frames comprising a ring 3185 and a plurality of series of beams 3182, 3183, 3184. The outer surface 3186 of the ring 3185 is in surface contact with the inner surface 3011 of the inner shell 3010. The outer diameter of the disk-like grate 3092 is preferably 1700 mm to 1900 mm. The outer diameter, however, is dependent upon the size of the cavity 3030.

In the illustrated embodiment, the number of grates 3092 is nine, and the thickness of each grate 3092 is preferably between 1 mm and 10 mm. However, the invention is not so limited, so long as the SNF rods are adequately supported within the cavity 3030.

Figure 30:
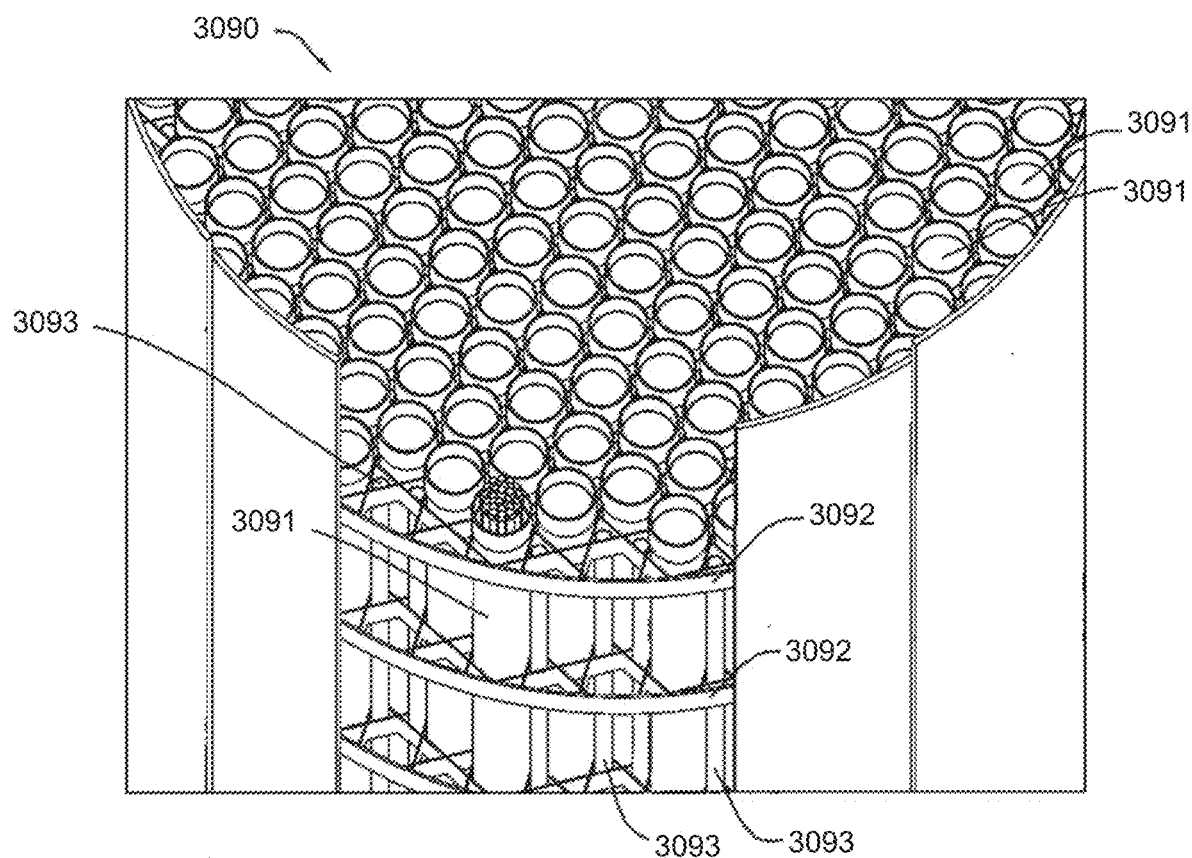
FIG. 30 is a close-up view of area XXX of FIG. 29.

Referring now to FIGS. 29 and 30, concurrently, the fuel basket 3090 further comprises a plurality of ventilate fuel tubes 3091. As will be discussed in greater detail below, when assembled, the ventilated fuel tubes 3091 are inserted through the cells 3180 of the stack of grates 3092, which are aligned. The ventilated fuel tubes 3091 form cylindrical cavities 3193 (FIG. 33) in which the SNF rods will reside. Preferably, the fuel cells 3180 around the outer perimeter of the grates 3092 (i.e. the slots 180 nearest to the inner surface 3011 of the inner shell 3010) remain free of SNF rods.

Figure 31:
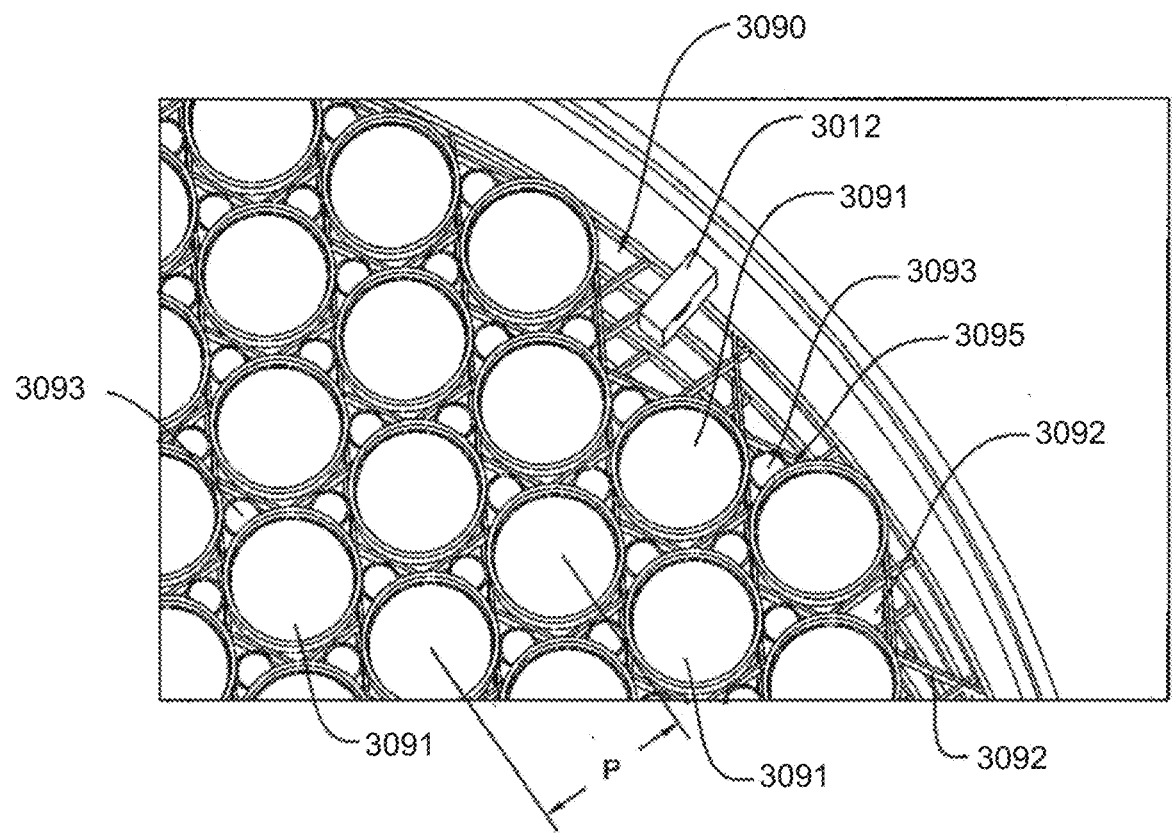
FIG. 31 is a top view of a portion of the dual-walled DSC of FIG. 29 with the lid assembly removed and fuel basket positioned therein.

Referring now to FIG. 31, the grates 3092 also comprise a plurality of smaller cells 3181 for slidably receiving poison rods 3093. The poison rods 3093 are provided between the loaded fuel tubes 3091 to control reactivity in necessary cases. The number of poison rods 3093 is selected to ensure that the computed $k_{eff}$ of the SNF rods at maximum design basis initial enrichment, with no credit for burn up, and with the inclusion of all uncertainties and biases is less than 0.95. However, in some embodiments, the poison rods 3093 may not be required at all.

The pitch P between each of the ventilated fuel tubes 3091 is between 100 mm and 150 mm. The invention is not so limited however, and the pitch between the ventilated fuel tubes 3091 is affected by both the size of the cavity 3030 and the number and location of the poison rods 3093, and the radioactivity of the load to be stored.

Figure 32:
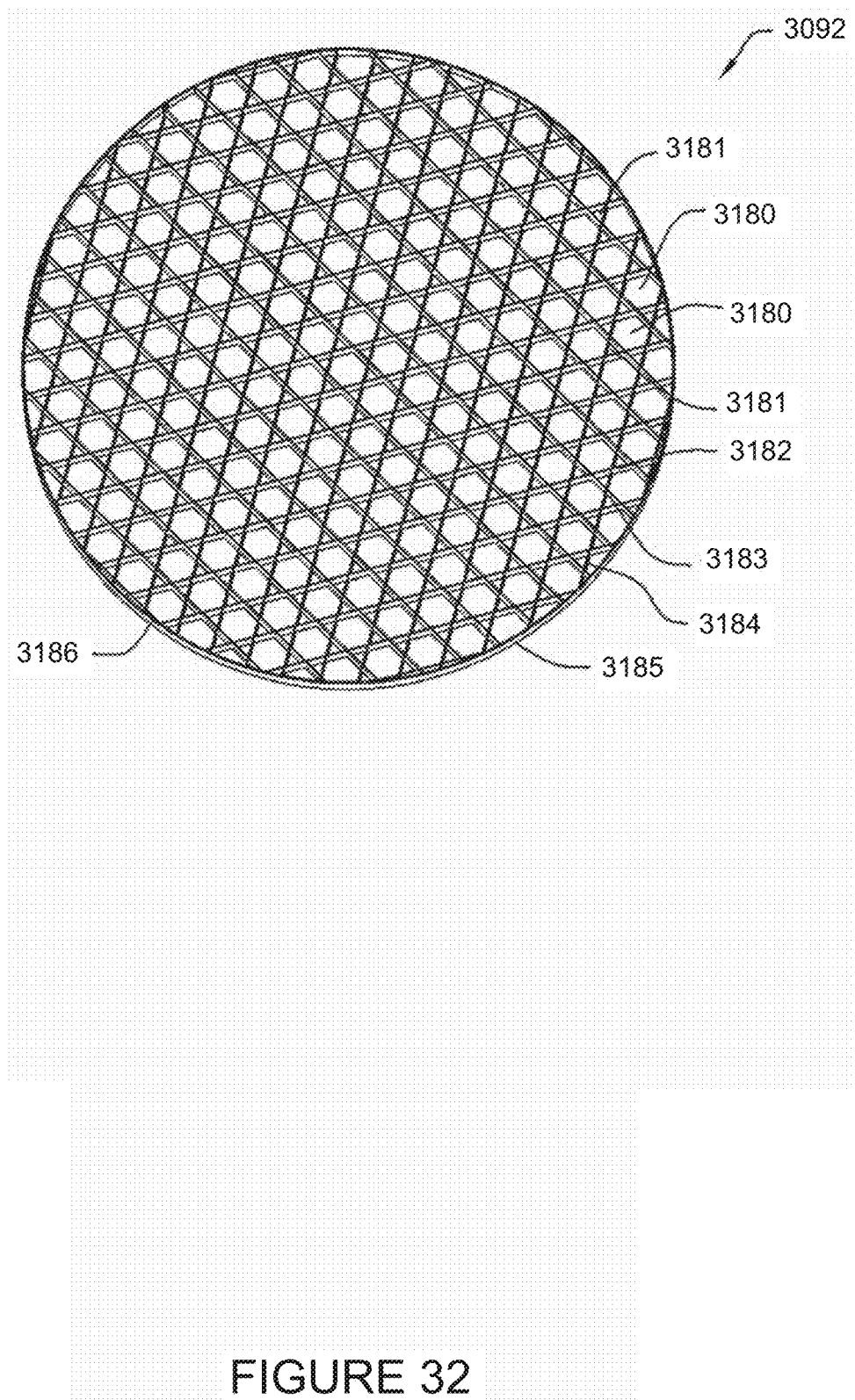
FIG. 32 is a top perspective view of the disk-like grate components of the fuel basket of FIG. 31 according to one embodiment of the present invention.

Referring now to FIG. 32, a top view of one of the grates 3092 is illustrated. The grate 3092 is a honey-comb grid like structure. The grates 3092 comprise a ring structure 3185, a first series of substantially parallel beams 3182, a second series of substantially parallel beams 3183 and a third series of substantially parallel beams 3184. The ring structure 185 encompasses the first, second and third series of substantially parallel beams 3182-3184. The entire grate 3092 can be constructed of a metal, such as steel or aluminum, or any of the materials discussed above.

The first, second and third series of substantially parallel beams 3182-3184 are arranged within the ring structure 3185 so that each one of the series of beams 3182-3184 intersects with the other two series of beams 3182-3184. The intersection of the series beams 3182-3184 forms a gridwork that results in an array of fuel cells 3180 and an array of poison rod cells 3181. More specifically, the general outline of the fuel cells 3180 is created by the intersection of the first and second series of beams 3182, 3183 while the poison rod cells 3181 are created by the intersection of the third series of beams 3184 with the first and second series of beams 3182, 3183. When assembled, the fuel cells 3180 receive the fuel tubes 3091 while the poison rod cells 3181 receive the poison rods 3093. As can be seen the poison rod cells 3181 are smaller and of a different shape than the fuel cells 3180.

The relative arrangement of first, second and third series of substantially parallel beams 3182-3184 with respect to one another is specifically selected to create hexagonal shaped fuel cells 3180 and triangular shaped poison cells 3181. Of course, additional series of beams and/or arrangement can be used to create cells that have different shapes, including octagonal, pentagonal, circular, square, etc. The desired shape may be dictated by the shape of the fuel tube and SNF fuel assembly to be stored.

The series of beams 3182, 3183, 3184 are rectangular strips (i.e., elongated plates) having notches (not visible) strategically located along their length to facilitate assembly. More specifically, notches that extend into the edges of the beams for at least ½ the height of the beams are provided. The notches are arranged on the beams 3182-3184 so that when the beams 3182-3184 are arranged in the desired gridwork, the notches of the bottom edge of some beams 3182-3184 are aligned with the notches on the top edge of the remaining beams 3182-3184. The beams 3182-3184 can then slidably mate with one another via the interaction between the notches.

The beams 3182, 3183, 3184 are then welded to each other at their intersecting points via tungsten inert gas process. While the beams 3182-3184 are illustrated as strips, the invention is not so limited and other structures may be used to form the gridwork, such as rods.

Figure 33:
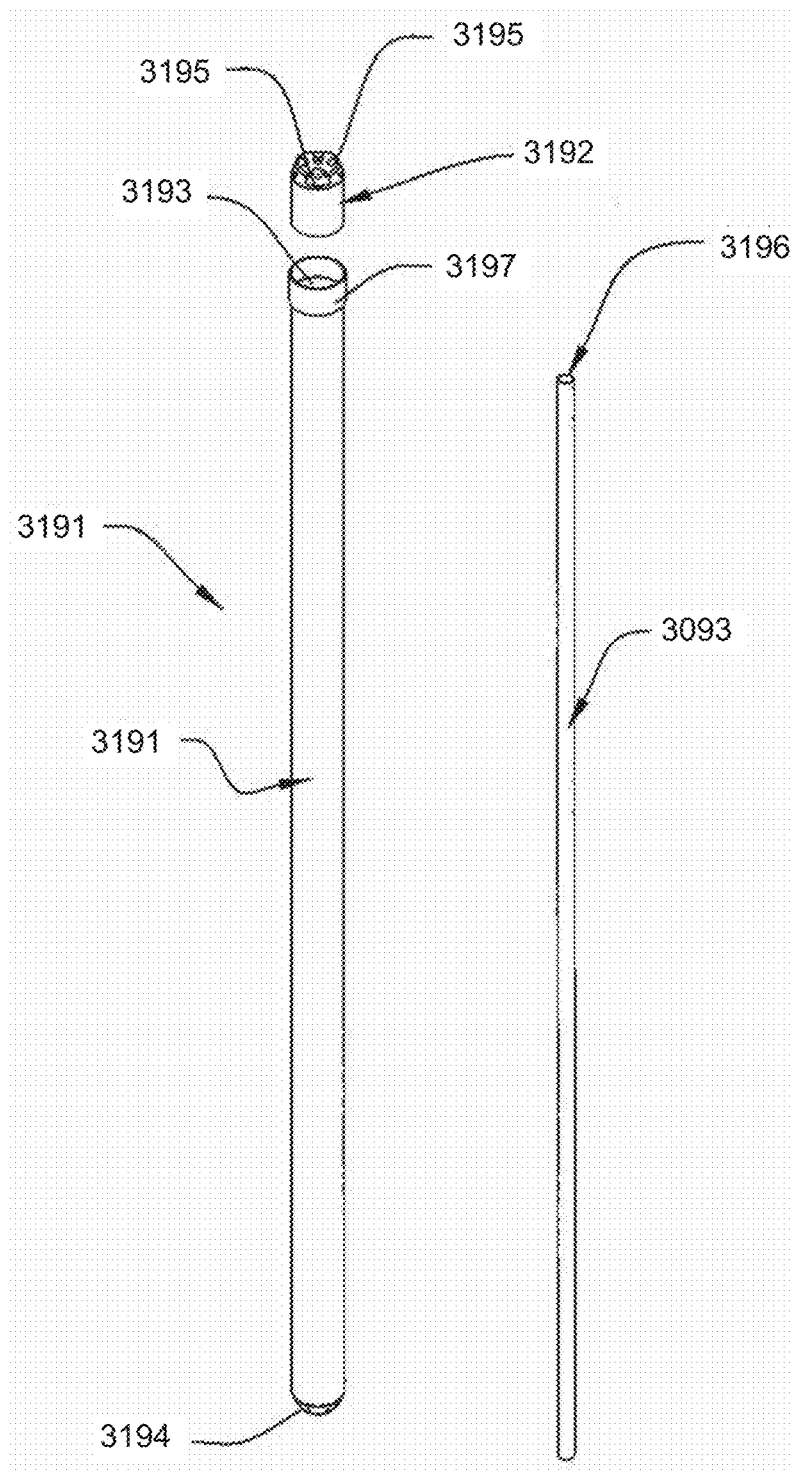
FIG. 33 is a perspective view of the ventilated fuel tube and the poison rod of the fuel basket assembly of FIG. 31 removed therefrom according to one embodiment the present invention.

Referring now to FIG. 33, the structure of the poison rods 3093 and the ventilated fuel tubes 3091 will be described. In the illustrated embodiment, the poison rods 3093 are hollow tubular members having a cavity 3196 for receiving a neutron absorbing material. For example, the hollow tubular member can be constructed of a stainless steel and filled with boron-carbide powder. In other embodiment, the poison rods 3093 can be constructed of a monolithic material, such as a metal matrix material, such as Metamic™.

The outer diameter of the poison rods 3093 is between 20 mm and 40 mm and the inner diameter is between 10 mm and 40 mm. The invention is not so limited, however. When assembled in the DSC 3100, the poison rods 3093 are of a sufficient length so as to extend along the full height of the SNF rods stored within the fuel tubes 3091.

Turning now to the fuel tubes 3091, the ventilated fuel tubes 3091 are designed to allow for ventilation of heat emitted by the SNF rods 3200 stored therein. The ventilated fuel tube 3091 comprises a tubular body portion 3191 and a ventilated cap portion 3192. The tubular body portion 3191 forms a cavity 3193 for receiving the SNF rods 3200, e.g., in the form of fuel bundles (half fuel assemblies). Preferably, the ventilated fuel tubes 3091 have a horizontal cross sectional profile such that the cavity 3193 accommodates no more than one fuel bundle. However, this is not limiting of the invention. The outer and inner diameter of the tubular body portion 3191 of the ventilated fuel tube 3091 is preferably between 75 mm and 125 mm, but the invention is not so limited.

The tubular body portion 3191 comprises a closed bottom end 3194 and open top end 3197. The closed bottom end 3197 is a tapered and flat bottom. As will be discussed in further detail below, the tapering of the closed bottom end 3197 allows for better air flow through the dual walled DSC 3100. In an alternative embodiment, the closed bottom end 3197 could further comprise holes and/or vents for improved air flow and heat removal. The ventilated cap portion 3192 is connected to the open top end of the body portion 3191 once the cavity 3193 is filled with the SNF rods 3200. The cap portion 3192 is a non-unitary structure with respect to the tubular body 3191 and removable therefrom. The caps 3192 prevent any of the solid contents from spilling out during handling operations in the processing facility.

The caps 3192 of the tubes 391 comprise one or more openings 3195 that provide passageways into the cavity 3193 from the cavity 3030. The openings 3195 are covered with fine-mesh screen (not visible) so as to prevent any build-up of pressure in the fuel tube 3191 while containing any small debris within the cavity 3193 of the tube 3091. It has been discovered that one inherent flaw in the design of the NUHOMS DSC is that the hermetically sealed fuel tube creates a mini-pressure vessel around the SNF rods stored therein. Because of the small confinement space/volume available in the hermetically sealed fuel tube of the NUHOMS DSC, even a small amount of water or release of plenum gas from the inside of the SNF rods can raise the internal pressure in the fuel tube steeply, rendering it susceptible to bursting. As a result, the integrity of the fuel tube of the NUHOMS DSC as a pressure vessel can not be assured when used to store previously waterlogged SNF rods that contain micro-cracks with a high level of confidence. The ventilated fuel tubes 3091 of the present invention, on the other hand, prevent pressure build-up by allowing ventilation with the larger cavity 3030 via the opening 3195 in the cap 3192. The openings 3195 are generally triangular in shape, but can be circular, rectangular or any other shape, so long as the proper venting is achieved.

Referring again to FIG. 29, when the ventilated fuel tubes 3092 are positioned in the dual walled DSC 3100, a plenum exists between the top of the ventilated fuel tubes 3091 and the bottom surface 3062 of the inner top lid 3060. As mentioned previously, it is also preferable that the perimeter of the grid plate 3092 remain free of fuel tubes 3091.

III. Inventive Concept 3

With reference to FIGS. 34-42, a third inventive concept will be described.

Figure 34:
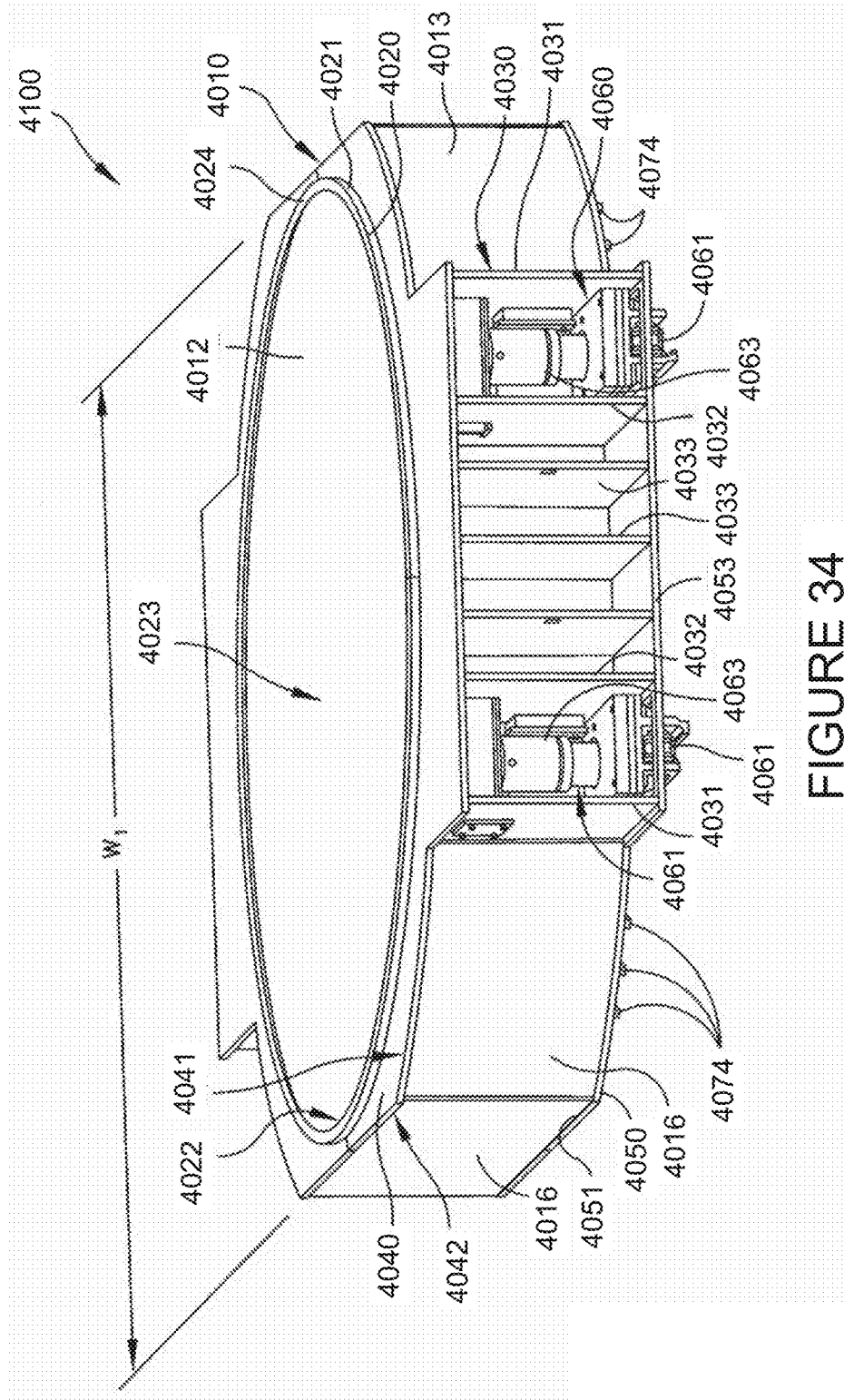
FIG. 34 is a top perspective view of a low profile transporter according to one embodiment of the present invention.

FIG. 34 is a front perspective view of a low profile transporter ("LPT") 4100. The LPT 4100 translates casks that are used in the handling and storing of spent nuclear fuel, such as storage casks used in the long-term dry storage of spent nuclear fuel. The LPT 4100 is not limited to storage casks, however and other types of casks and/or structures can be translated in the LPT 4100. The LPT 4100 supports and translates loads in excess of 200 tons and high overturning moments without deforming. As will be discussed below, the LPT 4100 carries the cask close to the ground while avoiding interference with the irregularities in the ground surface. The LPT 4100 can either ride in tracks 4090 on the ground surface 4006 (shown in FIG. 42) or move along the ground surface 4006 itself. Preferably, as will be discussed in greater detail below, the LPT 4100 supports and translates a cask so that the top surface of the cask is less than 24 feet from the ground. Additionally, the LPT 4100 has a width W1 that allows it to fit through standard over head door. The LPT 4100 is designed so that its width W1 is smaller than its length.

Figure 35:
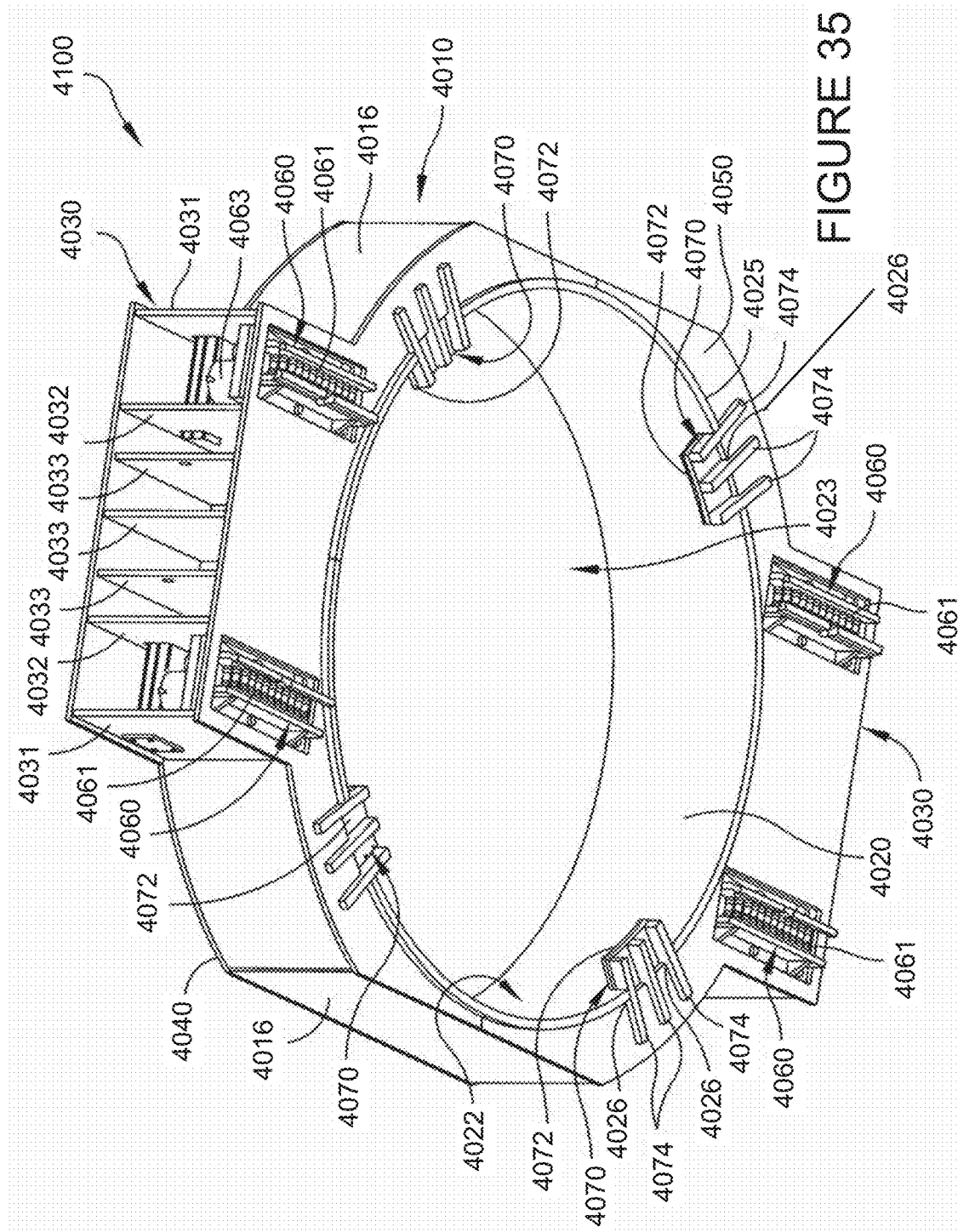
FIG. 35 is a bottom perspective view of the transporter of FIG. 34 according to one embodiment of the present invention.

Referring to FIGS. 34 and 35, the LPT 4100 generally comprises a body 4010 and roller assemblies 4060. The body 4010 has an open top end 4012 and a cavity 4023 for receiving a cask. The cavity 4023 has a horizontal cross-sectional profile that is circular. The diameter of the cavity 4023 is slightly larger than the diameter of the cask 4200 (shown in FIG. 40) to be loaded therein. Preferably, there is a small clearance between the cask 4200 (shown in FIG. 40) and the body 4010 equal to about ½ inch to 1 inch. The invention is not so limited however, and the size and shape of the cavity 4023 will vary depending upon the size and shape of the cask to be positioned therein so long as the small clearance is maintained between the cask and the body 10.

The roller assemblies 4060 include rollers 4061 that allow for the translation of the LPT 4100. The roller assemblies are positioned at opposite ends of the LPT 4100 so that the width W1 of the LPT 4100 is minimized. When the LPT 4100 is in motion, the rollers 4061 are at the lead and trail ends of the motion. This makes it easier for the LPT 4100 to fit through narrow passageways like overhead doors. Additionally, as will be discussed in further detail below with reference to FIGS. 37 and 38, the roller assemblies 4060 are designed so that the rollers 4061 can be extended and retracted in the vertical direction between a fully extended position and a fully retracted position. When the rollers 4061 are in the extended position, the rollers 4061 contact the ground and support the full weight of the ZPT 4100 and its load. When the rollers 4061 are in the retracted position, they are moved in the vertical direction so as to be raised from the ground so that the rollers no longer support the weight of the LPT 4100 or its load. Preferably, when the rollers 4061 are in the fully extended position, the height of the LPT 4100 is less than 37 inches.

The body 4010 comprises a ring 4020, an upper plate 4040 and a lower plate 4050. The ring 4020 has an outer surface 4021, an inner surface 4022, a top surface 4024 and a bottom surface 4025. The ring 4020 is preferably made of steel between 2 and 4 inches in thickness. The invention is not so limited, however, and other materials, including but not limited to other metals, may be used. The thickness of the ring 4020 will vary depending upon the material used to form the ring 4020. The inner surface 4022 of the ring 4020 forms the cavity 4023 for receiving a cask. The ring 4020 further comprises a plurality of notches 4026 at the bottom surface 4025. The notches 4026 are rectangular shaped cutouts that will be discussed in more detail below.

The upper plate 4040 and the lower plate 4050 are connected to the outer surface 4021 of the ring 4020 and provide structural robustness to the LPT 4100. The upper plate 4040 is connected to the outer surface 4021 of the ring 4020 at or near the top surface 4024. The upper plate 4040 extends laterally from the outer surface 4021 of the ring 4020. The upper plate 4040 comprises a top surface 4041 and a bottom surface 4042. The ring 4020 is fitted into an opening (not visible) in the upper plate 4040 and then the upper plate 4040 and the ring 4020 are welded together along their connection area. Other attachment means between the ring 4020 and the upper plate 4040 may be used, such as bolts, fasteners and/or fastening techniques, if desired. Alternatively, the ring 4020 and the upper plate 4040 could be a unitary structure. The upper plate 4040 is preferably made of steel and/or other metals. Where the upper plate 4040 is made of steel, it is preferably between 1 and 2 inches thick.

The lower plate 4050 is connected to the ring 4020 at or near the bottom surface 4025 of the ring 4020. The lower plate 4050 comprises a top surface 4051 and a bottom surface 4052. The ring 4020 is fitted into an opening (not visible) in the lower plate 4050 and the ring 4020 and the lower plate 4050 are then welded together along their contact area. Other attachment methods may be used however including mechanical means like bolts, fasteners and the like. The lower plate 4050 is preferably made of steel having a thickness of between 1 and 2 inches. The invention is not so limited, however, and other materials of various thicknesses may be used.

The body 4010 of the LTP 4100 further comprises cover plates 4016. The cover plates 4016 are positioned spaced from the outer surface 4021 of the ring 4020 and extend from the bottom surface 4042 of the upper plate 4040 to the top surface 4051 of the lower plate 4050. The cover plates 4016 are preferably made of steel or another metal. The invention is not so limited, however, and other materials may be used. The cover plates are preferably welded to the upper and lower plates 4040, 4050. Other attachment means may be used however, including, mechanical means such as brackets, bolts, fasteners and the like.

The upper plate 4040 and the lower plate 4050 protrude at the front and rear end of the LPT 4100 so as to form the top and bottom, respectively of two housings 4030 for the roller assemblies 4060. The housings 4030 for the roller assemblies 4060 are positioned equidistant from each other, or 180 degrees apart. Each housing 4030 comprises two outer plates 4031 and two inner plate 4032 that surround the roller assemblies 4060. The outer plates and the inner plates 4031, 4032 extend laterally from the cover plate 4016 to the lateral edge of 4053 of the lower plate 4050. The outer and inner plates 4031, 4032 additionally extend from the bottom surface 4042 of the upper plate 4040 to the top surface 4051 of the lower plate 4050. Preferably, the outer plates 4031 of the housing 4030 are welded to the cover plate 4016 and to the upper and lower plates 4040, 4050. Other attachment means may be used, including mechanical means such as fasteners, bolts, brackets and the like. The inner and outer plates 4031, 4032 are preferably 2 to 4 inches thick and made of steel. Other materials of different thicknesses may be used however, including other metals, so long as the robustness of the LPT 100 is maintained.

The housing 4030 further comprises a plurality of reinforcement plates 4033 for structural stability. There are three reinforcement plates 4033 positioned between the inner plates 4032 and extending from the top plate 4040 to the bottom plate 4050. Preferably, the reinforcement plates 4033 are welded to the top plate and the bottom plate 4050, but other attachment means may be used. The reinforcement plates 4033 extend laterally from the cover plate 4016 to the lateral edge 4053 of the lower plate 4050 and are preferably welded to the cover plate 4016.

The LPT 4100 further comprises a plurality of support members 4070. In the illustrated embodiment there are four support members 4070. The invention is not so limited, however, and more or less support members 4070 may be used so long as they can support the weight of a fully loaded storage cask. In operation, the support members 4070 contact a cask to be supported and translated in the LPT 4100. Each one of the support members 4070 comprises a contact plate 4072 and three support plates 4074. As will be discussed in further detail with reference to FIG. 36, the support plates 4074 are L-shaped plates having a portion which extends into the cavity 4023 near the bottom of the cavity 4023. The support plates 4074 extend through the notches 4026 in the ring 4020. The notches 4026 are slightly larger than the support plates 4071 in order provide a passageway for the support plates 4074 of the support members 4070 to extend through the ring 4020 into the cavity 4023. Preferably the support plates 4071 are welded to the ring 4020 so that there is no movement between the support members 4070 and the ring 4020. The contact plate 4072 is connected with the portion of support plate 4074 that extends into the cavity 4023. The contact plate 4072 also contacts and supports a shoulder of the cask. The shoulder of the cask could either be an opening or cutout in an outer surface of the cask or a ledge, ridge, flange or other protrusion from the outer surface of the cask. The contact plate 4072 is a rectangular plate made of two sections, a top section 4075 and a bottom section 4076. The top section 4075 is in surface contact with the cask and is therefore made of a softer material so as to not damage the cask. The bottom section 4076 is made of steel of another metal. The top section and bottom section 4075, 4076 of the contact plate 4072 are connected to each other using either mechanical means, welding or gluing. The contact plate 4072 is positioned near the bottom of the cavity 4023 and is sufficiently robust to support the weight of a cask loaded into cavity 4023. Additionally, the contact plate 4072 could be a ring rather than rectangular plates, additionally, the contact plate 4052 could be a bar extending the entire diameter of the body 4020, so long as a surface that engages the cask is created.

Figure 36:
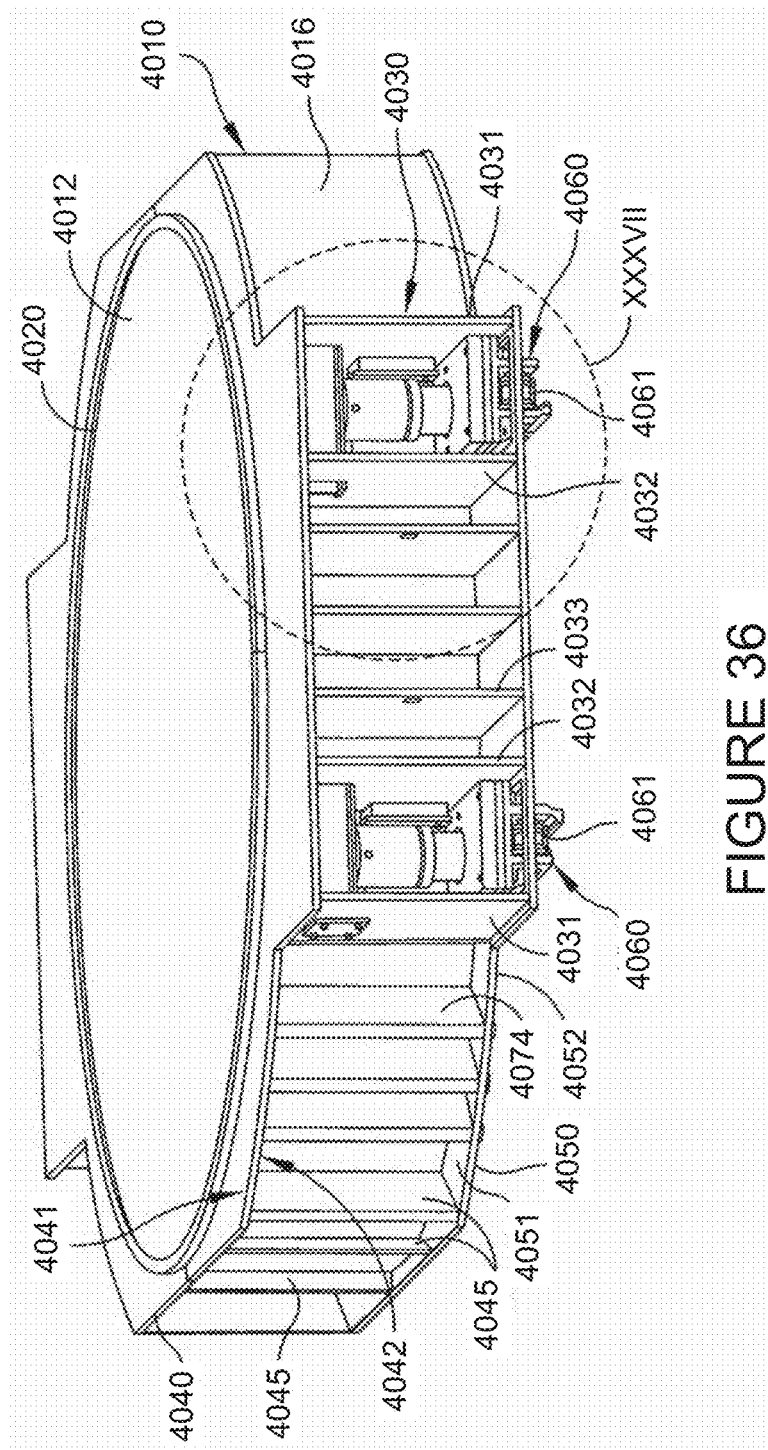
FIG. 36 is a top perspective view of the transporter of FIG. 4 with a cover plate removed on one side of the transporter according to one embodiment of the present invention.

Referring now to FIG. 36, the LPT 4100 is shown with a cover plate 4016 removed on one side. The support plates 4074 of the support members 4070 are attached to the outer surface 4022 of the ring 4020. The support plates 4074 extend from the bottom surface 4042 of the upper plate 4040 and through slots in the bottom plate 4050 so that a bottom portion of the support plates 4074 extends through the bottom plate 4050. The support plate 4074 additionally extends laterally from the body 4020 to the cover plate 4016 (shown in FIG. 35). The support plate 4074 is preferably welded to the body 4020, but other attachment means may be used. Each support member 4070 comprises three support plates 4074, but the invention is not so limited, and more or less support plates 4074 may be used so long as the support member 4070 is able to withstand the weight of a fully loaded storage cask without deforming.

The LPT 4100 further comprises a plurality of reinforcement plates 4045 attached to the outer surface 4021 of the ring 4020 to provide structural integrity. The reinforcement plates 4045 are arranged in series around the outer surface 4023 of the ring 4020. FIG. 36 shows three reinforcement plates 4045. The invention is not so limited however and there could be less or more reinforcement plates 4045 per group, arranged closer or farther apart along the ring 4020. The reinforcement plates 4045 are generally rectangular in shape and preferably made of steel and/or other metals. The invention is not so limited however, and the shape and material of the reinforcement plates 4045 can vary. The reinforcement plates 4045 extend between the top and bottom plates 4040, 4050 and are preferably attached to the top and bottom plates 4040, 4050 by welding. Other attachment means may be used, such as bolts, fasteners and/or fastening techniques, if desired.

Figure 37:
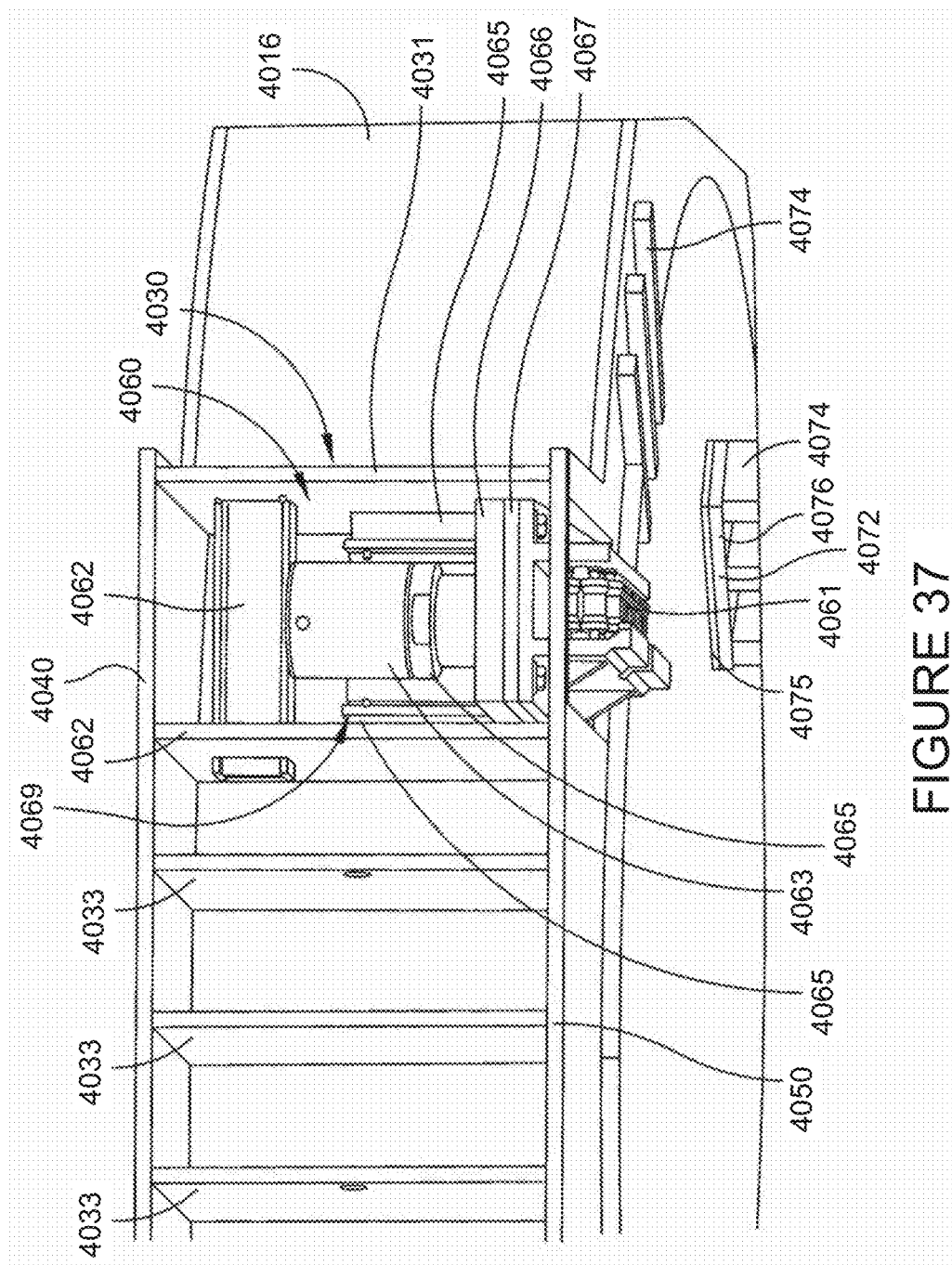
FIG. 37 is a close-up perspective view of section XXXVII of FIG. 36 according to one embodiment of the present invention.

Referring now to FIG. 37, a close-up view of section XXXVII of FIG. 36 showing the roller assembly 4060 is illustrated so that its various components and their interaction with one another is more clearly visible. The roller assembly 4060 comprises rollers 4061, a horizontal beam 4062, a jack 4063, a locking ring 4064, low-friction plates 4065 and base plate 4066. The jack 4063 is designed to raise and lower the rollers 4061 between the fully extended position (illustrated) and the fully retracted position (not shown). When the rollers 4061 are in the fully retracted position, they do not contact a ground surface.

As shown in FIG. 35, the LPT 4100 comprises four roller assemblies each having a jack 4063. The four jacks 4063 are hydraulic jacks having hydraulic hoses (not illustrated) extending from a power skid unit (not illustrated) comprises controls for operating the jacks 4063. The jacks 4063 are designed to work in conjunction with each other so that no jack 4063 will lift or lower the roller 4061 independent of the other jacks. This avoids the tipping of the LPT 4100. Additionally, other means of controlling the jacks 4063 may be used including via motors that powered remotely of the LPT 4100. The locking ring 4064 is designed to keep the jack 4063 from accidentally releasing and thereby dropping the load in the LPT 4100. The locking ring 4064 is a metal ring that is threaded on its inner surface. When the jack 4063 is powered so that the rollers 4061 are in the extended position, the locking ring is locked into place so that loss of hydraulic power to the jack 4063 will not cause the load to be dropped. The rollers 4061 are bolted to the base plate 4066 which comprises an indentation 4068 (shown in FIG. 38) for the cylinder of the jack 4063. The indentation 4068 keeps the jack 4063 from moving in the lateral direction.

The base of the jack 4063 is connected to the horizontal beam 4062. The horizontal beam 4062 is a steel I-beam that spans between the inner plate 4031 and the outer plate 4032. The ends of the horizontal beam 4063 extend through openings in the inner and outer plates 4031, 4032. A cover is put on the end of the horizontal beam 4063 that protrudes from the outer plate 4032. The cover is bolted to the outer surface of the outer plate 4031.

The low-friction plates 4065 are rectangular shaped pads made of nylon or another low-friction material having the capability to withstand high compression loads. The low-friction plates 4065 are positioned between a vertical beam 4069 and the outer and inner plates 4031, 4032 of the housing 4030. When the jack 4063 moves the rollers vertically, the low-friction plates 4065 move along the outer and inner plates 4031, 4032. The low friction plates 4065 provide support for the roller assembly 4060 so that the rollers 4061 do not supinate or pronate, meaning the roller assembly 4060 does not bend inwards or outwards (horizontally) at any point from the moment forces caused by the weight of the load in the LPT 4100. Rather the roller assembly 4060 moves only vertically.

The roller assembly 4060 further comprises a shim 4067. The shim 4067 is preferably a rectangular thin metal plate, such as steel or aluminum. The shim 4067 can be constructed of other materials and in other shapes if desired. The shim 4067 provides a simple way to change the overall height of the LPT 4100 because the height of the shim 4067 can be easily varied. The shims 4067 are positioned between the base plate 4066 and the rollers 4061. The rollers 4061 are best illustrated in FIG. 38.

Figure 38:
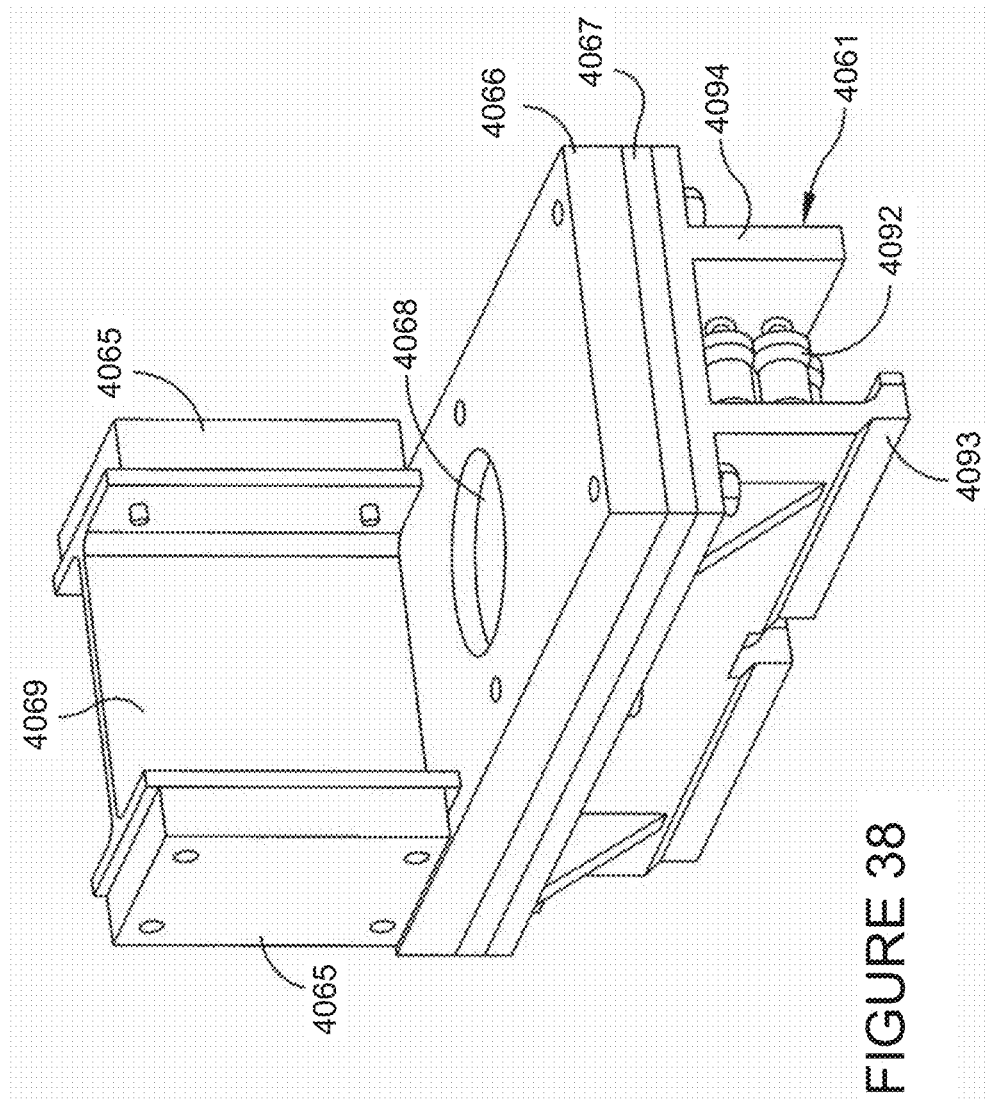
FIG. 38 is a perspective view of a roller assembly of the low profile transporter according to one embodiment of the present invention.

Referring to FIG. 38, a roller 4061 is illustrated removed from the LPT 4100. Although a particular roller design is illustrated, the rollers 4061 can be any kind of linear motion device including devices commercially available. The rollers 4061 comprise wheels 4092, inner plate 4093 and outer plate 4094. The inner and outer plates 4093, 4094 keep the wheels 4092 vertically in line so that they do not supinate or pronate. The inner and outer plates 4093, 4094 additionally act as a connection to a rail of a track (shown in FIG. 41) in the ground surface that may be used with the LPT 4100.

Figure 39:
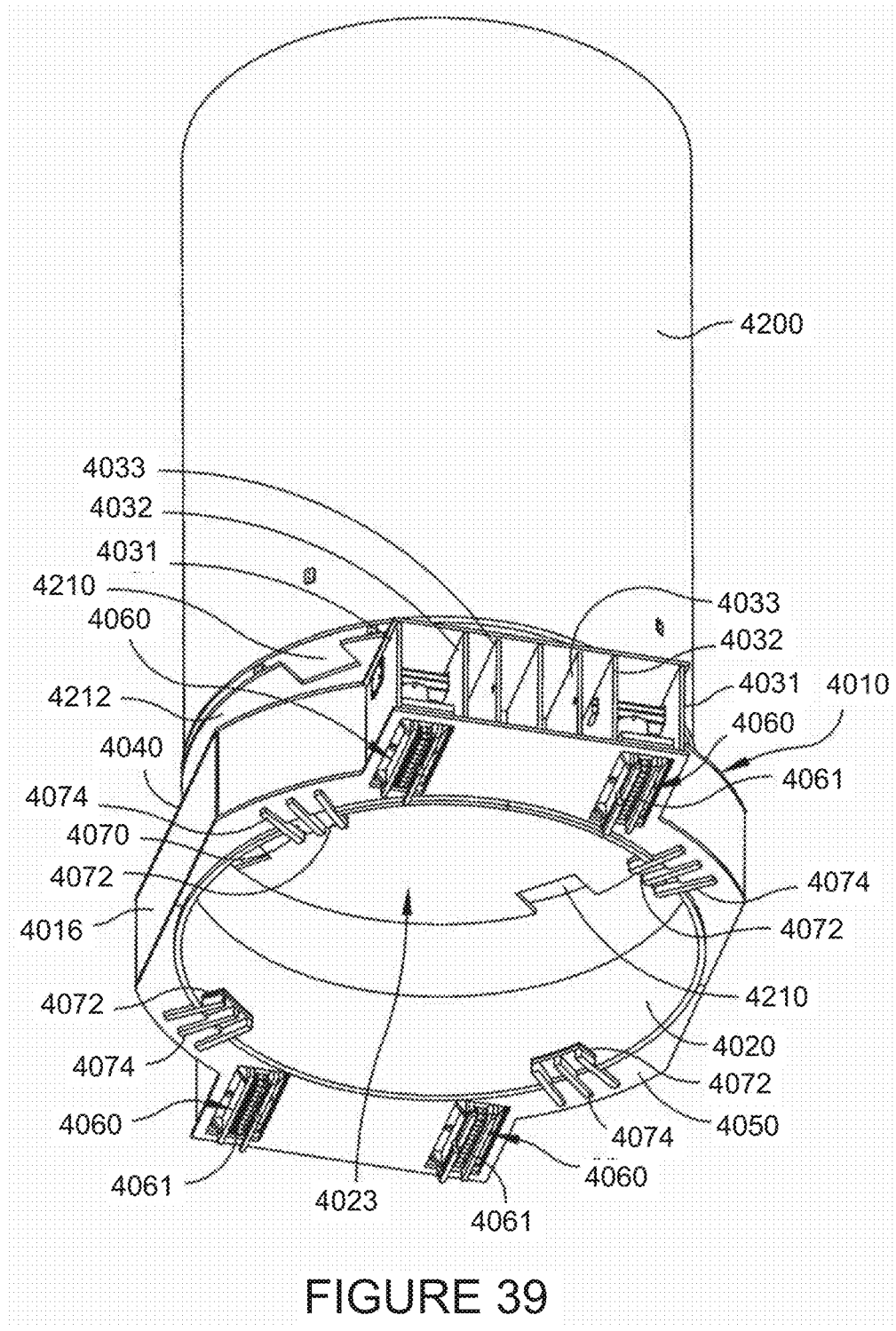
FIG. 39 is a bottom perspective view of the low profile transporter of FIG. 34 and a cask positioned above the low profile transporter according to one embodiment of the present invention.

Referring now to FIG. 39, a cask 4200 is shown positioned above the LPT 4100. A cutout 4210 can be seen in the bottom surface 4212 of the cask 4200. As stated previously, the cask 4200 could have a ridge or lug extending outwardly to engage with support members 4070. The cutout 4210 is aligned with the contact plate 4072 so that the cask 4200 can be lowered through the open top end of the body 4020, into the cavity 4023 until the contact plate 4072 slides through the cutout 4210 and engages the cask 4200, as shown in FIG. 40.

Figure 40:
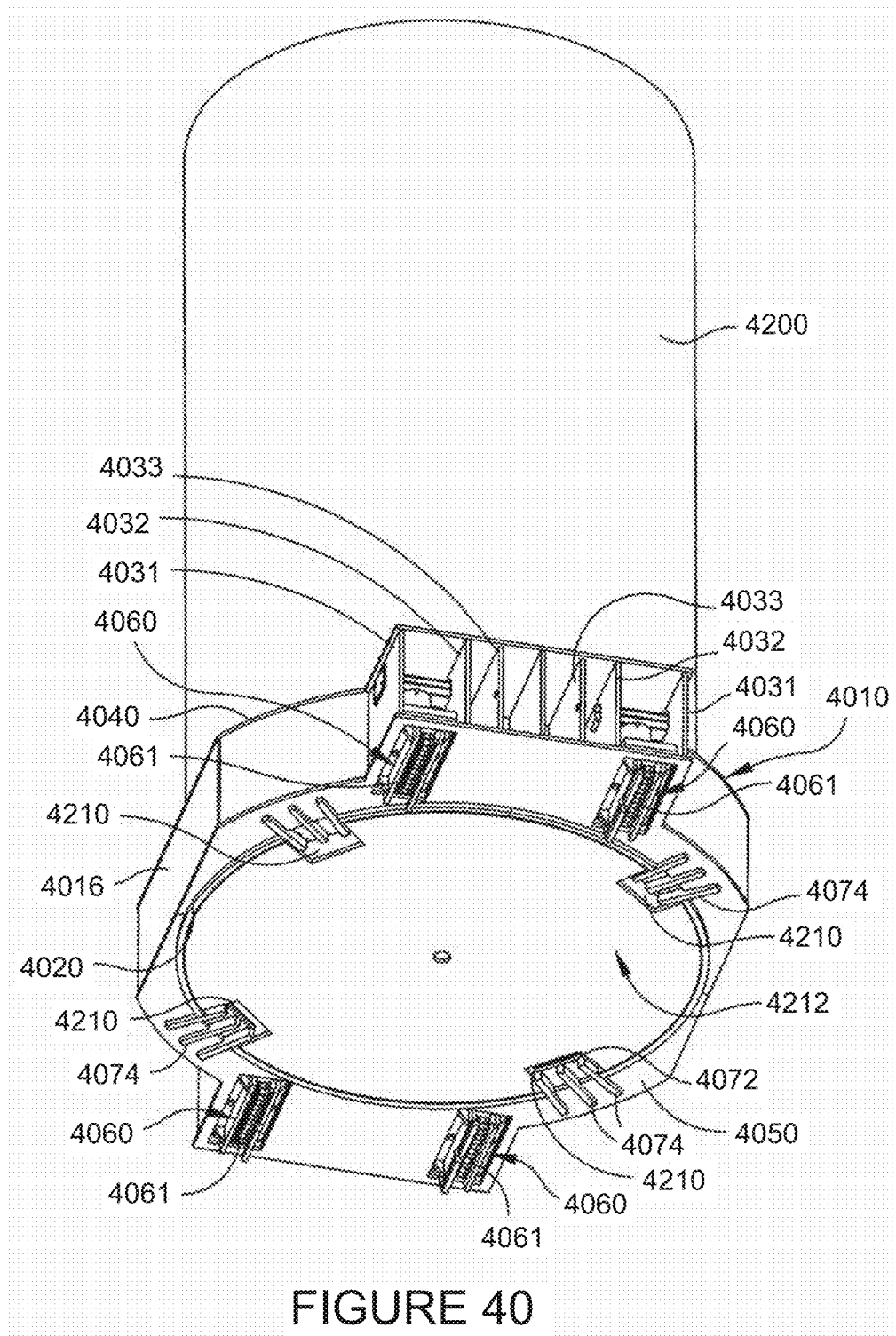
FIG. 40 is a bottom perspective view of the low profile transporter and cask of FIG. 39 with the cask positioned in the low profile transporter according to one embodiment of the present invention.

Referring now to FIG. 40, the cask 4200 is shown positioned in the LPT 4100. The contact plates 4072 are positioned close to the bottom plate 4050 of the LPT 4100 so that when the cask 4200 rests on the support members 4070, the cask 4200 can sit as close to the ground floor 4006 as possible without the bottom surface 4212 engaging the irregularities in the floor surface 4006 (shown in FIG. 41).

Preferably the distance between the bottom surface 4212 of the cask 4200 and the surface of the ground floor 4006 is between 0.1 and 6 inches, more preferably between 0.1 and 3 inches, and most preferably between 0.1 and 1 inch.

Figure 41:
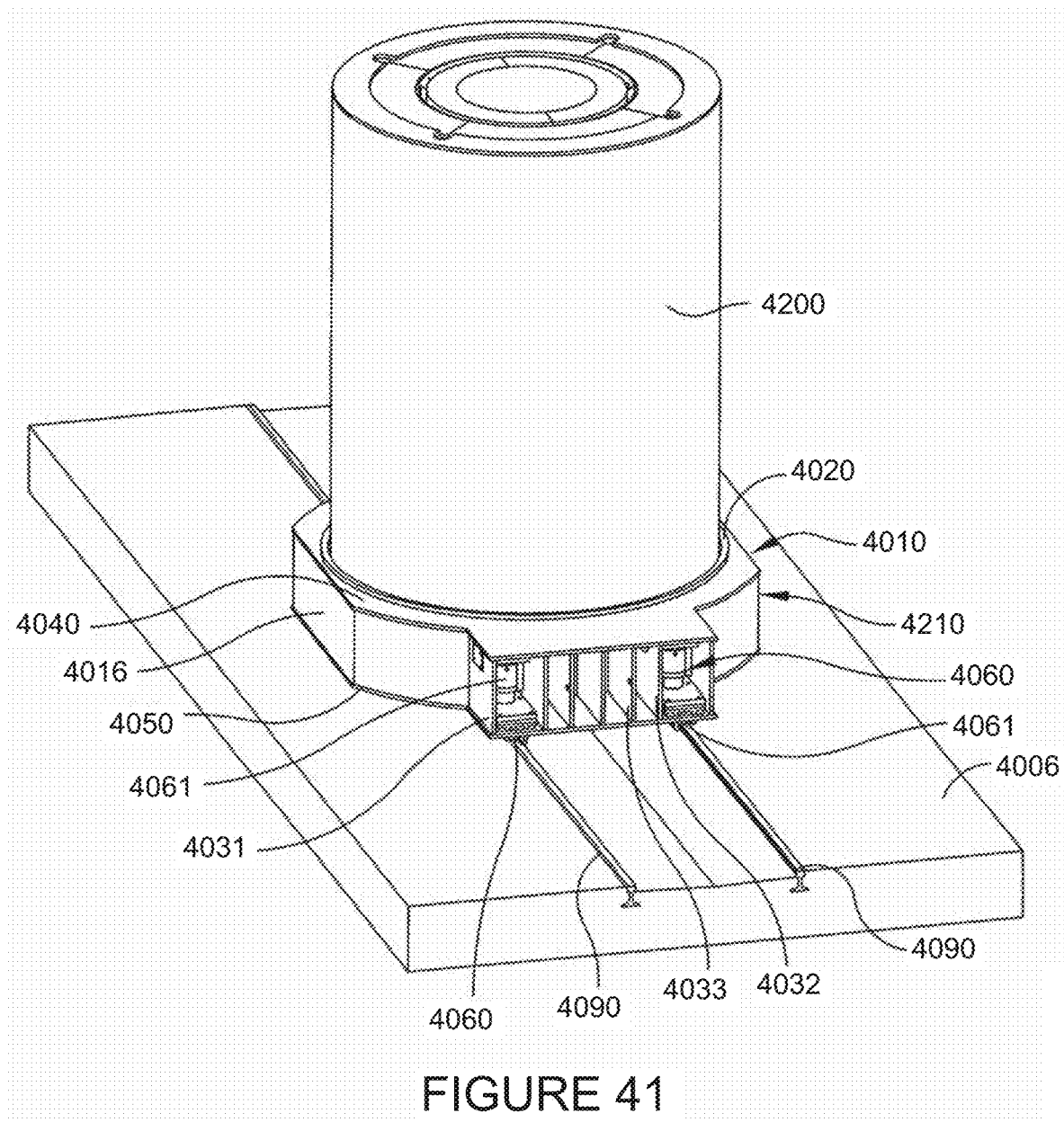
FIG. 41 is a perspective view of the low profile transporter and cask of FIG. 40 positioned on tracks of a ground surface according to one embodiment of the present invention.
Figure 42:
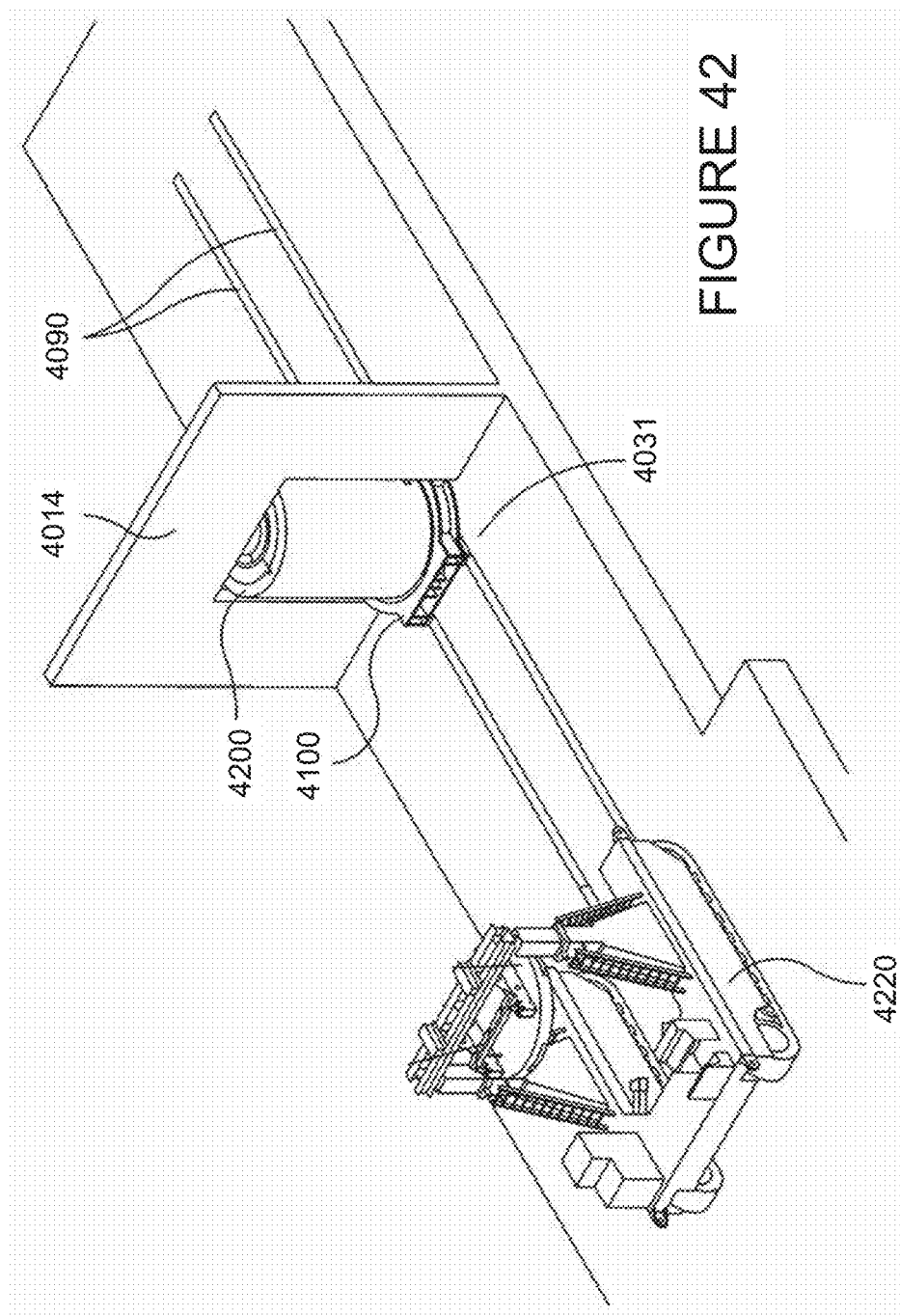
FIG. 42 is a perspective view of the low profile transporter and cask of FIG. 40 translating under an over head door according to one embodiment of the present invention.

Referring now to FIG. 41, the LPT 4100 is designed to glide along rails 4090 of a ground floor 4006. More specifically rollers 4060 are designed to fit within rails 4090 so that the LPT 4100 can be laterally moved (i.e. translated) along the floor 4006. The bottom surface of container 4212 does not touch the floor 4006. The LPT 4100 is designed so that the loaded container 4200 can be transported underneath a doorway 4014 (shown in FIG. 42).

Referring to FIGS. 39 through 41, a method of supporting and translating a storage cask 4200 will now be discussed. The LPT 4100 is positioned on the ground surface 4006. The cask 4200 is raised using a transporter 4220 or any other crane like apparatus so that the bottom surface 4212 of the cask 4200 clears the tops surface of the upper plate 4040 of the LPT 4100. The cutouts 4210 in the bottom surface 4212 of the cask 4200 are aligned with the contact plates 4072 of the support members 4070. the cask is lowered through the open top 4012 end of the body 4010 and into the cavity 4023 of the LPT 4100. The cask 4200 is lowered until the cutouts 4210 of the cask 4200 are resting on the contact plate 4072 of the support members 4070. The rollers 4061 are vertically moved into the extended position so that the rollers contact the ground surface 4006. The LPT 4100 is translated along the rails 4090 (or on a ground surface having no rails). The rollers 4061 are vertically moved so as to be raised from the ground surface. The support members 4074 contact the ground surface 4006 and the rollers 4061 no longer support any weight of the LPT 4100 or cask 4200. Spent nuclear fuel is then loaded into the cask 4200 by means known in the art. Such means of transferring spent nuclear fuel into storage casks including by resting a transfer cask (not shown) on top of the cask 4200 so that the spent nuclear fuel can be transferred from the transfer cask into the storage cask. In such a transfer method, the full weight of the transfer cask and the cask 4200 are supported by the LPT 4100. The transfer cask is then removed from the cask 4200. The rollers 4061 of the LPT 4100 are vertically moved into the extended position so that the rollers contact the ground surface 4006. The LPT 4100 and the fully loaded cask 4200 are then translated. The LPT 4100 and the cask 4200 may be translated underneath overhead door 4014. The LPT 4100 can engage with the cask transporter 4220 so that the cask 4200 can be raised out of the cavity 4023 until the bottom surface 4210 of the cask 4200 clears the top surface of the upper plate 4040. The LPT 4100 can be translated from underneath the cask 4200 and the cask 4200 lowered to the ground surface 4006.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A fuel rack for supporting spent nuclear fuel assemblies comprising:
    a base plate having a top surface;
    a fuel rack body extending upward from the base plate and comprising a plurality of vertically-extending hexagonal tubes defining a plurality of cells, each of the cells having an open top end and being configured to receive a spent nuclear fuel assembly, and wherein for each of the cells, a portion of the top surface of the base plate forms a floor of the cell;
    each hexagonal tube arranged so as to be spaced from all adjacent hexagonal tubes forming a neutron flux trap gap between each hexagonal tube and its immediately adjacent hexagonal tube;
    a plurality of vertically elongated spacing rods positioned in the gaps between adjacent hexagonal tubes to maintain the gaps, wherein each spacing rod is plug welded to a corner edge of three adjacent hexagonal tubes in the gap at a juncture via holes located in the corner edges of each of the three adjacent hexagonal tubes.

2. The fuel rack of claim 1 wherein each of the spacing rods has a horizontal cross-section that is generally in the shape of a truncated triangle.

3. The fuel rack of claim 1 wherein each spacing rod extends vertically for an entire height of the hexagonal tubes.

4. The fuel rack of claim 1 wherein each spacing rod is constructed of a metal matrix composite material containing boron for neutron absorption.

5. The fuel rack of claim 1 wherein the spacing rods each have a plurality of axial grooves extending vertically along their lengths that act as nesting volumes for receiving the corner edges of the three adjacent hexagonal tubes.

6. The fuel rack of claim 1 further comprising a plurality of adjustable height pedestals connected to a bottom surface of the base plate.

7. A fuel rack for supporting spent nuclear fuel assemblies comprising:
    a base plate having a top surface;
    a fuel rack body extending upward from the base plate and comprising a plurality of vertically-extending hexagonal tubes defining a plurality of cells, each of the cells having an open top end and being configured to receive a spent nuclear fuel assembly, and wherein for each of the cells, a portion of the top surface of the base plate forms a floor of the cell;
    each hexagonal tube arranged so as to be spaced from all adjacent hexagonal tubes forming a neutron flux trap gap between each tube and its immediately adjacent hexagonal tube;
    a plurality of vertically elongated spacing rods positioned in the gaps between adjacent hexagonal tubes to maintain the gaps, wherein each spacing rod is plug welded to a corner edge of three adjacent hexagonal tubes in the gap at a juncture via holes located in the corner edges of each of the three adjacent hexagonal tubes;

a plurality of adjustable height pedestals connected to a bottom surface of the base plate, each of the adjustable height pedestals comprising:
- a block having a hole defined by a threaded inner surface, the block fixedly coupled to the base plate;
- a peg having a threaded outer surface, the threaded outer surface of the peg threadily engaged to the threaded inner surface of the block;
- an engagement element in a top surface of the peg; and
- wherein upon a tool engaging the engagement element and rotating the peg, the extent the peg protrudes from a bottom surface of the block is adjusted; and wherein for each of the adjustable height pedestals, the adjustable height pedestal is coupled to the base plate so that the engagement element is aligned with and is accessible via a hole in the floor of one of the cells.

8. The fuel rack of claim 7 wherein the engagement element comprises a non-circular depression.

9. The fuel rack of claim 7 wherein the fuel rack body comprises a plurality of cutouts adjacent the base plate that provide lateral passageways into the cells.

10. The fuel rack of claim 7 wherein each of the spacing rods has a horizontal cross-section that is generally in the shape of a truncated triangle.

11. The fuel rack of claim 7 wherein each spacing rod extends vertically for an entire height of the hexagonal tubes.

12. The fuel rack of claim 7 wherein each spacing rod is constructed of a metal matrix composite material containing boron for neutron absorption.

13. The fuel rack of claim 7 wherein the spacing rods each have a plurality of axial grooves extending vertically along their lengths that act as nesting volumes for receiving the corner edges of the three adjacent hexagonal tubes.

* * * * *